(12) United States Patent
Licht

(10) Patent No.: US 11,402,130 B2
(45) Date of Patent: Aug. 2, 2022

(54) METHODS AND SYSTEMS FOR CARBON NANOFIBER PRODUCTION

(71) Applicant: C2CNT LLC, Leesburg, VA (US)

(72) Inventor: Stuart Licht, Leesburg, VA (US)

(73) Assignee: C2CNT LLC, Leesburg, VA (US)

( * ) Notice: Subject to any disclaimer, the term of this patent is extended or adjusted under 35 U.S.C. 154(b) by 0 days.

(21) Appl. No.: 15/292,823

(22) Filed: Oct. 13, 2016

(65) Prior Publication Data

US 2019/0039040 A1   Feb. 7, 2019

Related U.S. Application Data

(63) Continuation of application No. PCT/US2016/056599, filed on Oct. 12, 2016, and a
(Continued)

(51) Int. Cl.
*C25B 1/00* (2021.01)
*F24S 50/20* (2018.01)
(Continued)

(52) U.S. Cl.
CPC .............. *F24S 50/20* (2018.05); *B01J 19/088* (2013.01); *C01B 32/16* (2017.08); *C25B 1/00* (2013.01); *C25B 1/55* (2021.01); *C25B 9/00* (2013.01); *C25B 9/30* (2021.01); *C25B 11/02* (2013.01); *C25B 15/00* (2013.01); *C25B 15/02* (2013.01); *D01F 9/12* (2013.01); *F24S 20/30* (2018.05); *F24S 90/00* (2018.05); *B01J 2219/0809* (2013.01); *B01J 2219/0869* (2013.01); *B01J 2219/0871* (2013.01); *B01J 2219/0884* (2013.01); *B82Y 30/00* (2013.01); *B82Y 40/00* (2013.01); *F24S 20/20* (2018.05); *F24S 23/30* (2018.05); *F24S 23/31* (2018.05); *F24S 23/71* (2018.05); *Y02E 10/40* (2013.01);
(Continued)

(58) Field of Classification Search
CPC ....................................................... C25B 1/00
See application file for complete search history.

(56) References Cited

U.S. PATENT DOCUMENTS 2,916,534 A   12/1959   Schallus et al.
3,085,053 A    4/1963   Thomas
(Continued)

FOREIGN PATENT DOCUMENTS

CN   102895847 A    1/2013
EP       111870 A2   6/1984
(Continued)

OTHER PUBLICATIONS

Licht, "Efficient Solar-Driven Synthesis, Carbon Capture, and Desalinization, STEP: Solar Thermal Electrochemical Production of Fuels, Metals, Bleach," Adv. Mater. 2011, 23, 5592-5612.*
(Continued)

*Primary Examiner* — Salil Jain
(74) *Attorney, Agent, or Firm* — Blank Rome LLP

(57) ABSTRACT

A system for utilizing solar power to generate carbon nano-materials. A system for utilizing the carbon dioxide byproduct of a fossil fuel power generation process to drive an electrolysis reaction which produces carbon nano-materials, and methods of producing the same.

29 Claims, 40 Drawing Sheets

Related U.S. Application Data continuation-in-part of application No. PCT/US2016/019918, filed on Feb. 26, 2016.

(60) Provisional application No. 62/240,805, filed on Oct. 13, 2015.

(51) Int. Cl.

| | |
|---|---|
| *C25B 15/00* | (2006.01) |
| *C25B 9/00* | (2021.01) |
| *F24S 90/00* | (2018.01) |
| *F24S 20/30* | (2018.01) |
| *C01B 32/16* | (2017.01) |
| *C25B 1/55* | (2021.01) |
| *C25B 9/30* | (2021.01) |
| *C25B 11/02* | (2021.01) |
| *B01J 19/08* | (2006.01) |
| *C25B 15/02* | (2021.01) |
| *D01F 9/12* | (2006.01) |
| *F24S 23/30* | (2018.01) |
| *F24S 20/20* | (2018.01) |
| *F24S 23/71* | (2018.01) |
| *B82Y 30/00* | (2011.01) |
| *B82Y 40/00* | (2011.01) |

(52) U.S. Cl.
CPC ............. *Y02E 10/52* (2013.01); *Y02P 20/133* (2015.11); *Y10S 977/742* (2013.01); *Y10S 977/844* (2013.01)

(56) References Cited

U.S. PATENT DOCUMENTS

| | | | |
|---|---|---|---|
| 3,173,849 A | 3/1965 | Shearer et al. | |
| 3,236,961 A | 2/1966 | Reger et al. | |
| 3,265,606 A | 8/1966 | Marullo et al. | |
| 3,374,120 A | 3/1968 | Lawson | |
| 3,401,062 A | 9/1968 | Lyons, Jr. | |
| 3,419,435 A | 12/1968 | Recht et al. | |
| 3,463,709 A | 8/1969 | Russell | |
| 3,615,839 A | 10/1971 | Thompson et al. | |
| 3,655,537 A | 4/1972 | Russell et al. | |
| 3,661,753 A | 5/1972 | Aylward et al. | |
| 3,919,390 A | 11/1975 | Moore | |
| 4,041,210 A | 8/1977 | Van Dine | |
| 4,090,012 A | 5/1978 | Elliott et al. | |
| 4,197,421 A | 4/1980 | Steinberg | |
| 4,420,381 A | 12/1983 | Silvilotti et al. | |
| 4,459,187 A | 7/1984 | Lagana et al. | |
| 4,478,699 A | 10/1984 | Halmann et al. | |
| 4,529,488 A | 7/1985 | Kotani et al. | |
| 4,545,872 A | 10/1985 | Sammells et al. | |
| 4,608,132 A | 8/1986 | Sammells | |
| 4,609,451 A | 9/1986 | Sammells et al. | |
| 4,673,473 A | 6/1987 | Ang et al. | |
| 4,756,806 A | 7/1988 | Krist et al. | |
| 4,804,448 A | 2/1989 | Sammells et al. | |
| 4,841,731 A | 6/1989 | Tindell | |
| 4,897,167 A | 1/1990 | Cook et al. | |
| 5,232,793 A * | 8/1993 | Miyauchi ............ | H01M 8/0612 423/438 |
| 5,246,551 A | 9/1993 | Pletcher et al. | |
| 5,578,140 A | 11/1996 | Yogev et al. | |
| 5,865,982 A | 2/1999 | Sawa et al. | |
| 6,253,578 B1 * | 7/2001 | Kobayashi ............ | C03B 5/2353 65/134.4 |
| 6,565,733 B1 | 5/2003 | Sportel et al. | |
| 6,692,861 B2 | 2/2004 | Tao | |
| 6,843,903 B2 | 1/2005 | Roe et al. | |
| 7,241,950 B2 | 7/2007 | Fan et al. | |
| 7,316,765 B2 | 1/2008 | Tojo et al. | |
| 7,459,065 B2 | 12/2008 | Kelly et al. | |
| 7,465,379 B2 | 12/2008 | Siljan | |
| 7,645,931 B2 | 1/2010 | Gibson et al. | |
| 7,704,369 B2 | 4/2010 | Olah et al. | |
| 8,365,529 B2 | 2/2013 | Litwin et al. | |
| 9,683,297 B2 | 6/2017 | Licht | |
| 9,758,881 B2 | 9/2017 | Licht | |
| 2004/0060826 A1 | 4/2004 | Godfrey | |
| 2006/0019133 A1 | 1/2006 | Cooper | |
| 2007/0246365 A1 | 10/2007 | Ohishi et al. | |
| 2007/0269688 A1 | 11/2007 | Lipilin et al. | |
| 2008/0135403 A1 | 6/2008 | Jang et al. | |
| 2008/0223727 A1 | 9/2008 | Oloman et al. | |
| 2008/0245672 A1 | 10/2008 | Little et al. | |
| 2008/0314593 A1 | 12/2008 | Vinegar et al. | |
| 2009/0016948 A1 | 1/2009 | Young | |
| 2009/0057161 A1 | 3/2009 | Aulich et al. | |
| 2009/0200025 A1 | 8/2009 | Bravo | |
| 2009/0258278 A1 | 10/2009 | Steinberg | |
| 2010/0000874 A1 | 1/2010 | Hinman et al. | |
| 2010/0018569 A1 | 1/2010 | Mitchell et al. | |
| 2010/0200418 A1 | 8/2010 | Licht | |
| 2010/0200421 A1 | 8/2010 | Aujollet | |
| 2011/0100832 A1 | 5/2011 | Lubomirsky et al. | |
| 2013/0001072 A1 | 1/2013 | Licht | |
| 2014/0202874 A1 * | 7/2014 | Elgammal ................ | C25B 1/00 205/555 |
| 2014/0339095 A1 | 11/2014 | Licht | |
| 2016/0138469 A1 | 5/2016 | Bergen | |

FOREIGN PATENT DOCUMENTS

| | | | | |
|---|---|---|---|---|
| FR | 2919618 B1 | 11/2009 | | |
| WO | WO-2007046713 A1 * | 4/2007 | ........... | C01B 32/162 |
| WO | WO-2010137995 A1 | 12/2010 | | |
| WO | WO-2011/100581 A1 | 8/2011 | | |
| WO | WO-2011100581 A1 | 8/2011 | | |
| WO | WO-2014086889 A1 | 6/2014 | | |

OTHER PUBLICATIONS

Kaplan et al, "Synthesis of Nanostructured Carbon Material by Electroreduction in Fused Alkali Carbonates," Chemistry Letters 2001, pp. 714-715.*

Kaplan et al, "Synthesis of Nanostructured Carbon Material by Electroreduction in Fused Alkali Carbonates," Chemistry Letters, 2001 (Year: 2001).*

Tang et al, "Effects of Applied Voltage and Temperature on the Electrochemical Production of Carbon Powders From CO2 in Molten Salt with an Inert Anode," Electrochi mica Acta 114 (2013) 567-573 (Year: 2013).*

Groult et al, "Preparation of Carbon Nanoparticles from Electrolysis of Molten Carbonates and use as Anode Materials in Lithium-ion Batteries," Solid State Ionics, 2006.*

Van et al, Electrochemical formation of carbon nano-powders with various porosities in molten alkali carbonates, Electrochim. Acta, 2009, 54 , 4566-4573.*

Groult et al., Electrodeposition of Carbon-Metal Powders in Alkali Carbonate Melts, Journal of the Electrochemical Society, 161 (7) D3130-D3138 (2014).*

Yin et al., Capture and electrochemical conversion of CO2 to value-added carbon and oxygen by molten salt electrolysis, Energy Environ. Sci., 2013, 6, 1538, 2013.*

Hsu et al, "Electrolytic Formation of Carbon Nanostructures," Chemical Physics Letters, 262 (1996), pp. 161-166 (Year: 1996).*

Berger, "New Solar-Powered Process Removes Carbon Dioxide from the Air and Stores it as Solid Carbon", Nanowerk, http://www.nanowrk.com/spotlight/spotid=17198.php; Jul. 16, 2010; 4 pages.

International Search Report for PCT/US2016/019918, dated Jun. 9, 2016, 2 pages.

S. Licht, "Efficient Solar-Driven Synthesis, Carbon Capture, and Desalinization, STEP; Solar Thermal Electrochemical Production of Fuels, Metals, Bleach" Adv. Mater., vol. 23, No. 47 (2011) p. 1, 3, 5-7, 9, 11, 18.

Us, Department of Energy, "Energy Tips—Process Heating" (Nov. 2007) [online] retrieved on Dec. 6, 2016]. Retrieved from teh Internet <URL> http://energy.gov/sites/prod/files/2014/f16/et_preheated.pdf> p. 1.

(56) References Cited

OTHER PUBLICATIONS

Lau et al., "Thermodynamic assessment od CO2 to carbon nanofiber transformation for carbon sequestration in a combined cycle gas or a coal poer plant" Energy Conversion and Management, vol. 122, p. 400-410 (Jun. 10, 2016) entire document.
The Written Opinion for PCT/2016/019918 dated Jun. 9, 2016.
S. Licht, "Optimizing Photoelectrochemical Solar Energy Conversion: Multiple Bandgap and Solution Phase Phenomena", Technion—Israel Institue of Technology, pp. 359-391.
Ishihara, et al. "High Temperature Electrochemical Heat Pump Using a Water Gas Shift Reaction. Electrochemical Reduction of Co2 to CO" Bull. Chem. Soc. Jpn., 71, 1517-1523 (2001).
S. Licht, et al. "A new Solar Carbon Capture Process: Solar Thermal Electrochemical Photo (STEP) Carbon Capture", J. Phys. Chem. Lett. 2010, 1, 2363-2368.
S. Licht, "STEP (Solar Thermal Electrochemical Photo) Generation fo Enegetic Molecules: A solar Chemical Process to End Anthropogenic Global Warning", J. Phys. Chem. C 2009, 113, 16283-16292.
International IPER for PCT/US2016/056599 dated Apr. 17, 2018.
Hamdy et al. "Model of a Spectrally Selective Decoupled Photovoltaic/Thermal Concentrating System," Applied Energy 30 (1988) pp. 209-225.
DeBethune, A.J., et al. "The Temperature Coefficients of Electrode Potentials," Journal of Electrochemical Society, vol. 106, No. 7, Jul. 1959, pp. 616-625.
O'Regan, Brian, et al., "A low-Cost, High Efficiency Solar Cell based on Dye Sensitized Colloidal TiO2 Films," Nature, vol. 353, Oct. 24, 1991, pp. 737-739.
"Search for Species Data by Chemical Formula," Chemistry, 2008.
"Executive Summary," OECD/IEA, 2007, pp. 19-29.
"Global CO2 Emissions: Increase Continued in 2007," Publications, 2008.
Pellegrino, J.L., "Energy and Environmental Profile of the U.S. Chemical Industry," U.S. Department of Energy Office of Industrial Tecnologies, May 2000.
Ganley, Jason, C., "High Temperature and Pressure Alkaline Electrolysis," International Journal of Hydrogen Energy, vol. 34, 2009, pp. 3604-3611.
Marina, O.A., et al., "Elecctrode Performance in Reversible Solid Oxide Fuel Cells," *Journal of Electrochemical Society*, vol. 154, No. 5, 2007, pp. B452-B459.
International Search Report; International Application No. PCT/US11/24576; International Filing Date: Feb. 11, 2011; dated Apr. 25, 2011; 7 pages.
Written Opinion of the International Searching Authority; International Application No. PCT/US11/24576; Intrnational Filing Date: Feb. 11, 2011; dated Apr. 25, 2011; 5 pages.
S. Licht, et al. "Efficient Solar Water Splitting, Exemplified by RuO2-Catalyzed AlGaAs/Si Photoelectrolysis," J. Phys. Chem. B, vol. 104, No. 38, Jul. 27, 2000, pp. 8920-8924.
Licht, S., "A Description of Energy Conversion of Photoelectrochemical Solar Cells," Nature International Weekly Journal of Science, vol. 330, No. 6144, Nov. 1987, pp. 148-151.
Licht, S., "Solar Water Splitting to Generate Hydrogen Fuel: Photothermal Electrochemical Analysis," J. Phys. Chem. B., vol. 107, Feb. 6, 2003, pp. 4253-4260.
Licht, S., "Thermochemical Solar Hydrogen Generation," ChemComm, Jun. 16, 2005, pp. 4635-4646.
Licht, S., et al., "Electrochemical Potential Tuned Solar Water Splitting," ChemComm, J. Phys. Chem. B., vol. 107 No. 18, Aug. 7, 2003, pp. 3006-4260.
Licht, S., et al., "A Light-Variation Insensitive High Efficiency Solar Cell," Nature International Weekly Journal of Science, vol. 326, No. 6116, May 6, 1987, pp. 862-864.
Light, Truman S., et al., "the fundamental Conductivity and Resistivity of Water," Electrochemical and Solid-State Letters, vol. 8, 2005, pp. E16-E19.
Zou, Zhigang, et al., "Direct Splitting of Water under Visible Light Irradiation with an Oxide Semiconductor Photocatalyst," Nature, vol. 414, No. 6, Dec. 2001, pp. 625-628.

H. V. Ijije, et al., "Electro-Deposition and Re-Oxidation of Carbon in Carbonate-Containing Molten Salts", Faraday Discussions, vol. 172, May 27, 2014, pp. 105-116.
Supplementary European Search Report for EP 16756506, dated Oct. 12, 2018, 7 pgs.
A.T. Dimitrov, "Study of Molten $Li_2CO_3$ Electrolysis as a Method for Production of Carbon Nanotubes", Macedonian Journal of Chemistry and Chemical Engineering, vol. 28, No. 1, 2009, pp. 111-118.
Ren et al., Nano Lett. 2015, 15, 6142-6148 with Supplemental Information.
Licht et al., ACS Cent. Sci. 2016, 2, 162-168.
Johnson et al., Materials Today Energy 5 (2017) 230-236.
Johnson et al., Data in Brief 14 (2017) 592-606.
Ren et al., J. Phys. Chem. C 2015, 119, 23342-23349.
Dey et al., RSC Adv., 2016, 6, 27191-27196.
Wu et al., Carbon 106 (2016) 208-217.
Executive Summary, Tracking Industrial Energy Efficiently and CO2 Emissions, 2007, pp. 19-29 (11 pages).
International Preliminary Report on Patentability in International Application No. PCT/US2016/056599, dated Apr. 17, 2018 (7 pages).
Ishihara, et al., High Temperature Electrochemical Heat Pump Using a Water Gas Shift Reaction, Electrochemical Reduction of CO2 to CO, Bull. Chem. Soc. Jpn., 71, 2001, pp. 1517-1523 (14 pages).
Licht et al., Carbon nanofibers, precious commodities from sunlight & CO2 to ameliorate global warming (Mar. 23, 2015) [online] [retrieved on Dec. 6, 2016]. Retrieved from the internet <URL: https://arxiv.org/abs/1503.06727v1>p. 1-4, 6, 10, 16.
Licht, Efficient Solar-Driven Synthesis, Carbon Capture, and Desalinization, STEP: Solar Thermal Electrochemical Production of Fuels, Metals, Bleach, Adv. Mater. 2011, 5592-5612.
Licht, S."Efficient Solar Generation of Hydrogen Fuel—A Fundamental Analysis," Electrochemistry Communications, vol. 4, Aug. 14, 2002, pp. 790-795.
Licht, S. et al., A Light-Variation Insensitive High Efficiency Solar Cell, Nature International Weekly Journal of Science, vol. 326, No. 6116, May 6, 1987, pp. 863-864 (3 pages).
Licht, S. et al., Efficient Solar Water Splitting, Exemplified by RuO2-Catalyzed AlGaAs/Si Photoelectrolysis, J. Phys. Chem. B, vol. 104, No. 38, Jul. 27, 2000, pp. 8920-8924 (5 pages).
Licht, S., Efficient Solar-Driven Synthesis, Carbon Capture, and Desalinization, STEP: Solar Thermal Electrochemical Production of Fuels, Metals, Bleach, Advanced Materials, vol. 23, No. 47 (2011) pp. 1-21 (21 pages).
Licht, S., Electrochemical Potential Tuned Solar Water Splitting, Chemical Communications, 2003, pp. 3006-3007 (4 pages).
Licht, S., et al., "Efficient Photoelectrochemcial Solar Cells from Electrolyte Modification," Nature International Weekly Journal of Science, vol. 345, No. 6273, May 27, 1990, pp. 330-333.
Licht, S., Light invariant, efficient, multiple band gap AlGaAs/Si/metal hydride solar cell, Applied Physics Letters, vol. 74, No. 26, Jun. 28, 1999, pp. 4055-4057 (3 pages).
Licht, S., Multiple Band Gap Semiconductor/Electrolyte Solar Energy Conversion, J. Phys. Chem B, 2001, 105, pp. 6281-6294 (14 pages).
Licht, S., Optimizing Photoelectrochemical Solar Energy Conversion: Multiple Bandgap and Solution Phase Phenomena, Technion-Israel Institute of Technology, 2002, pp. 358-391 (18 Pages).
Licht, S., STEP (Solar Thermal Electrochemical Photo) Generation of Energetic Molecules: A Solar Chemical Process to End Anthropogenic Global Warning, J. Phys. Chem. C, 2009, 113, pp. 16283-16292 (10 pages).
Ijije et al., Carbon Electrodeposition in Molten Salts: Electrode Reactions and Applications, RSC Adv., vol. 4, Aug. 5, 2014; pp. 35808-359817.
Non-English language Chinese Office Action for CN Application No. 201680023833. 7, dated Feb. 2, 2019. (7 pages).
S. Licht, et al. Light invariant, efficient, multiple band gap AltgaAS/Si/metal hydride solar cell, Applied Physics Letters, vol. 74, p. 4055 (1999).

(56) References Cited

OTHER PUBLICATIONS

S. Licht, et al., A New Solar Carbon Capture Process: Solar Thermal Electrochemical Photo (STEP) Carbon Capture, The Journal of Physical Chemistry Letters, 2010, pubs acs.org/JPCL, vol. 1, pp. 2363-2368.

S. Licht, "Multiple Band Gap Semiconductor/Electrolyte Solar Energy Conversion", J. Phys. Chem B 2001, 105, 6281-6294.

S. Licht, Optimizing Photoelectrochemical Solar Energy Conversion: Multiple Bandgap and Solution Phase Phenomena, Technion—Israel Institute of Technology, pp. 359-391.

Solar Thermal Electrochemical Production of Fuels, Metals, Bleach, Adv. Mater.

Supplementary European Search Report for EP Applicalion No. 16756506.8, dated Oct. 12, 2018, (7 pages).

U.S. Department of Energy, Energy Tips—Process Heating, Nov. 2007, downloaded on Dec. 6, 2016 from http://energy.gov/sites/prod/files/2014/f16/et_preheated.pdf (2 pages).

Written Opinion in corresponding International Application No. PCT/US2016/019918, dated Jun. 9, 2016 (9 pages).

Written Opinion of the International Searching Authority; International Application No. 8924 PCT/US11/24576; International Filing Date: 2011-02-11; Date of mailing: 2011-04-25; 5 pages.

Ota et al., "Solubilities of Nickel Oxide in Molten Carbonate", *J. Electrochem. Soc.*, 1992, 667-671.

\* cited by examiner

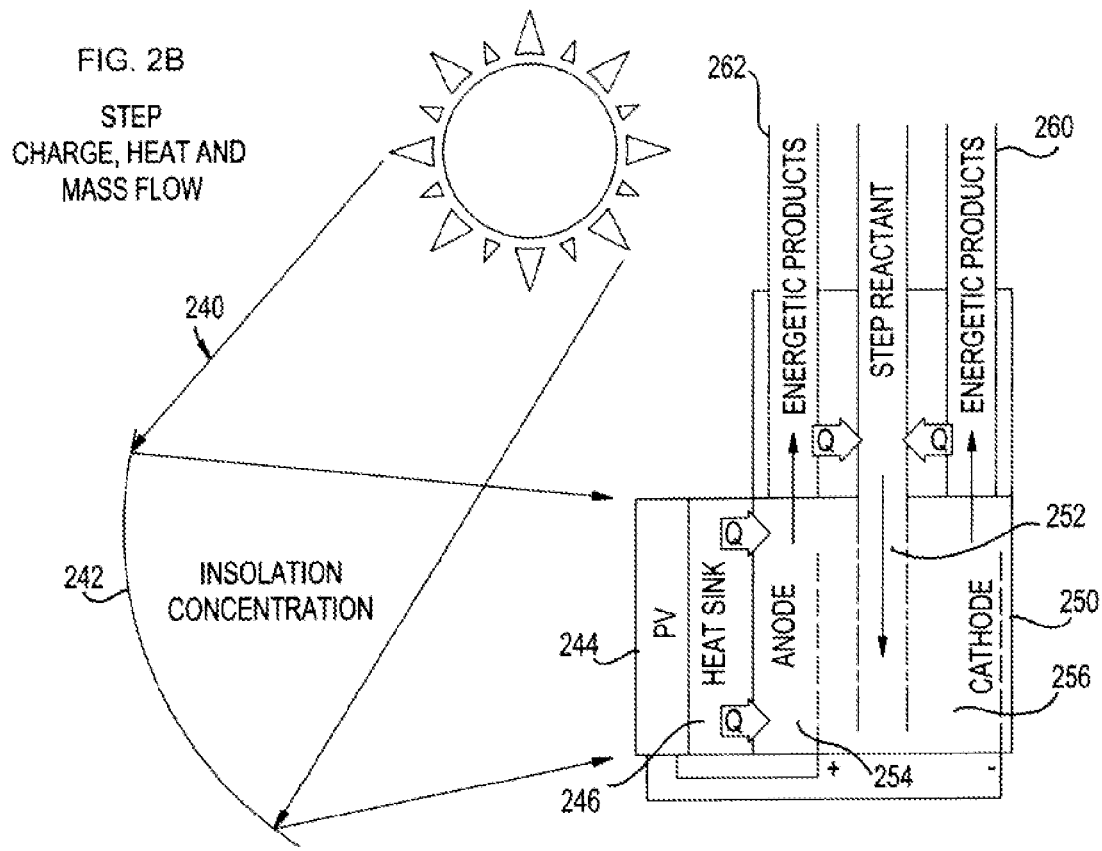
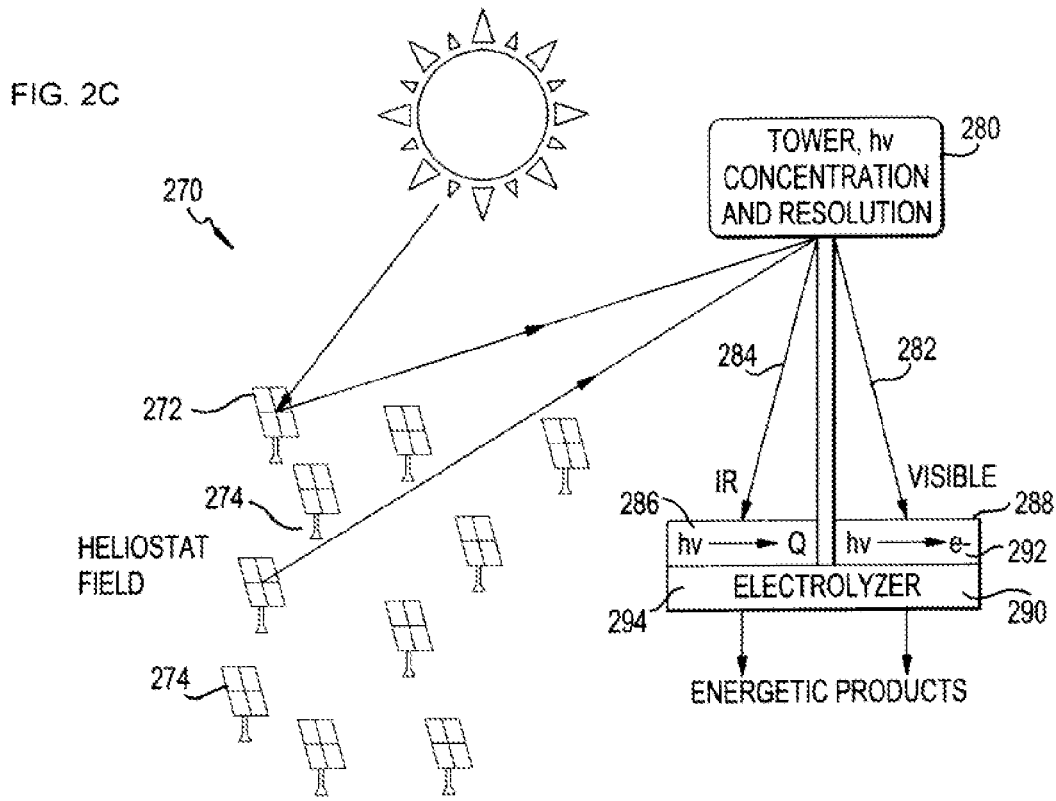

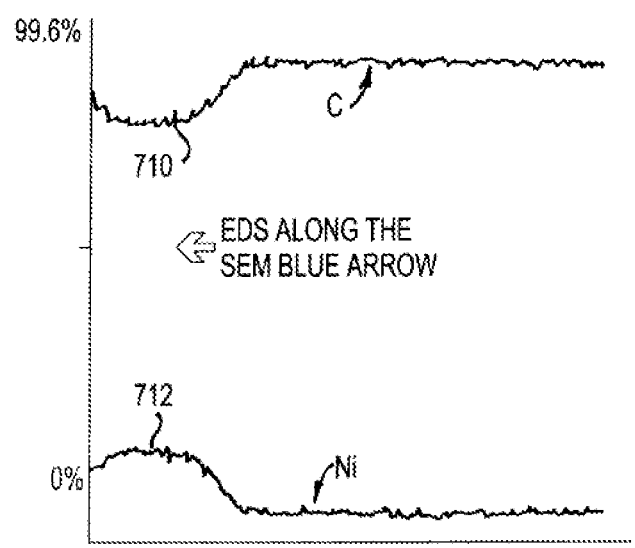

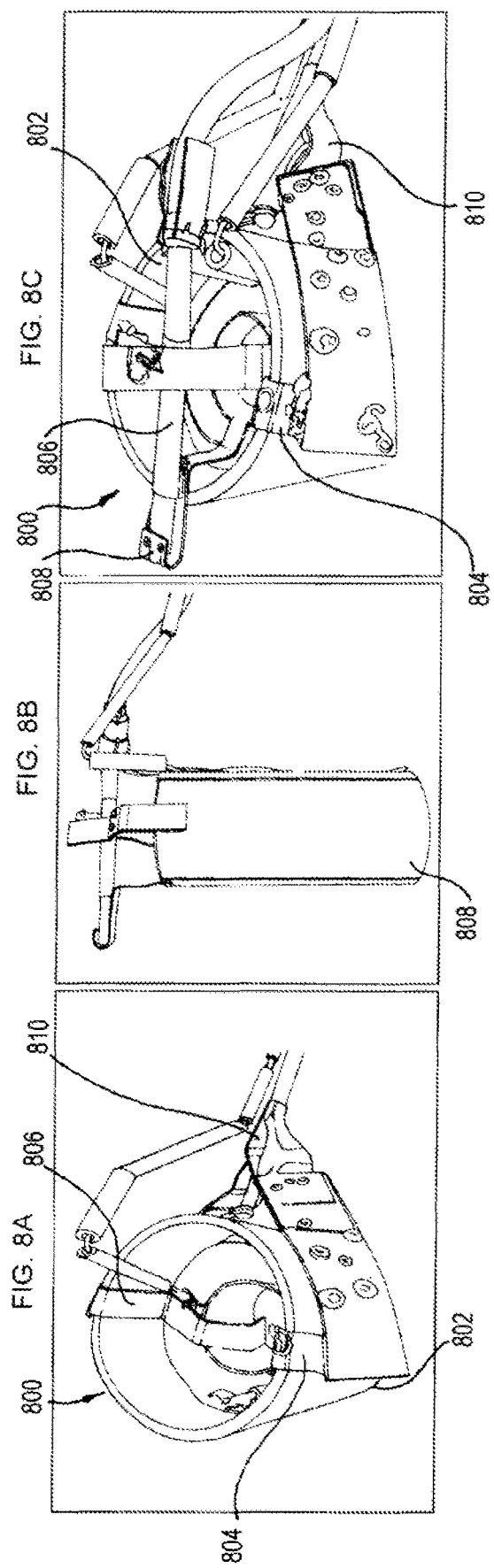
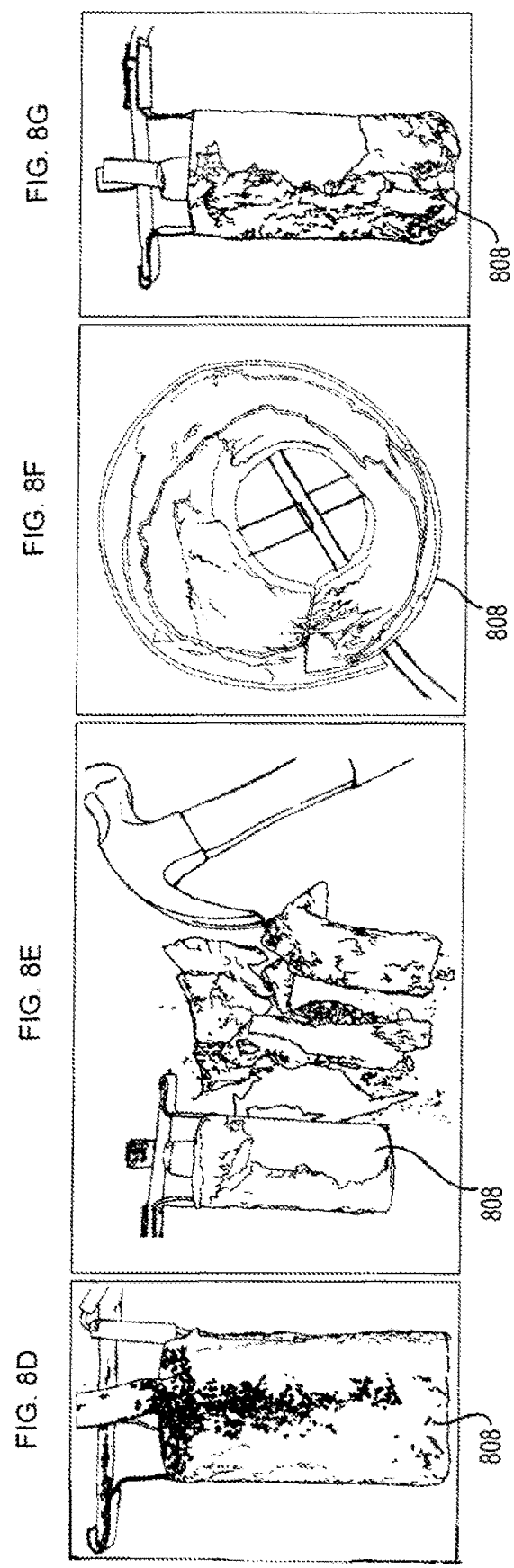

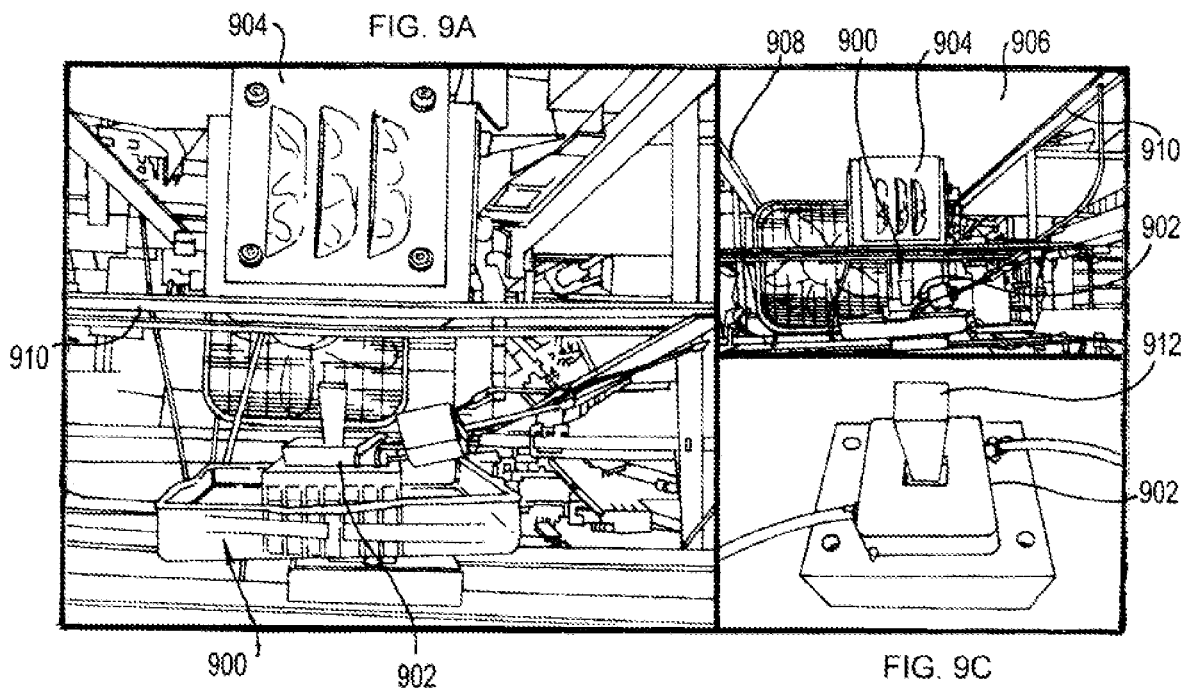
FIG. 9A
FIG. 9B
FIG. 9C
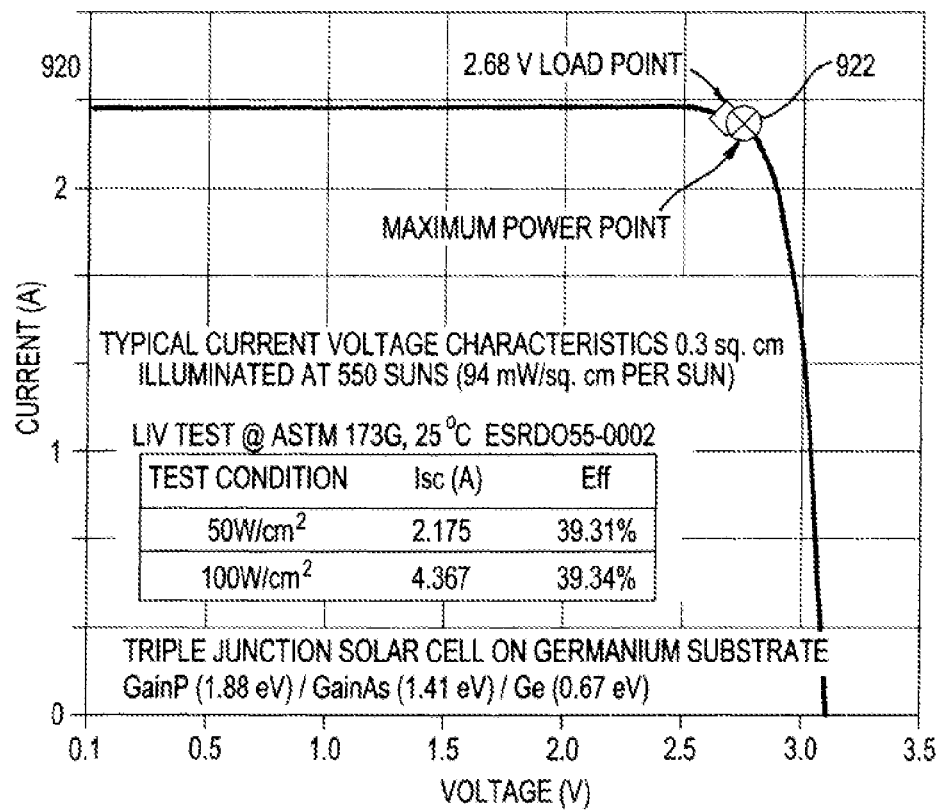
FIG. 9D

METHODS AND SYSTEMS FOR CARBON NANOFIBER PRODUCTION

RELATED APPLICATIONS

The present application is a continuation of PCT/US2016/056599, filed Oct. 12, 2016, and is a continuation-in-part of PCT/US2016/019918, filed Feb. 26, 2016, which claims priority to U.S. Provisional Application No. 62/120,951, filed on Feb. 26, 2015, and U.S. Provisional Application No. 62/240,805, filed on Oct. 13, 2015. The present application claims priority to U.S. Provisional Application No. 62/240,805, filed Oct. 13, 2015. The entire content of those applications are hereby incorporated by reference in their entirety.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention relates generally to the production of carbon nano-materials, and specifically to production of carbon nano-materials from providing electrolysis of molten carbonate while mixing in $CO_2$ to separate the carbon and oxygen.

BACKGROUND

The global warming consequences of increasing atmospheric carbon dioxide concentrations are well established as witnessed by glacier and ice cap loss, sea level rise, droughts, hurricanes, species extinction, and economic loss. Carbon nano-materials such as carbon nano-fibers are increasingly used in high strength, composite building materials ranging from top-end sports equipment to lightweight car and airplane bodies. Carbon nano-fibers not only bind $CO_2$, but when produced from $CO_2$, eliminate the massive $CO_2$ emissions associated with the production of steel, aluminum, and cement, and will further decrease emissions by facilitating both wind turbines and lightweight, low carbon footprint transportation. However, whereas the value per ton of coal is around $60 and graphite is around $1,000, carbon nano-fiber ranges from $20,000 to $100,000 per ton. Today, carbon nano-fibers require 30 to 100 fold higher energy to produce compared to aluminum. The efficient or high yield production of carbon nano-tubes and nano-fibers by electrolysis in molten lithium carbonate is conventionally thought to be impossible.

Prior to the recognition of a variety of unique carbon nanoscopic structures such as fullerenes, nano-tubes, and nano-fibers starting in 1985, the reduction of carbonates to (macroscopic) carbons in inorganic molten electrolytes from hydroxides and a barium chloride/barium carbonate melt was recognized as early as the late 1800s. Today, the principal methods of carbon nano-fiber preparation are spinning of polymer nano-fiber precursors followed by carbonization heat treatment and catalytic thermal chemical vapor deposition (CVD) growth. CVD growth of carbon nano-fibers is catalyzed by metals or alloys, which are able to dissolve carbon to form metal carbides including nickel, iron, cobalt, chromium, and vanadium. Low levels of the catalyst relative to the carbon nano-fibers are required, and prominent catalyst nanoparticles are observed at the fiber tip, as well as catalyst clusters along the fiber that has migrated during carbon nano-fiber growth. A variety of carbon nano-fiber morphologies have been observed including linear, coil, and sphere clustered carbon nano-fibers. These techniques have been expensive, are difficult to implement on a large scale, and result in the current high cost of the carbon nano-fibers.

The electrochemical synthesis of carbon nano-fibers has not been widely explored. Solid carbon electrodes have been electrolytically converted to nanostructures such as nano-tubes in molten halide solutions via alkali metal formation, intercalation into, and exfoliation of the carbon. Instead of the conversion of solid carbon, the rate of the direct reduction of $CO_2$ studied with carbon and platinum electrodes is limited by the low solubility of $CO_2$ in molten halides requiring high (15 atm) $CO_2$ pressure and is accompanied by corrosion of the electrodes. A study of 5-10% $Li_2CO_3$ in molten chloride concluded that production of carbon nano-tubes and nano-fibers by electrolysis in molten lithium carbonate is impossible because reduction and deposition of carbon occur instead of lithium discharge and intercalation into the cathode.

Thus, there is a need for an efficient method of producing carbon nano-materials from molten carbonate materials. There is also a need to produce carbon nano-materials from a solar powered heating and electrolysis system. There is a need to provide alternative carbon nano-material transition metal nuclei growth paths from molten $Li_2CO_3$ to facilitate growth of carbon nano-materials from electrolysis.

SUMMARY

According to one example, a system to produce carbon nano-materials is disclosed. The system includes an electrolysis chamber to accept carbonate. The chamber is heated to produce molten carbonate. The heating can be provided by solar power, by a hot $CO_2$ source, or by a combination of the two. An electrolysis device has an anode and a cathode to apply electrolysis to the molten carbonate. A disperser forms a transition metal nucleating agent on the cathode to accumulate carbon nano-materials.

Another disclosed example is a method of producing into carbon nano-materials. Carbonate is heated to produce molten carbonate. An anode and a cathode are inserted into the molten carbonate. A transition metal nucleating agent is provided in the molten carbonate. Electrolysis is provided between the anode and the cathode to form carbon nano-materials at the cathode from nucleation sites.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 2B is a detailed diagram of an alternate solar powered heating and electrolysis system used in the system of FIG. 1;

FIG. 2C is a detailed diagram of a tower-based solar powered heating and electrolysis system used in the system of FIG. 1;

FIG. 7D is an electron dispersive spectroscopy showing carbon content and nickel content from a nucleation site on the cathode of the electrolysis process;

FIGS. 8A-8G show a test electrolysis chamber and related elements to produce carbon nano-materials;

FIG. 9A-9C show a concentrated photo voltaic system that may be used to power the electrolysis process to produce carbon nano-materials;

FIG. 9D is a power curve graph of the concentrated photo voltaic system in FIG. 9A-9C;

Figure 1:
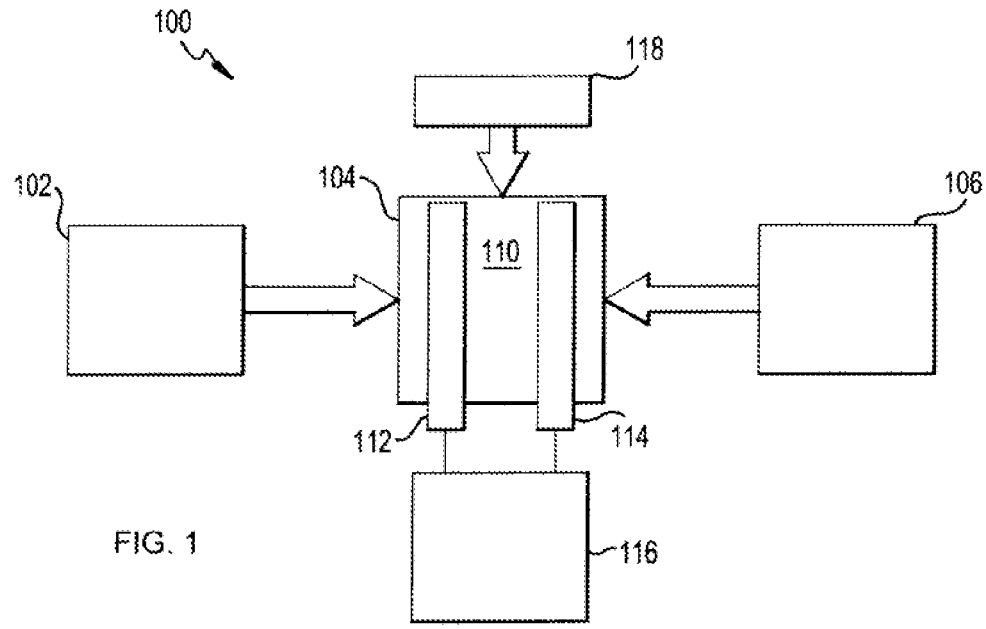
FIG. 1 is a block diagram of an electrolysis system to produce carbon nano-materials from carbonate.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Molten carbonates, such as pure $Li_2CO_3$ (having a melting point of 723° C.) or lower melting point carbonate eutectics such as $LiNaKCO_3$ (having a melting point of 399° C.) or $LiBaCaCO_3$ (having a melting point of 620° C.), when mixed with highly soluble oxides, such as $Li_2O$ and $BaO$, sustain rapid absorption of $CO_2$ from the atmospheric exhaust $CO_2$. Carbonates include alkali and alkali earth carbonates. The alkali carbonate may include lithium, sodium, potassium, rubidium, cesium, or francium carbonates or mixtures of these. The alkali earth carbonates may be beryllium, magnesium, calcium, strontium, barium, or radium carbonates or mixtures of these.

Equilibrium constraining lithium or lithium/barium oxide absorption has been presented, and the lithium case is described as:

$$CO_2 + Li_2O \approx Li_2CO_3 \qquad (1)$$

Air contains 0.04% $CO_2$, this is only $1.7 \times 10^{-5}$ mol of tetravalent carbon per liter, whereas molten carbonate contains about 20 mol of reducible tetravalent carbon per liter. A separate process to concentrate atmospheric $CO_2$ is not needed in the thermal electrochemical process. Hence, by absorbing $CO_2$ from the air, molten carbonates provide a million-fold concentration increase of reducible tetravalent carbon available for splitting (to carbon) in an electrolysis chamber. Carbonate's higher concentration of active, reducible tetravalent carbon sites logarithmically decreases the electrolysis potential and can facilitate charge transfer at low electrolysis potentials. $CO_2$ is bubbled into the molten carbonate, and during electrolysis, oxygen is evolved at the anode while a thick solid carbon builds at the cathode. As will be explained below, the resulting thick solid carbon may be carbon nano-materials such as carbon nano-fibers or carbon nano-tubes.

A transition metal nucleating agent is added during electrolysis of the molten carbonate. The transition metal creates nucleation sites that allow the growth of the carbon nano-materials. Example transition metal nucleating agents include nickel, iron, cobalt, copper, titanium, chromium, manganese, zirconium, molybdenum, silver, cadmium, vanadium, tin, ruthenium, or a mixture therein.

FIG. 1 is a perspective view of an example system 100 that produces carbon nano-materials from carbonate materials and injected $CO_2$. The system 100 includes a carbonate heat source 102 (such as a furnace), an electrolysis chamber 104, and a collector 106. Although the heat source 102, the electrolysis chamber 104, and collector 106 are shown as separate components in FIG. 1, it is to be understood that they can be in the same physical structure. The electrolysis chamber 104 includes a chamber 110 that holds molten carbonate produced by heating carbonate with the heat source 102. An anode 112 and a cathode 114 are coupled to a power source 116. The anode 112 and the cathode 114 are inserted in the chamber 110. $CO_2$ is injected into the molten carbonate from a $CO_2$ source 118. The $CO_2$ can be injected, for example, to mix quickly with the electrolyte, that is by being blown over, pumped though, or bubbled such as by gas sparging into the electrolyte. The $CO_2$ is injected into the molten carbonate to react with the oxide and renew, rather than consume, the carbonate, for the overall electrolysis reaction as $CO_2$ converted to $O_2$ at the anode 112 and carbon nano-materials at the cathode 114. As will be explained below, there may be a variety of $CO_2$ sources for the $CO_2$ source 118. As will be explained below, the heat source heats a carbonate such as pure $Li_2CO_3$ to the respective melting point to produce molten carbonate. Transition metal is added via a disperser that may be the anode to serve as a nucleation agent. The molten carbonate is subjected to electrolysis by being inserted between the anode 112 and the cathode 114 in the electrolysis chamber 104. The resulting reaction separates carbon from the carbonate and leaves carbon product on the cathode 114 from the nucleation sites. The resulting carbon product is collected in the collector 106 while oxygen is produced on the anode 112.

Figure 2A:
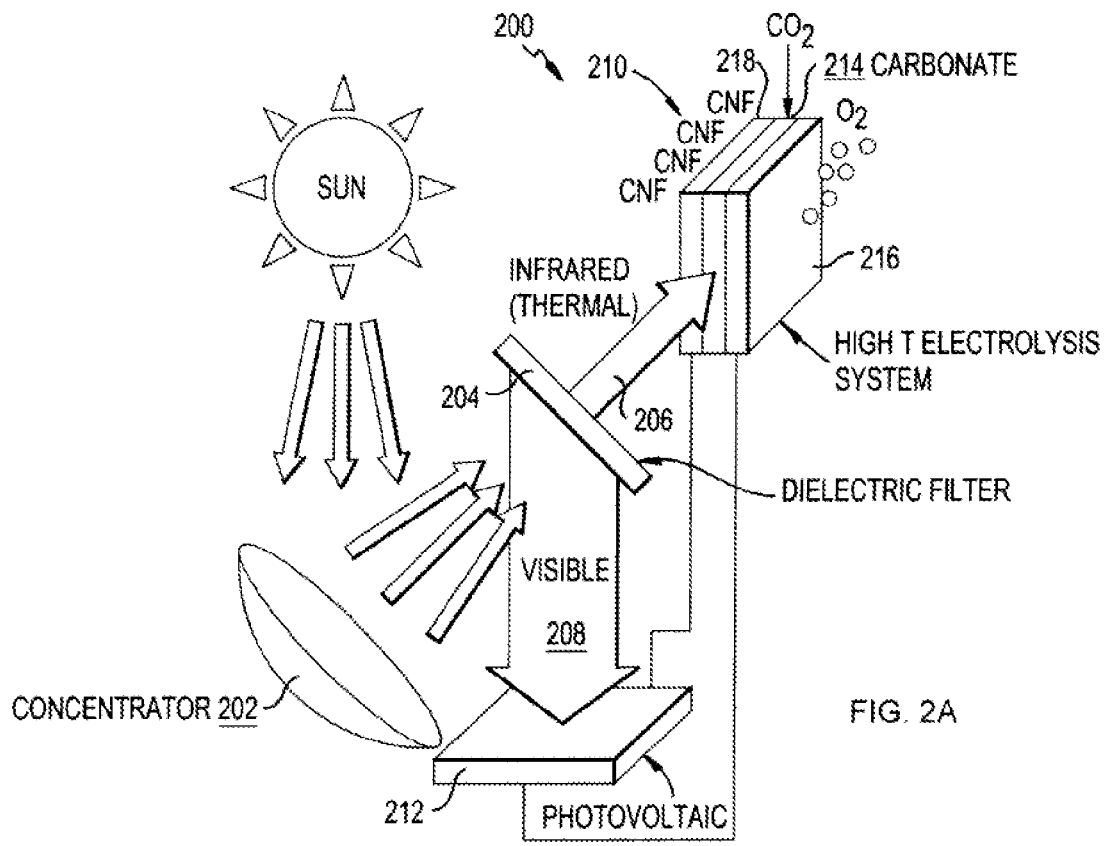
FIG. 2A is a detailed diagram of a solar powered heating and electrolysis system used in the system of FIG. 1.

FIG. 2A is a diagram of a solar powered furnace and electrolysis chamber system 200 that may be used for a solar thermal electrochemical process performed by the system in FIG. 1. The system 200 includes a concentrator 202 and a dielectric filter 204 (also referred to as a hot/cold mirror). The wavelength at which light is reflected or transmitted through the filter is tuned by the dielectric filter 204. The concentrator 202 is aligned to receive solar rays and focuses the rays to the dielectric filter 204. The concentrator 202 may be a short path length solar concentrator such as a parabolic mirror, or a convex lens or a Fresnel lens. The dielectric filter 204 separates the light into visible light 208 and infrared light 206. The dielectric filter 204 may be a hot mirror optical element. The system 200 includes a furnace/electrolysis chamber 210. The furnace/electrolysis chamber 210 is a combined furnace 102 and electrolysis chamber 104 in FIG. 1. The infrared thermal light 206 is used to provide heat energy for the furnace/electrolysis chamber 210. The visible light 208 is directed to produce electrical energy via a photovoltaic cell 212.

Carbonate material 214 such as pure $Li_2CO_3$ is inserted in the electrolysis chamber 210. The carbonate material is heated to produce molten carbonate. The electrolysis chamber 210 includes an anode 216 and a cathode 218. The anode 216 and the cathode 218 are coupled to the electrical output of the photovoltaic cell 212 to provide electrolysis to the molten carbonate. In this example the anode 216 is a transition metal stable to hot oxygen evolution such as nickel, iridium, or a nickel alloy and the cathode 218 is steel, galvanized steel, nickel, or carbon. Alternatively, transition metal nucleation may be introduced by addition a transition metal into the molten carbonate. In this case the cathode 218 and the anode 216 may also be cobalt, copper, manganese, carbon, iridium, a metal, metal carbon, or alloy resistant to oxidation and sustaining oxygen generation at low overvoltage. $CO_2$ is injected into the electrolysis chamber 210. The electrochemical reaction produces carbon nano-materials via nucleation on nickel sites on the cathode 218 and $O_2$ at the anode 216 as will be explained below.

A solar thermal electrochemical process is capable of generating pure carbon nano-materials such as carbon nano-fibers from atmospheric carbon dioxide using molten carbonate electrolytes. The system 200 in FIG. 2A may be used for the solar thermal electrochemical process.

Alternatives for a solar powered electrolysis system are shown in FIGS. 2B and 2C. FIG. 2B shows a photovoltaic based solar heated and electrolysis system 240. The system 240 includes a concentrator 242 that directs sunlight to a photovoltaic 244. Heat is removed from the photovoltaic 244 via a heat sink 246 and is used to power the heat electrolysis chamber 250. A carbonate material 252 is placed between an anode 254 and a cathode 256 in the chamber 250. The photovoltaic 244 produces electrical energy that produces electrolysis between the anode 254 and the cathode 256. Carbon product 260 is produced on the cathode 256 and oxygen 262 is produced at the anode 254.

FIG. 2C shows a tower-based heat and electrolysis system 270. The system 270 includes a collector array 272 of heliostatic mirrors 274 surrounding a tower 280. The mirrors 274 are mounted on actuators to track the sun and reflect and concentrate sunlight at a central point on the tower 280. The sunlight is split into the visible concentrated sunlight 282 (to drive concentrator photovoltaics providing electronic charge to the electrolyzer) and thermal sunlight 284 (providing heat to the heat the electrolyzer) by the tower 280. The thermal sunlight 284 is directed toward a heat concentrator 286 that provides heat energy to a combined heated electrolyzer 290. The heated electrolyzer 290 heats carbonate to produce molten carbonate. The visible concentrated sunlight 282 is directed to a photovoltaic cell 288 that provides power for the electrolysis of molten carbonate. $CO_2$ is bubbled into the molten carbonate. The heated electrolyzer 290 includes an anode 292 and a cathode 294 powered by the photovoltaic cell 288 that are used for electrolysis applied to the molten carbonate. Carbon nano-materials are produced on the cathode 294 while oxygen is produced at the anode 292.

Figure 3A:
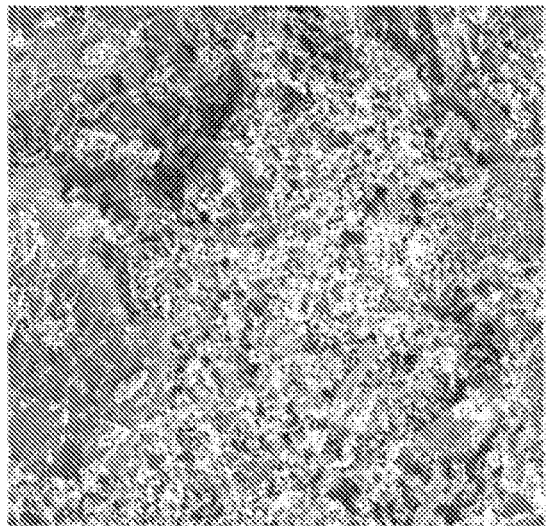
FIGS. 3A-3D are SEM images at different magnifications of carbon materials formed in a zero nickel environment from electrolysis of molten carbonate.
Figure 3B:
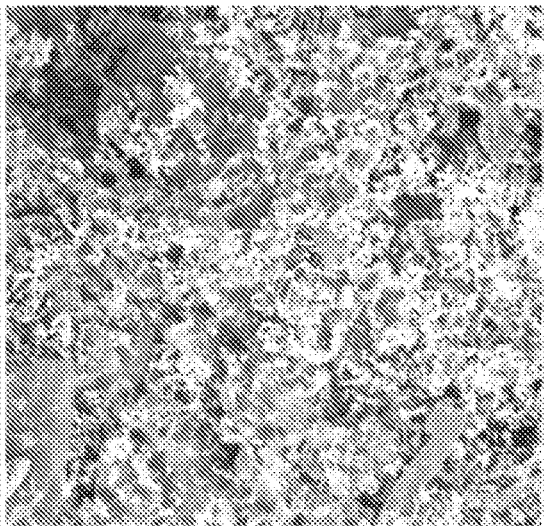
Figure 3C:
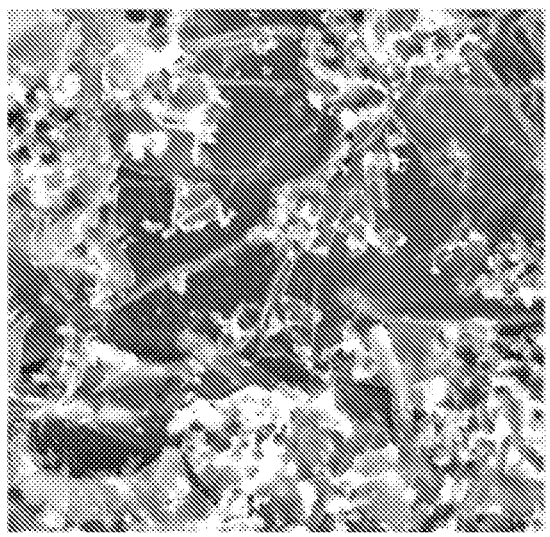
Figure 3D:

FIG. 3A-3D each show a scanning electron microscope (SEM) image of a washed cathode carbon product subsequent to a nickel-free, 1.5 hour, 1 A constant current electrolysis in 730° C. molten $Li_2CO_3$ with 6 m $Li_2O$ using a 10 $cm^2$ platinum foil anode and a 10 $cm^2$ coiled steel wire (0.12 cm diameter) cathode, in a Ni-free crucible. Each image in FIGS. 3A-D shows the carbon product produced at the cathode at different magnifications. FIG. 3A shows the carbon product at 900× X magnification, FIG. 3B shows the carbon product at 1700× magnification, and FIG. 3C shows the carbon product at 4400× magnification. FIG. 3D shows a variety of different carbon products at 4400× magnification at another part of the cathode than that shown in FIGS. 3A-3C. These images show that the carbonate is readily split to carbon approaching 100% coulombic efficiency at molten carbonate temperatures of 750° C. and below. Coulombic efficiency is determined by comparing the moles of applied charge to the moles of product formed, where each mole of product formed depends on four moles of electrons. This is the case unless hydroxides are mixed with the carbonate, whereupon $H_2$ and carbon products are co-generated. High current densities of less than 1 amp $cm^{-2}$ for carbon formation are sustained, and similar sustained currents occur with carbon, platinum, nickel, or steel cathodes (the latter effectively become carbon electrodes during the deposition).

Via the Faraday equivalence, application of 1 A $cm^{-2}$ current density in the above process will remove 36 tons of carbon dioxide per $m^2$ of cathode area per year. Full cell electrolysis potentials range from ~1V under conditions of high temperature (e.g., 800° C.), low current density (e.g., 10 mA $cm^{-2}$), and high oxide concentration (e.g., 6 molal $Li_2O$), to several volts. Conditions that increase carbonate electrolysis voltage are high current density, lower temperature, lower viscosity, or lower oxide concentration.

At higher temperatures, the product gradually shifts to a mix of carbon and carbon monoxide, and it becomes pure CO by 950° C. The respective 4- or 2-electron processes are given by:

$$Li_2CO_3 \rightarrow C + Li_2O + O_2; \text{ net with equation } 1: CO_2 \rightarrow C + O_2 \quad (2)$$

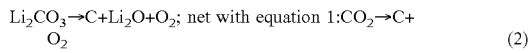

$$Li_2CO_3 \rightarrow CO + Li_2O + \tfrac{1}{2}O_2; \text{ net with equation } 1: CO_2 \rightarrow CO + \tfrac{1}{2}O_2 \quad (3)$$

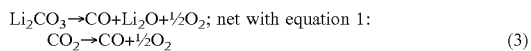

Electrolysis, either via equation 2 or equation 3, releases $Li_2O$ to permit continued absorption of carbon dioxide. The result of equation 1 is that the $CO_2$ is split and oxygen is released while carbon is collected on the cathode. The result of equation 2 is that the $CO_2$ is split and oxygen is released while carbon is formed at the cathode. The result of equation 3 is that the $CO_2$ is split and oxygen is released while CO gas is released at the cathode.

The SEM images in FIGS. 3A-3D evidence no carbon nano-fibers in the carbon product deposited at the cathode subsequent to carbonate electrolysis in a nickel-free environment where $Li_2CO_3$ is heated at 730° C. with 6 molal $Li_2O$ utilizing a platinum anode rather than a nickel anode. Amorphous and platelet structures are seen, with the platelets indicative of partially formed multi-layered graphene/graphite. Electron dispersive spectroscopy elemental analysis indicates that the amorphous and platelet structures are composed of greater than 99% carbon. Similarly, carbon nano-fiber formation was not observed in the cathode product when the electrolysis was instead conducted with a nickel anode in a corrosion-free lower temperature of 630° C. with a $Li_{1.6}Ba_{0.3}Ca_{0.1}CO_3$ electrolyte.

The effect of forming carbon at the cathode and oxygen at the anode occurs during carbonate electrolysis performed using the systems in FIG. 1 or FIG. 2A-2C. As demonstrated here, these anode effects are highly specific and can promote significant carbon nano-material formation using the systems shown in FIGS. 1 and 2. The type and characteristics of the carbon nano-material depend on the current level, the composition of the electrolyte, temperature, viscosity, and the amount of transition material. The carbon nano-materials may include carbon nano-fibers or carbon nano-tubes.

The anodes in FIGS. 1-2 may be composed of platinum, iridium, and nickel, each of which may be effective as oxygen generating anodes for the carbon nano-material production process. Whereas iridium exhibits no corrosion following hundreds of hours use in molten carbonates, the extent of nickel corrosion is determined by the cation composition of the carbonate electrolyte. A nickel anode undergoes continuous corrosion in a sodium and potassium carbonate electrolyte, it is stable after initial minor corrosion in lithium carbonate electrolytes, and no corrosion of the nickel anode is evident in barium/lithium carbonate electrolytes. As will be explained, nickel corrosion allows the introduction of nickel into the electrolyte as a nucleating agent that allows formation of carbon nano-materials. In lithium carbonate electrolytes, the low rate of nickel corrosion at the anode is a function of anode current density, electrolysis time, temperature, viscosity, and lithium oxide concentration. The nickel loss from a 100 mA cm$^{-2}$ nickel anode in $Li_2CO_3$ at 750° C. with 0 or 5 molal added $Li_2O$ is respectively 0.5 or 4.1 mg cm$^{-2}$ of the anode subsequent to 600 seconds of electrolysis, and increases to 4.6 or 5.0 mg cm$^{-2}$ subsequent to 1200 or 5400 seconds of electrolysis. The nickel loss increases to 7.0 mg or 13.8 mg cm$^{-2}$ respectively subject to higher current density (1000 mA cm$^{-2}$) or higher temperature (950° C.). Each of these nickel losses tends to be negligible compared to the mass of nickel used in the various wire or shim configured anodes. Nickel oxide has a low solubility of 10$^{-5}$ moles NiO per mole of molten $Li_2CO_3$, equivalent to 10 mg nickel per kg $Li_2CO_3$. This low, limiting solubility constrains some of the corroded nickel to the anode surface as a thin oxide overlayer, with the remainder as soluble oxidized nickel available for reduction and redeposition at the cathode.

Figure 4A:
FIG. 4A-4F are SEM images of deposited iron particles produced by different current densities for electrolysis of molten carbonate.
Figure 4B:
Figure 4C:
Figure 4D:
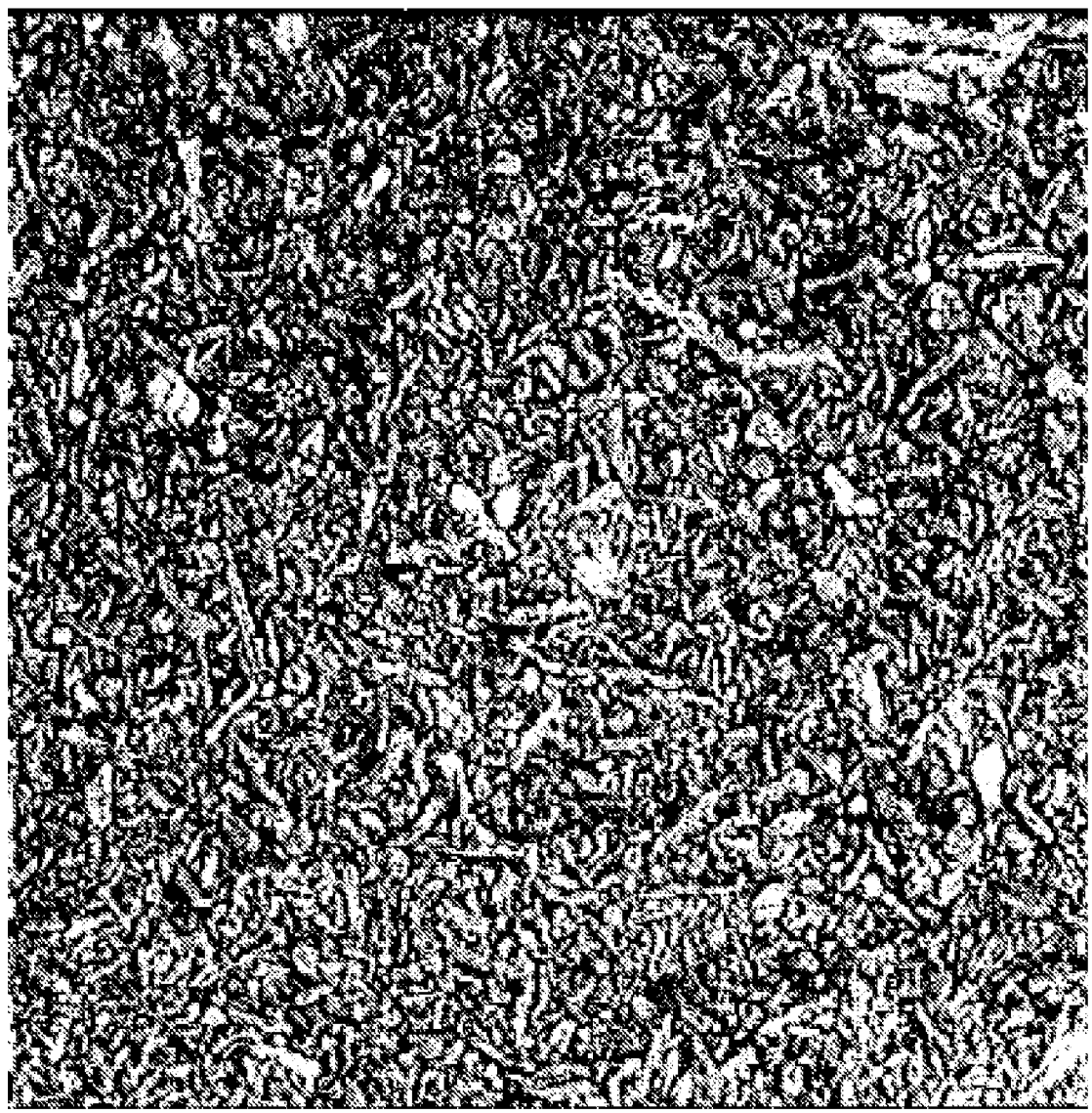
Figure 4E:
Figure 4F:
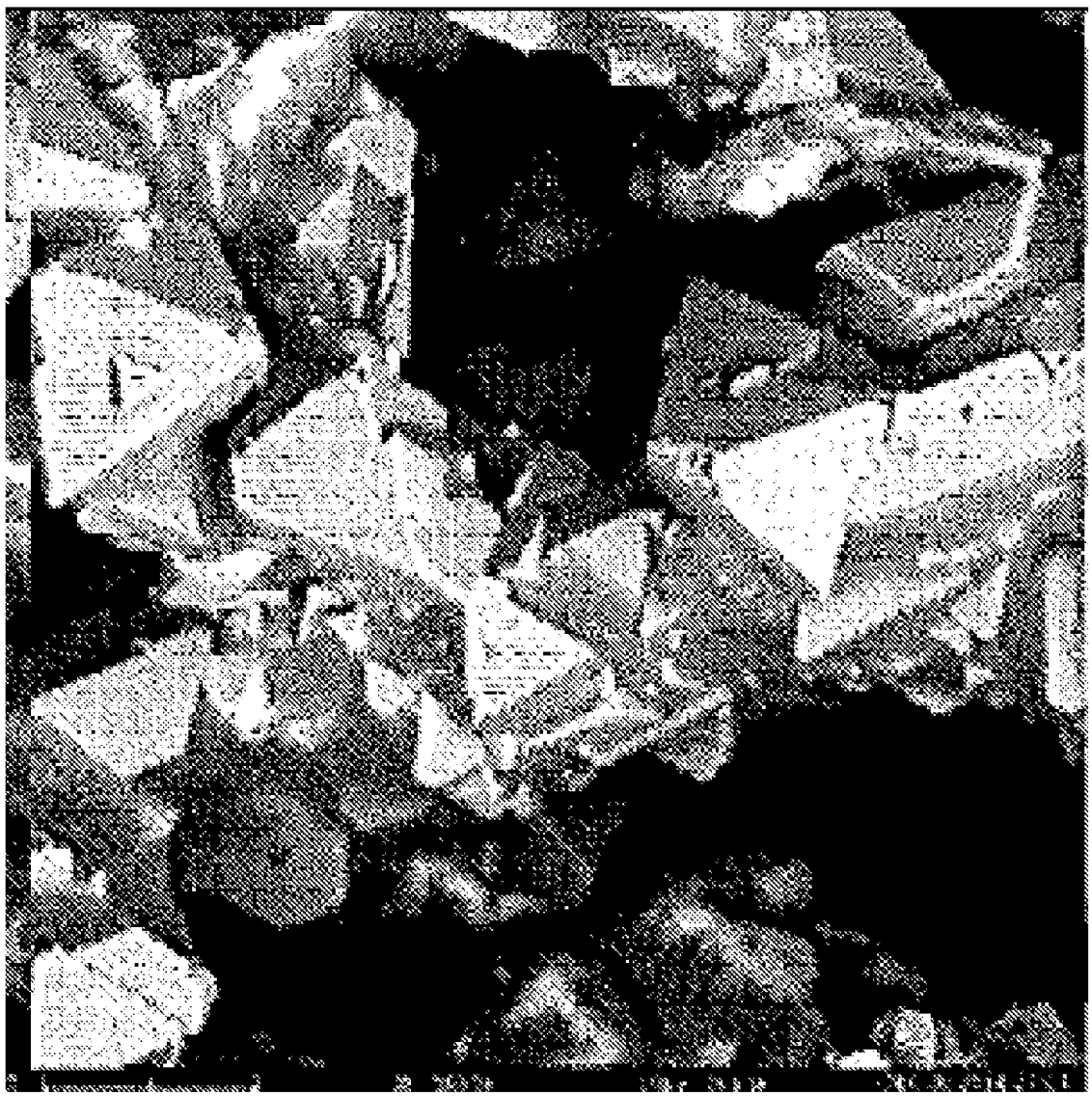

Composition and current density substantially alter the nature of metal electro-deposition from molten carbonate electrolytes. This is easy to observe with a more soluble metal salt, as opposed to one that is less soluble. Iron (oxides), while insoluble in sodium or potassium carbonates, can become extremely soluble in lithiated molten carbonates, with solubility increasing with temperature to over 20% by mass Fe(III) or Fe(II) oxide. FIG. 4A-4F are SEM images of deposited iron produced by different current densities by the carbonate electrolysis process at 730° C. described above using 1.5 m $Fe_2O_3$ and 3 m $Li_2O$ instead of no added $Fe_2O_3$. The iron is formed on the cathode and FIGS. 4A-4F are SEM images of the formed iron particles. FIG. 4A shows relatively large iron particles produced at 0.1 A current electrolysis, FIG. 4B shows relatively smaller iron particles produced at 0.5 A current electrolysis than those in FIG. 4A, FIG. 4C shows iron particles produced at 2.5 A current electrolysis that are smaller particles than those in FIG. 4B, and FIG. 4D shows iron particles produced at 5 A current electrolysis that results in smaller particles than those in FIG. 4C. FIG. 4E shows iron particles produced at 5 A current electrolysis at high magnification and FIG. 4F shows iron particles produced at 5 A current electrolysis at high magnification with a different type of electrolyte, C 1.5 m $Fe_2O_3$ and 6 m LiOH in 650° $Li_{1.34}Ba_{0.08}Ca_{0.1}CO_3$, than that used in the process to produce the carbon showed in FIGS. 4A-4E. The LiOH and lower temperature of this latter electrolyte promotes dissolved water in this latter electrolyte (as $2LiOH \Leftrightarrow Li_2O + H_2O$), which leads to the formation of iron oxide particles in addition to the iron metal product. The images shown in FIGS. 4A-E demonstrate that the size of deposited iron particles varies inversely with current density from molten carbonates at a fixed charge (1 Ah over a 10 cm$^2$ cathode), and that the iron shape is strongly affected by the electrolyte deposition conditions. The image in FIG. 4F shows that different structures of the product at the cathode such as iron or carbon may be produced by a different electrolyte composition. Nickel oxide, unlike iron oxide, exhibits low solubility in lithium carbonate. However, as with nickel, a wide variation of iron deposition with a variation of electrolysis conditions may develop iron as nucleation points to activate carbon nano-fiber growth.

Figure 5A:
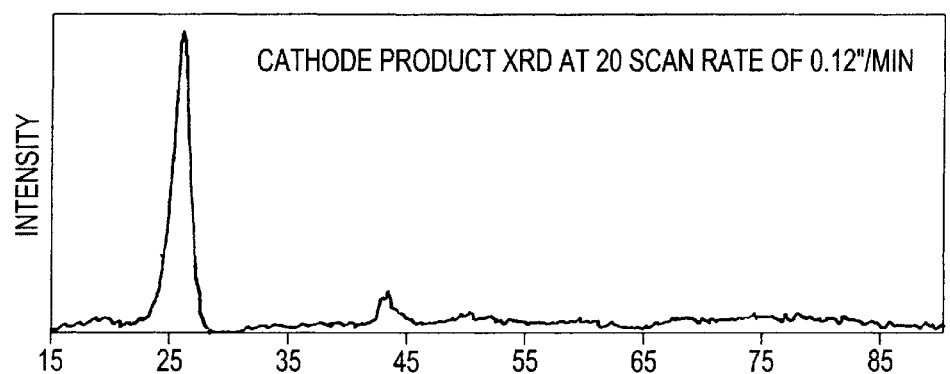
FIG. 5A is an X-ray diffraction graph of carbon product produced with a large nickel content anode in an electrolysis process.

Even a low concentration of nickel originating from corrosion of the anode can result in deposits onto the cathode and catalyze carbon nano-fiber formation. FIGS. 5A-5E show the results of the application of $CO_2$ to produce a diverse range of carbon nano-fibers from a high nickel media anode. In this example, the anode is the inner wall of a 50 ml Ni crucible, at 0.05 A, then 1 A constant current electrolysis for 2 hours in 730° C. molten Li2CO3 with 6 m $Li_2O$ using a 10 cm$^2$ coiled, 0.12 cm diameter steel wire cathode. The testing apparatus is described below in greater detail with reference to FIGS. 8A-8G. FIG. 5A is an X-ray diffraction diagram of an X-ray powder diffraction of the carbon product. FIG. 5A shows that the product produced by these conditions is graphite carbon due to the sharp peak at 26° and a peak at 42°.

Figure 5B:
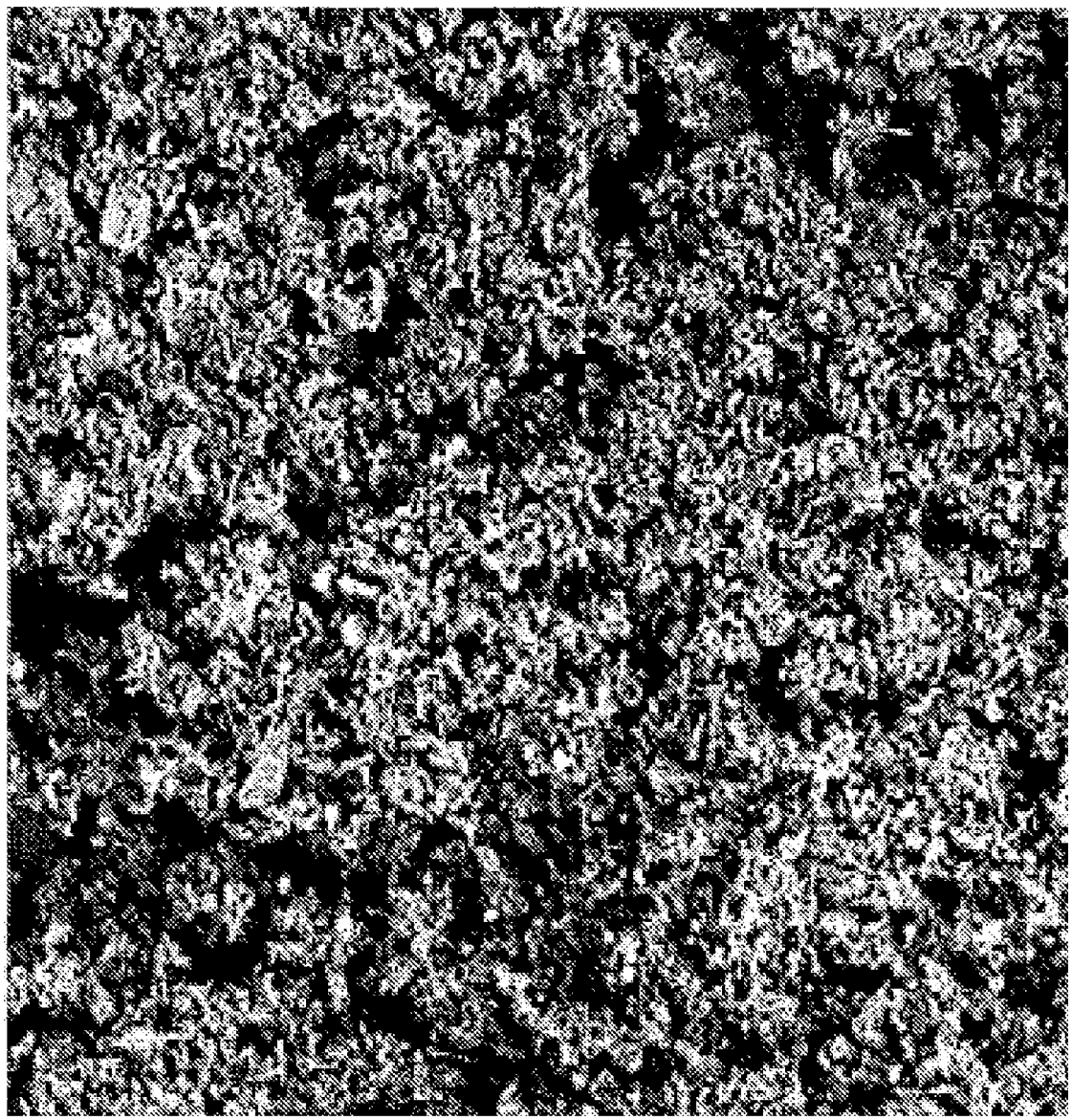
FIG. 5B-5E are SEM images of the carbon product produced with electrolysis using a large nickel content anode showing the variation in carbon fibers produced.
Figure 5C:
Figure 5D:
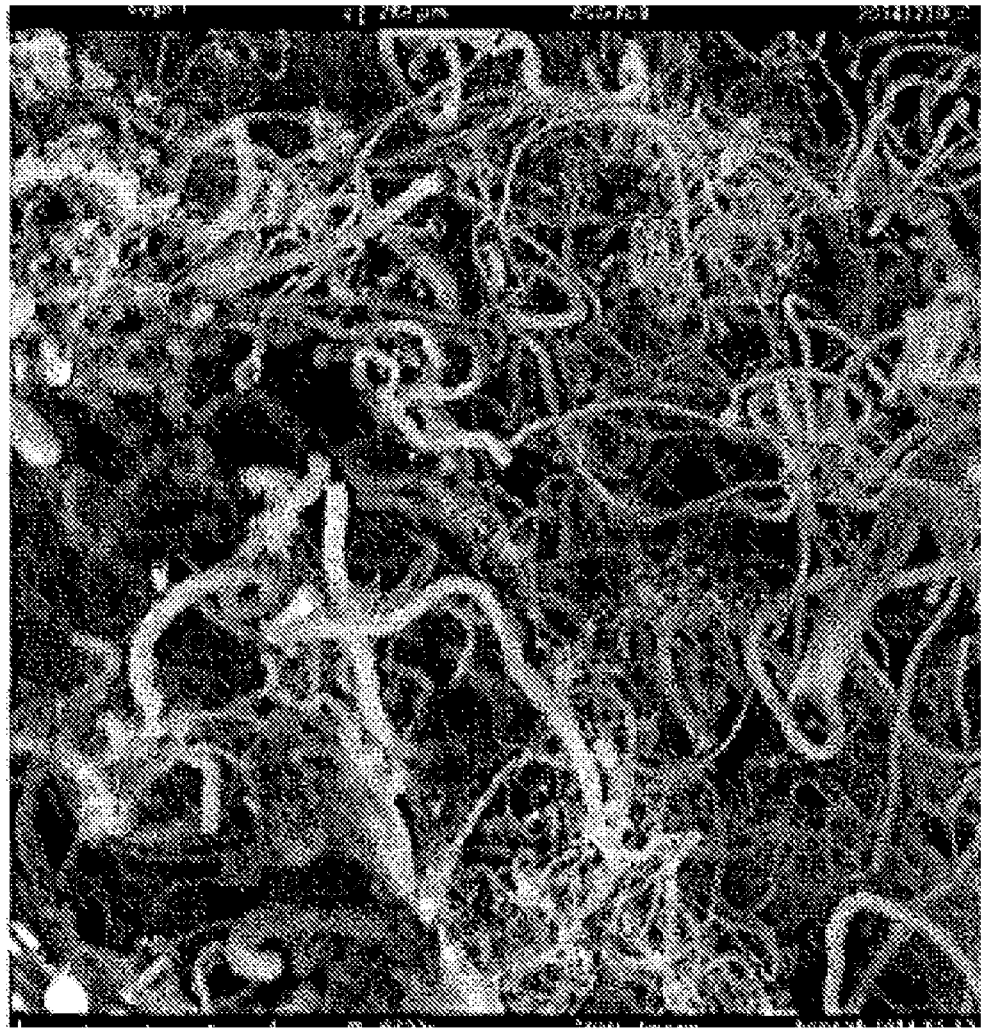
Figure 5E:
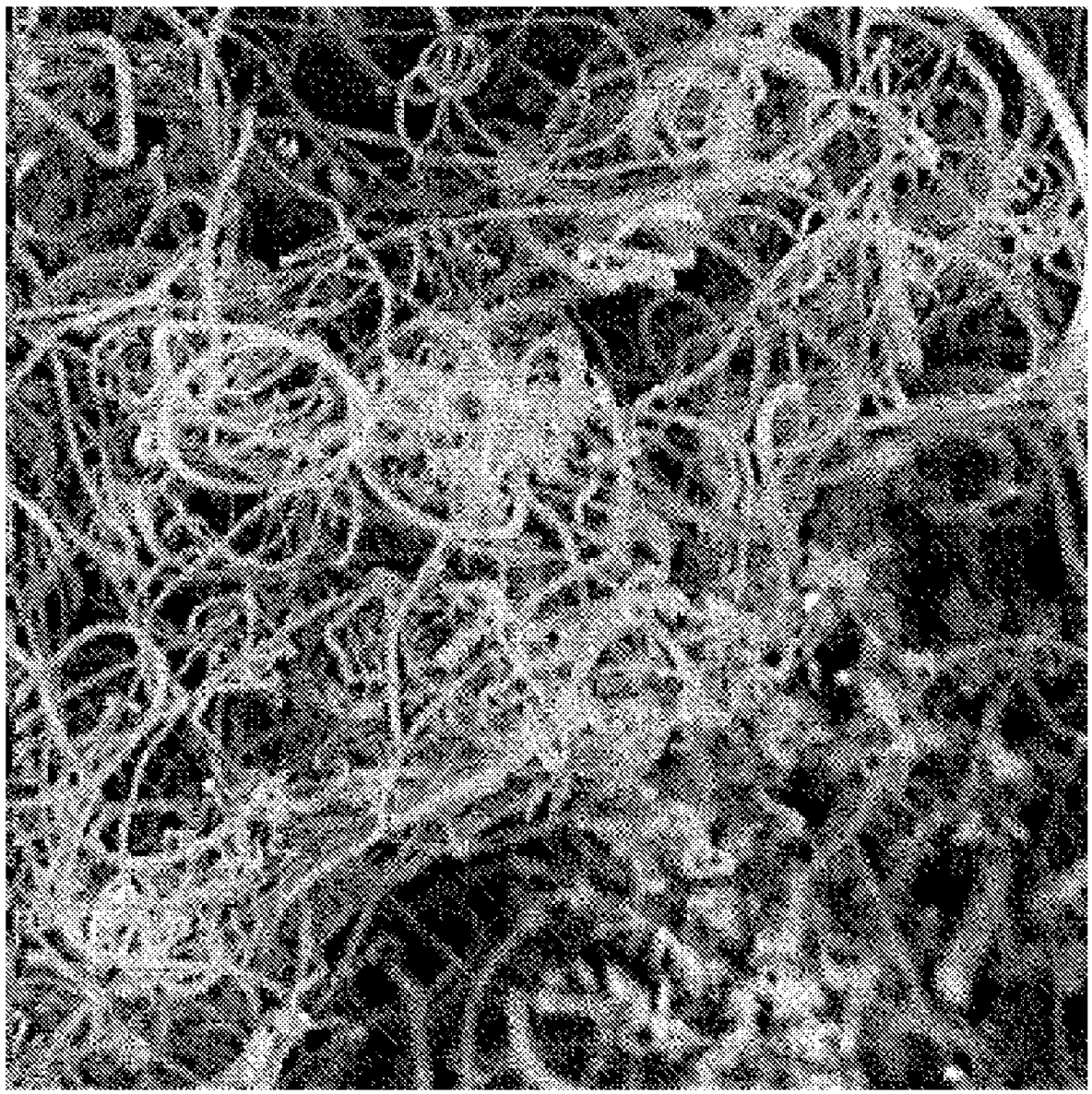

FIGS. 5B-5E are SEM images that show different areas of the washed cathode product subsequent to electrolysis with an oversized nickel cathode of the inner wall of a 50 ml Ni crucible. FIG. 5B is an SEM image at 930×, while FIG. 5C is an SEM image of the same area at 8600×. Consistent tangled carbon nano-fibers with a wide range of diameters are observed throughout as shown in the images in FIG. 5B and FIG. 5C. Typical constant current electrolysis potentials range from 0.5 to 1.5 V as the current density is increased from 0.05 A to 1 A to produce the carbon product shown in FIGS. 5B-5E.

As illustrated in FIGS. 5A-5E, higher nickel release from the anode during the carbonate electrolysis results in a proliferation of carbon nano-fibers of various diameters. However, the amount of nickel released may be controlled due to the proportionality of the amount of nickel released to the size of the anode.

Figure 6A:
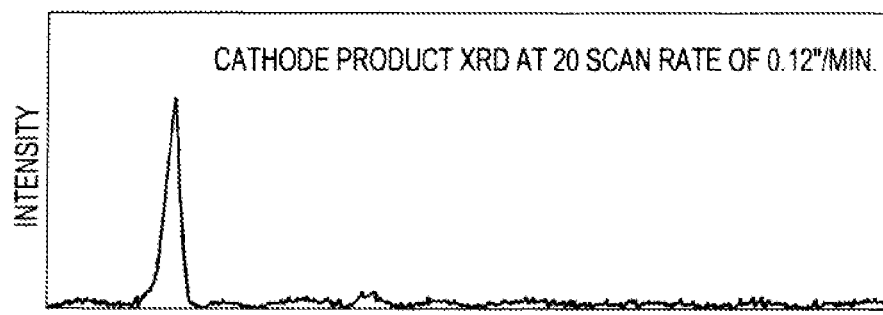
FIG. 6A is an X-ray diffraction graph of carbon product produced with electrolysis using a controlled nickel content anode.

FIGS. 6A-6D show the results of application of $CO_2$ to the molten carbonate produce a homogenous set of carbon nano-fibers from controlled nickel media from the anode in the electrolysis process described above. The controlled nickel media in the anode acting as a nucleating agent results in a homogenous set of carbon nano-fibers formed while bubbling $CO_2$, into the molten carbonate where 6 m is added $Li_2O$ electrolyte. FIG. 6A is an X-ray powder diffraction graph of the carbon product produced using a smaller nickel cathode (the inner wall of a 20 ml Ni crucible as will be explained in FIGS. 8A-8G), 0.05 A, then 1 A constant current electrolysis in 730° C. molten $Li_2CO_3$ with 6 m $Li_2O$ using a 10 cm² coiled steel wire anode of 0.12 cm diameter. The X-ray powder diffraction graph in FIG. 6A shows a smaller peak at 27° and a more flat peak at 42° than the carbon product produced in FIG. 5A. This shows a more uniform carbon product such as carbon nano-fibers from a controlled nickel process. As will be explained below, the carbon nano-fibers are grown from the nickel nucleation points on the cathode.

Figure 6B:
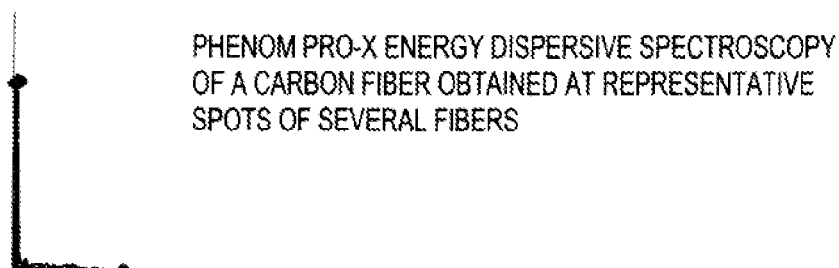
FIG. 6B-6C are energy dispersive spectroscopy graphs of the carbon product produced by electrolysis using a controlled nickel content anode.
Figure 6C:
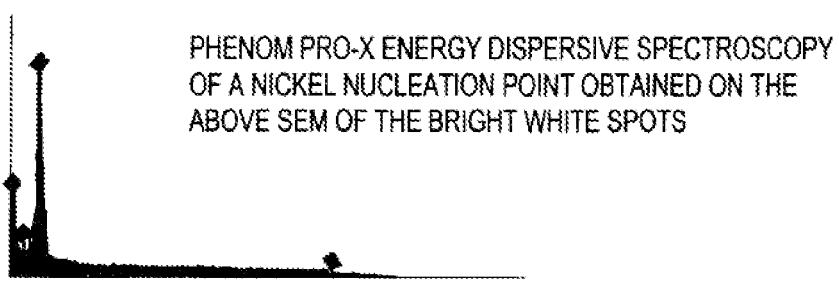
Figure 6D:
FIG. 6D is an SEM image of the carbon nano-fibers produced from electrolysis resulting in nickel nucleation sites on the cathode.

FIG. 6B and FIG. 6C are energy dispersive spectroscopy graphs of the produced carbon nano-fibers. FIG. 6B shows the carbon composition of 100% at the cathode of a grown fiber. In contrast, FIG. 6C shows the nucleation points from high nickel concentrations at the cathode with high nickel content from nickel deterioration at the anode resulting in introduction of nickel into the molten carbonate electrolyte. FIGS. 6B and 6C show the electrolysis process produces nano-fibers of high carbon concentration. FIG. 6D shows a SEM image of the washed cathode carbon product. The image in FIG. 6D shows the process conditions result in the same diameter carbon nano-fibers consistently throughout the sample.

The X-ray powder diffraction graph in FIG. 6A shows that a lower concentration of controlled release of nickel from the anode results in the generation of highly homogeneous, smaller diameter carbon nano-fibers at the cathode. Both carbon products shown in FIG. 5 and FIG. 6 were formed during electrolysis on a steel wire cathode in 730° C. $Li_2CO_3$ with added $Li_2O$. The carbon product shown in FIGS. 5A-5E was generated in a cell containing a purposefully oversized Ni anode, and the wide variety of carbon nano-fibers generated in this single experiment range from ~0.2 to 4 μm in diameter and are up to 100 μm in length.

As seen in the electron dispersive spectroscopy in FIG. 6C, the bright spots are nickel deposits on the cathode. This is consistent with the known alternative CVD carbon nano-fiber growth mechanism, in which nickel acts as nucleation sites to initiate carbon nano-fiber growth. The X-ray diffraction peaks at 26° and 43° are assigned to the hexagonal graphite (002) and diffraction planes (JCPDS card files no. 41-1487) within the carbon nano-fibers specifically, the stacking of parallel graphene layers and the size of graphene layer, respectively.

The predominant carbon nano-fiber cathode product is observed when the electrolysis is initiated at low current density typically, 5 mA cm$^{-2}$, followed by an extended high current density electrolysis such as at 100 mA cm$^{-2}$. The cathode product is principally amorphous and only approximately 25% carbon nano-fiber, when starting directly at only a high (100 mA cm$^{-2}$) current density. Due to its low solubility, and lower reduction potential, nickel originating from the anode is preferentially deposited at low, applied electrolysis currents (5 or 10 mA cm$^{-2}$). This is evidenced by the low observed electrolysis voltage (<0.7V) and sustains the formation of nickel metal cathode deposits, which is useful to nucleate carbon nano-fiber formation. The concentration of electrolytic $[CO_3^{2-}]>>[Ni^{2+}]$, and mass diffusion dictates that higher currents will be dominated by carbonate reduction. The subsequent higher electrolysis voltage thermodynamically required to deposit carbon is only observed at higher applied current densities (>20 mA cm$^{-2}$). Hence, without the initial application of low current, amorphous carbon and graphitic platelets will tend to form, while carbon nano-fibers are readily formed following the low current nickel nucleation activation. In typical high yield carbon nano-fiber electrolyses, the current density is increased from 50 to 1000 mA at a 10 cm$^{-2}$ steel cathode over 15 minutes, followed by a constant current electrolysis at 1000 mA.

The carbon nano-fibers synthesized by the process shown in FIG. 6 utilized the same cathode and same composition electrolyte as in the FIG. 5 synthesis, but with a controlled, limited amount of nickel released to limit the nickel nucleation points forming on the cathode. This is accomplished by using a smaller (by one-third) surface area of nickel anode in the electrolysis cell. The better resolved X-ray diffraction peaks at 43° (100 plane) and 44° (101 plane) in FIG. 6A compared to those in the X-ray diffraction shown in FIG. 5A is evidence of better homogeneity of the carbon nano-fibers synthesized under the nickel limited conditions by the process resulting in the SEM image in FIG. 6D. As illustrated in FIG. 6D, a lower concentration of controlled release of nickel results in the generation of highly homogeneous carbon nano-fibers with a smaller, consistent diameter of ~0.2 μm.

The carbon nano-materials produced from high nickel electrolysis shown in the images in FIGS. 5B-5E present a proliferation of tangled carbon nano-fibers of a wide variety of diameters. The low nickel electrolysis carbon nano-materials shown in the SEM image in FIG. 6D show a tangle of homogeneous-diameter carbon nano-fibers. Each of those electrolyses utilized a molten $Li_2CO_3$ electrolyte with 6 m added (dissolved) $Li_2O$. High concentrations of oxide localized in the carbon nano-fiber formation region leads to defects and tangling of the carbon nano-tubes and carbon nano-fibers.

Figure 7A:
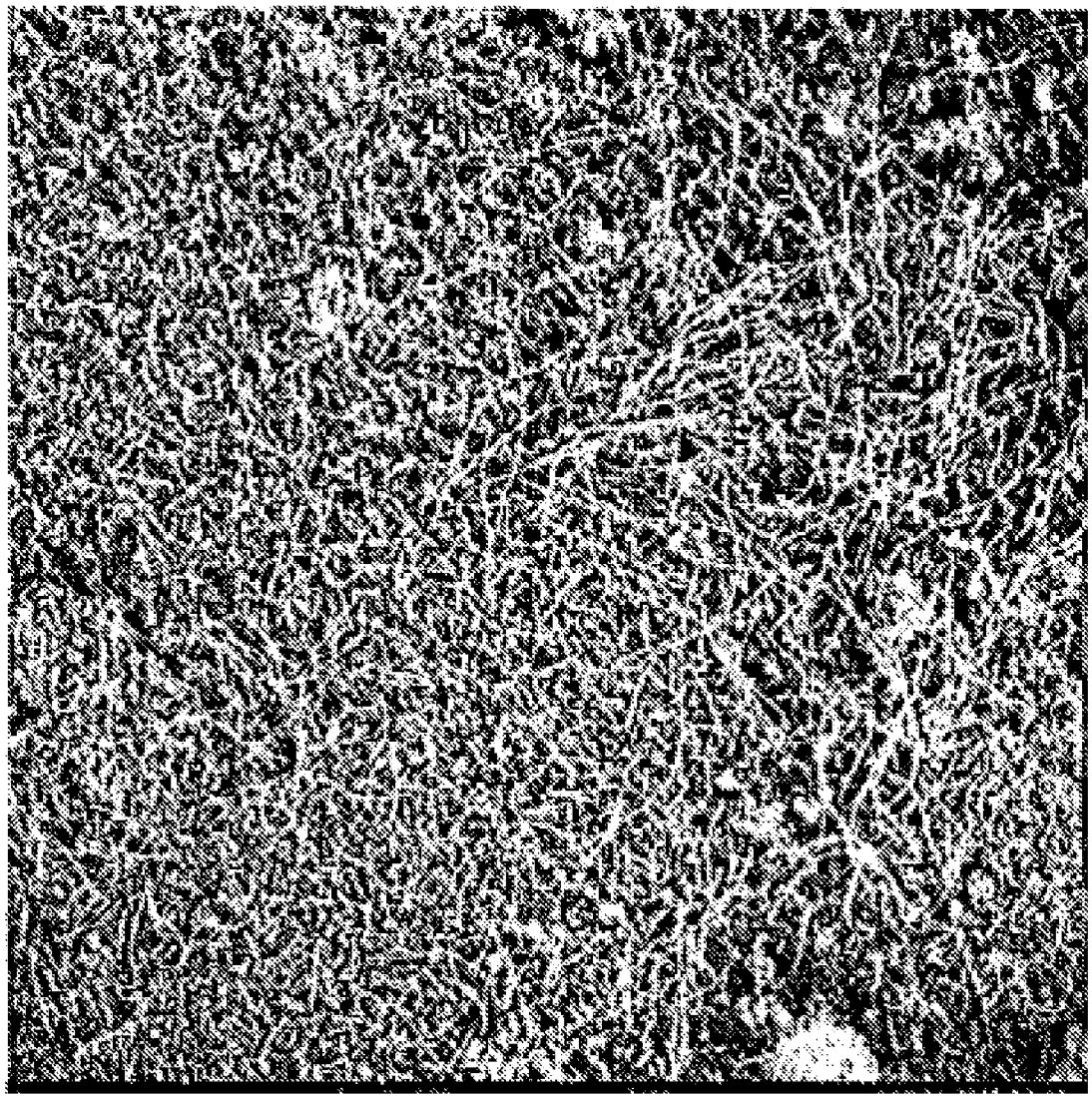
FIG. 7A-7C are SEM images of carbon nano-products produced from electrolysis including controlled nickel content on an anode.
Figure 7B:

As shown in FIGS. 7A-7F, carbon nano-fibers grown by electrolysis in pure molten $Li_2CO_3$ without added $Li_2O$ are consistently untangled, uniform, and long. The resulting carbon nano-tubes range from 300 to 1000 nm in width and 20 to 200 μm in length. These nano-materials result from adding $CO_2$ to molten carbonate to produce homogenous, untangled sets of carbon nano-fibers or carbon nano-tubes from controlled nickel media. To prevent high concentrations of oxide in the molten carbonate electrolyte, $Li_2O$ is not added to the molten carbonate electrolyte. FIG. 7A shows a SEM image at 800× of the washed cathode carbon product subsequent to electrolysis with a smaller nickel cathode (the inner wall of a 20 ml Ni crucible), at 0.05 A and then 1 A constant current electrolysis in 730° C. molten $Li_2CO_3$ using a 10 cm² coiled steel wire cathode (0.12 cm diameter). FIG. 7B shows an SEM image of the cathode carbon product under the same conditions with $Li_2O$ added to the molten carbonate electrolyte. FIG. 7B shows relatively more tangled carbon nano-fibers than those in FIG. 7A.

Figure 7C:
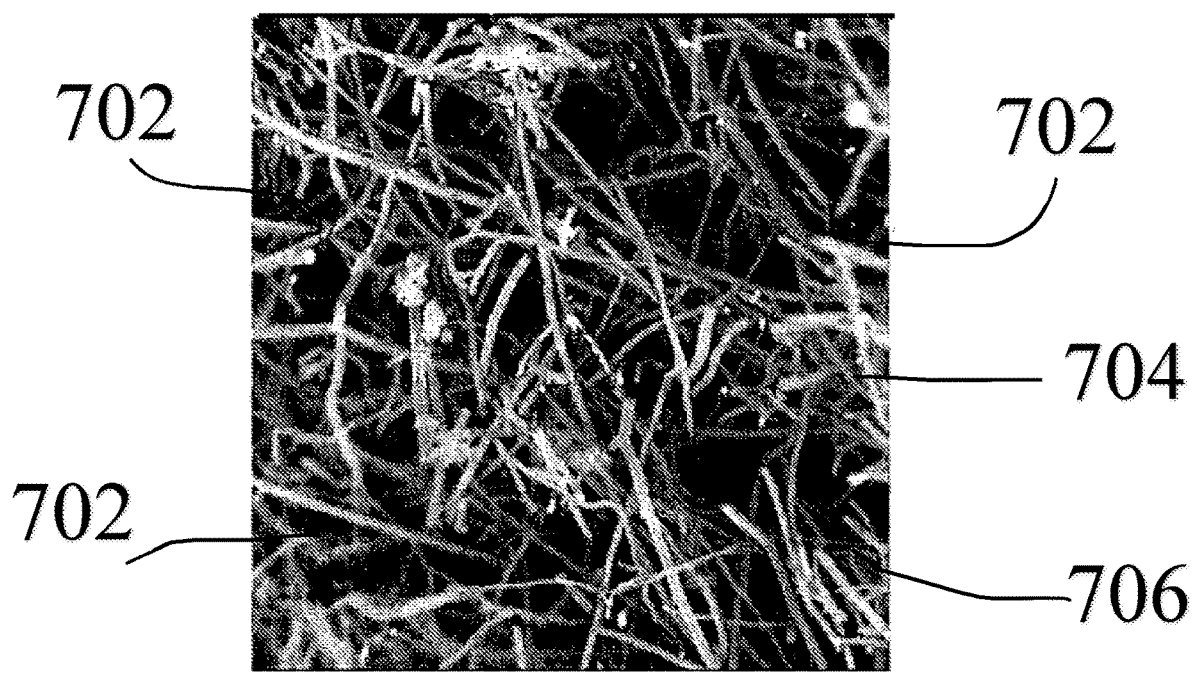
Figure 7E:
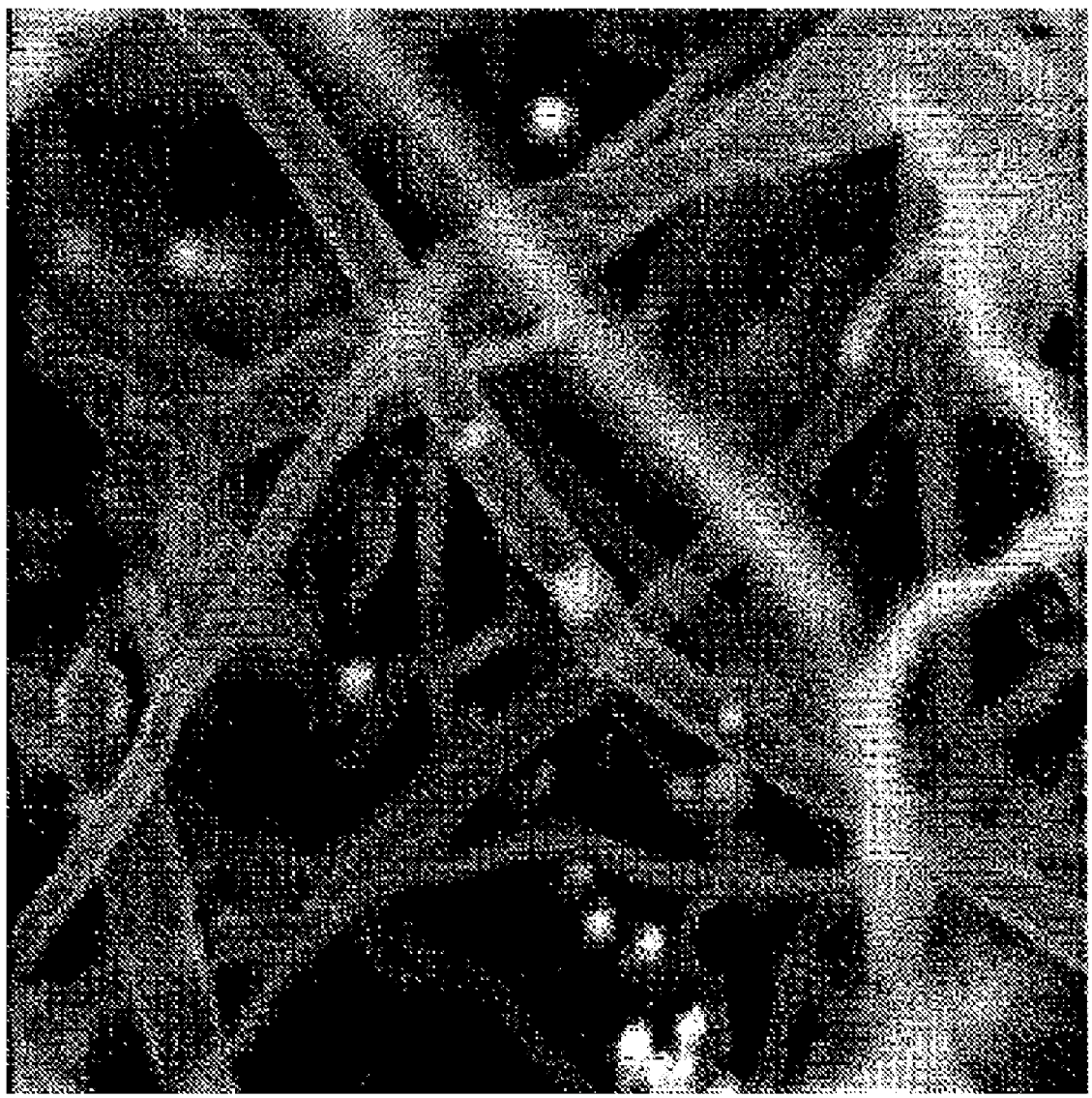
FIG. 7E is an SEM image of carbon nano-tubes produced by the electrolysis process resulting in the images in FIGS. 7A-7C.
Figure 7F:
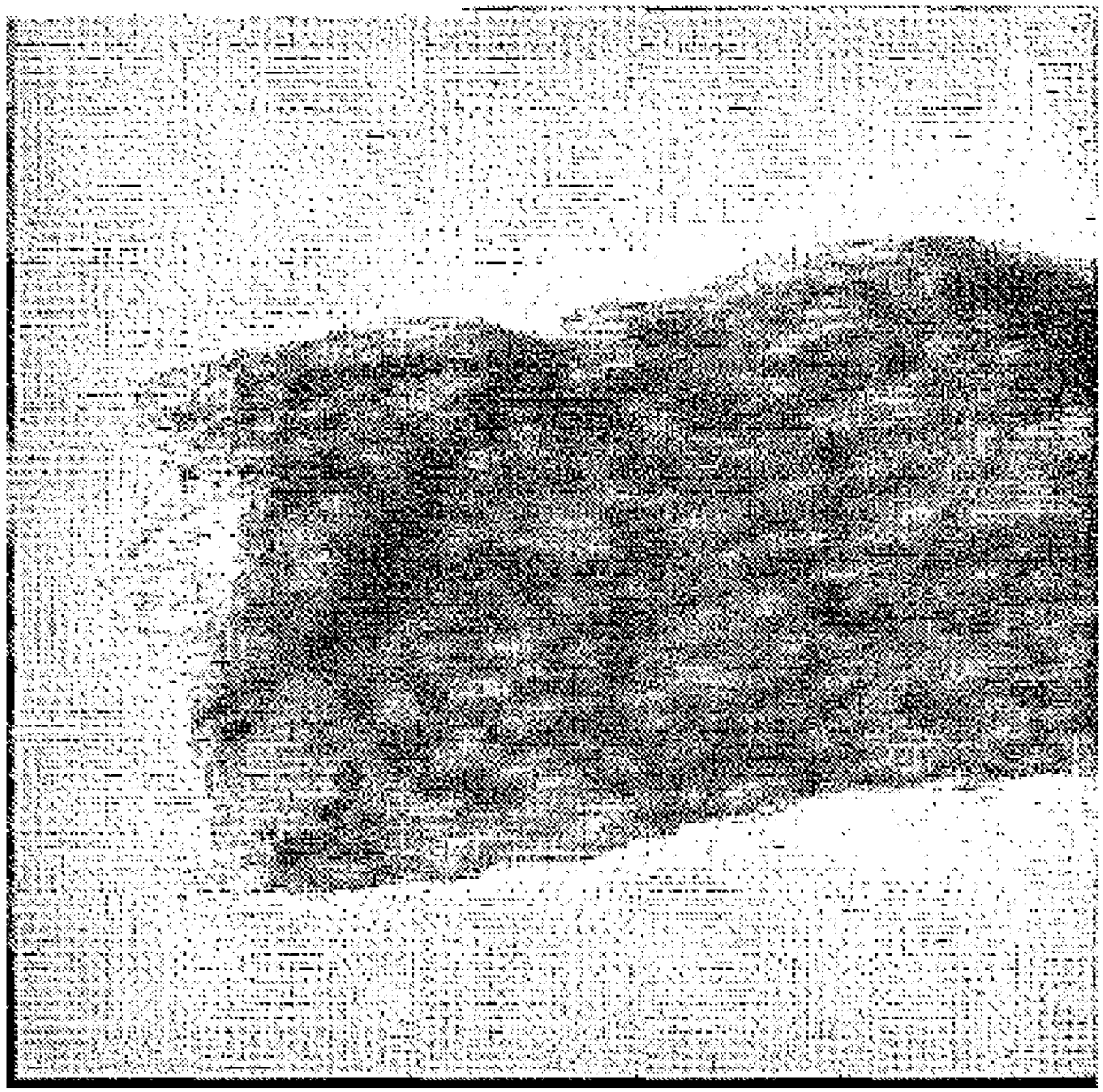
FIGS. 7F is an TEM image of carbon nano-tubes produced by the electrolysis process resulting in the images in FIGS. 7A-7C.

FIG. 7C is an SEM image of the carbon nano-fibers formed on the cathode. FIG. 7C includes various typical nickel nucleation sites 702. An arrow path 704 shown in FIG. 7C shows the origination at one nickel nucleation site 706 and moves along the carbon nano-fiber path formed from the nucleation site 706. FIG. 7E shows a SEM image of carbon nano-tubes that are formed from the process. FIG. 7F shows a transmission electron microscope (TEM) image of a carbon nano-tube tip formed from the process.

FIG. 7D shows a linear electron dispersive spectroscopy map that shows elemental variation along the 6 µm path from pure nickel at the start of the nano-fiber to pure carbon along the remainder of the nano-fiber. FIG. 7D includes a nickel trace 710 and a carbon trace 712. The Coulombic efficiency percent compares the moles of carbon recovered to applied each 4 moles of electrolysis charge in the reduction of $CO_2$ and is over 80% (and approaches 100% with careful recovery of all product after washing), the product (after washing off the electrolyte) consists of greater than 80% pure carbon nano-fibers. Initial results, indicative of whether the extent to which the carbon nano-materials are carbon nano-tubes or carbon nano-fibers, are seen in the SEM and TEM images in FIGS. 7E and 7F. Control of the number of carbon shells comprising the nano-tube and the extent of filled nano-tubes is based on the electrolysis time, the charge passed during the electrolysis, and the electrolysis composition, temperature, viscosity quantity of transition metal added to the cathode. The length of the nano-tubes is based on these factors and also the rate at which transition metals are added to the cathode. Platinum and Zinc tend not to nucleate molten electrolytic carbon nano-fiber formation, but along with nickel, cobalt, copper, and manganese, these materials also induce carbon nano-material nucleation. As shown in FIG. 7F, additives, such as the bright nickel shown, can act not only as nucleating sites, but also as filling agents in the hollow nano-fiber. Additives other than oxides or transition metal salts added to the electrolyte can also act as carbon nano-material filling or coating agents, or be used to affect the viscosity of the electrolytes. For example, both inorganic aluminate and silicate salts are highly soluble in molten lithium carbonate. High concentrations of either type of salt increases the viscosity of the electrolyte, and high applied electrolysis voltages, generally in excess of ~3V during the electrolysis, yields lithium metal, aluminum metal or silicon with, on or in the carbon nano-materials as measured by energy dispersive spectroscopy.

Thus, in order produce carbon nano-tubes, electrolysis is performed at an initial low current (0.001 A for 0.5 hour) to grow nickel nucleation sites on the cathode. The carbon nano-tubes are then grown on an immersed 10 cm² galvanized steel cathode at 1 A for 1 hour. Two types of nano-materials are generated. Straight carbon nano-tubes are grown from molten carbonate electrolyte without added $Li_2O$. Alternatively, tangled carbon nano-tubes are grown when 4 m $Li_2O$ has been added to the molten carbonate electrolyte. The control of diffusion conditions during electrolytic splitting of $CO_2$ in molten lithium carbonate leads to either filled carbon nano-fibers or hollow carbon nano-tubes, and control of oxide and transition metal concentration leads to tangled or straight fibers. This gives a level of control of the synthesized carbon nano-materials.

FIGS. 8A-8F show an example electrolysis chamber 800 that may be used to produce the samples in FIGS. 5-7. FIG. 8A shows a perspective view of the chamber 800. The chamber 800 is a scaled-up electrolysis chamber splitting the $CO_2$ bubbling into carbonate. The chamber 800 is operated at 100 Amp, 1.5V, and 95 to 100% coulombic efficiency of the 4 electron reduction to carbon. The chamber 800 includes a nickel cylinder 802 for growth of the carbon nano-materials. The chamber 802 is coupled to electrical leads 804 and 806. The electrical leads 804 and 806 are concentric nickel anodes (electrically connected at bottom) coupled to a high current bus bar 810. As shown in FIG. 8B a steel electrode cylinder 808 is the cathode that is coupled to the high current bus and is inserted between the electrical leads 804 and 806 in the chamber 800 as shown in FIG. 8C. The anode and cathode area in this example is 300 cm² and the alumina cell diameter is 7 cm and the height is 14 cm.

In small scaled experiments, carbon is formed by a low current, and then a 1 A electrolysis on a cathode composed of a coiled 10 cm² galvanized steel wire. When removed subsequent to the electrolysis, carbon is evident along with congealed electrolyte. When the cooled wire is uncoiled the carbon and electrolyte drop off the wire and are collected for washing to remove the electrolyte. The wire can be recoiled and the cathode reused.

FIG. 8D shows the steel electrode 808 removed from the chamber 800 after a one hour, 100 A electrolysis at 1.5V treatment in the chamber 800. FIG. 8D shows that a thick carbon deposited coating has formed on the steel electrode. The removal of carbon from the cathode is performed by striking the cathode 808 with a hammer as shown in FIG. 8E. FIG. 8F is a bottom up view of the cathode 808 with the removal of the carbon layer nearly complete. FIG. 8G shows carbon produced on the cathode 808 by using the chamber 800 a second time.

The carbon nano-fiber electrolysis chamber 800 is readily scalable. For example, the chamber may be scaled to a current of 100 A using 300 cm² (shown) and 800 cm² electrode cells, which scale the smaller cells both in lower carbon splitting potentials (1-1.5 V) and high (80-100%) 4 electron coulombic efficiency of carbon product formation. This is a 100 fold scale-up from the original electrolysis, but occurs at the same low electrolysis voltage and high coulombic efficiency.

The demonstrated carbon nano-material synthesis may be driven by any electric source such as electrical power generated by a coal, natural gas, solar, wind, hydrothermal, or nuclear power plant. As an alternative to conventionally generated electrical sources, the carbon nano-fiber synthesis may be performed from electric current as generated by an illuminated efficient concentrator photovoltaic such as that in FIGS. 2A-2C operating at maximum power point. For example, the $CO_2$ used as a reactant for the electrolysis cell is initially passing it over and under the concentrator photovoltaic (CPV) such as the photovoltaic cell 212 in FIG. 2A, and then heating it to the electrolysis temperature using sub-band gap (infrared) thermal light split from concentrated sunlight via a hot mirror such as the dielectric filter 204 prior to absorption by the photovoltaic 212.

FIG. 9A-9C shows a concentrator photovoltaic system 900 that may be used to drive the carbon nano-fiber synthesis process. FIG. 9D is a graph showing the power output curve of the photovoltaic system 900 in FIG. 9. FIG. 9A shows a perspective view of a 0.3074 cm² Envoltek ESRD055 concentrator photovoltaic 902 situated under the air-cooled AM1 filter 904. The electrolyzer current by power supply (initial experiments) and now provided by an efficient concentrator photovoltaic in a lab under a 1 kW Xenon, daylight color (5600 K) light source 906 to provide simulated solar illumination and AM1 (air mass) as shown in FIG. 9B. FIG. 9B also show a Fresnel concentrator 908 above the AM 1 filter 904. A light conduit 910 is suspended above the concentrator photovoltaic 902. FIG. 9C is a close up view of the unattached concentrator photovoltaic 902 under a secondary optical concentrator 912.

FIG. 9D is a power graph showing a typical (550 sun) photocurrent. A power curve 920 shows a maximum efficient power point 922 that demonstrates a 39% efficient concentrator power voltaic. The efficient solar synthesis of carbon nano-fibers is demonstrated by an indoor solar simulator, and a 39% solar efficient concentrator photovoltaic operating at 550 suns concentration, which has a maximum power point voltage of 2.7 V to drive two in-series (1.35V×2) carbon nano-material electrolyzers at 2.3 A. The carbon nano-materials are efficiently formed from $CO_2$ in air, using inexpensive nickel and steel electrodes at high solar efficiency. As explained above, the type and dimensions of the carbon materials may be controlled by the transition metal such as nickel in the anode, the electrolyte composition, and the current density. The addition of materials such as zinc may allow the process to consume less energy.

Alternative $CO_2$ types may be used that include contains a $^{12}C$, $^{13}C$ or $^{14}C$ isotope of the carbon or mixture thereof. For example, natural abundance $^{12}CO_2$ forms hollow carbon nano-tubes, while equivalent synthetic conditions with heavier $^{13}CO_2$ favors closed core carbon nano-fibers, as characterized by Raman spectroscopy, SEM images and TEM images from produced carbon nano-materials. A pure $^{13}C$ multi-walled carbon nano-fiber may be synthesized by the above process formed directly from atmospheric $CO_2$.

Figure 10A:
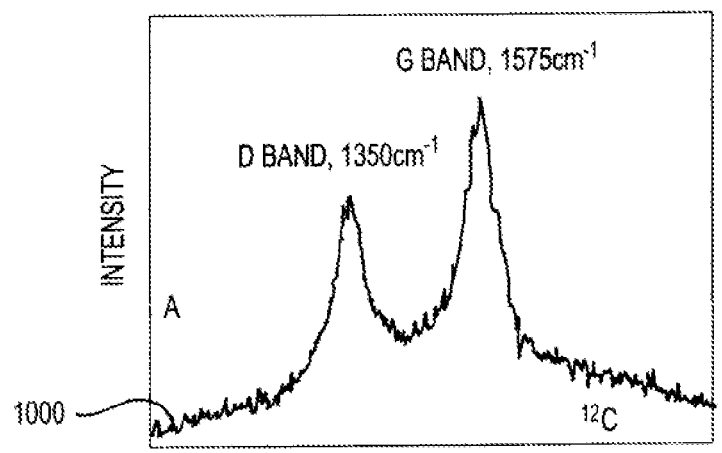
FIG. 10A-10C are Raman spectroscopy diagrams of carbon products resulting from carbon or carbon isotopes injected in molten carbonate including carbon isotopes.
Figure 10B:
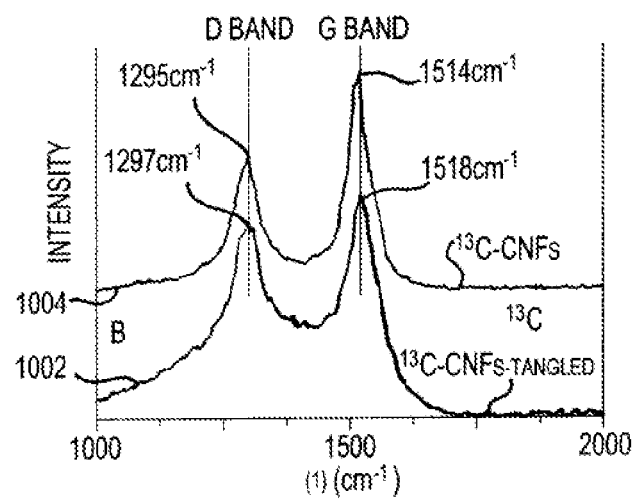
Figure 10C:
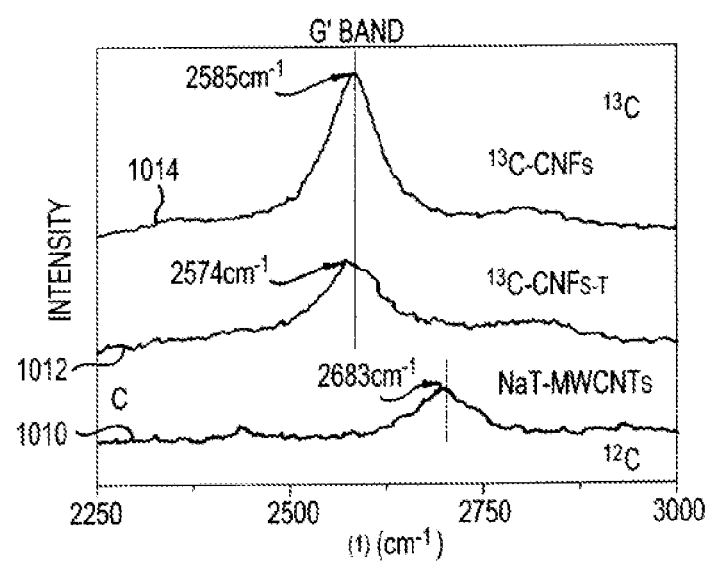

FIGS. 10A-10C are Raman spectra diagrams of carbon nano-tubes that are synthesized using $^{13}C$ isotopes in the molten carbonate and the injected $CO_2$. FIGS. 10A-10C show the spectra of carbon nano-tubes that yield structural and isotope replacement information. The carbon nano-tubes that result in a Raman spectra 1000 in FIG. 10A were synthesized by electrolysis with natural abundance $CO_2$ injected into molten $Li_2CO_3$ carbonate. The carbon nano-tubes that result in a Raman spectra 1002 in FIG. 10B were grown by injecting natural abundance $CO_2$ into molten $^{13}C$ $Li_2CO_3$ carbonate. FIG. 10B also shows a Raman spectra 1004 that results from use of $^{13}C$ isotopes in injected $CO_2$ to molten $^{13}C$ $Li_2CO_3$ carbonate. FIG. 10C shows different Raman spectra 1010, 1012 and 1014 at the 2250-3000 $\omega(cm^{-1})$ band. The Raman spectra 1010 represents carbon nano-tubes that were synthesized by electrolysis with natural abundance $CO_2$ injected into carbonate of $Li_2CO_3$. The Raman spectra 1012 represents carbon nano-tubes grown by injecting natural abundance $CO_2$ in molten $^{13}C$ $Li_2CO_3$. The Raman spectra 1014 represents carbon nano-tubes grown by injecting $CO_2$ with $^{13}C$ isotopes into molten $^{13}C$ $Li_2CO_3$ carbonate.

The natural abundance carbon nano-tubes produce the Raman spectrum 1000 in FIG. 10A that exhibits two sharp peaks at 1350 $cm^{-1}$ and 1575 $cm^{-1}$. These peaks correspond to the disorder-induced mode (D band) and the high frequency $E_{2g}$ first order mode (G band), respectively. The intensity ratio between D band and G band ($I_D/I_G$) is an important parameter to evaluate the graphitization, and here the ratio of 0.60, is consistent with that of commercial hollow carbon natural abundance carbon isotope nano-fibers.

The Raman spectrum 1002 and 1004 observed for $^{13}C$ based carbon nano-products in FIG. 10B have both bands downshifted compared to the $^{12}C$ spectrum 1000 shown in FIG. 10A. The frequency of Raman modes in samples containing a concentration, C, of $^{13}C$ is determined by the following equation, which incorporates the increased mass of this isotope:

$$(\omega_0-\omega)/\omega_0=1-[(12+C_0)/(12++C)]^{1/2} \quad (4)$$

In equation 4, $\omega_0$ is the frequency of a particular mode in a natural abundance carbon nano-tube sample, $\omega$ is the frequency of a particular mode in $^{13}C$ enriched carbon sample, and $C_0=0.0107$ is the natural abundance of $^{13}C$. In accord with equation 4, the D and G band for pure $^{13}C$ carbon nano-fibers should peak at 1297 and 1514 $cm^{-1}$, respectively. The close agreement between the theoretical calculated (1297 and 1514 $cm^{-2}$) Raman peak positions and the observed experimental peak curve indicate the carbon nano-products obtained approached 100% $^{13}C$ isotope enrichment. The intensity ratio of $I_D/I_G$ is 0.63, indicating a better degree of graphitization than for the natural abundance $CO_2$ enriched multi-walled carbon nano-tubes. The intensity ratio between D band and G band ($I_D/I_G$) is an important parameter to evaluate the graphitization, and here the ratio of 0.60, is consistent with that of commercial hollow carbon natural abundance carbon isotope nano-fibers. Larger than 0.60 ratios of the intensity between D band and G band represent an increased measure in disorder relative to graphitization. This disorder may originate from defects, carbon vacancies, branching, localized variations in inter and intra graphene layer spacing and other than graphitic sp² carbon bonding. This disorder influences the nano-material morphology, conductivity, strength, flexibility, and semiconductor, catalysis and charge storage capabilities. For example, we observe higher $I_D/I_G$ for the tangled carbon nano-materials formed with added lithium oxide during the electrolysis as in FIG. 6D, or for straight electrolyzed carbon nano-materials when additionally subject to a post-electrolysis treatment such as soaking in a strong inorganic acid and strong inorganic oxidizing agent, for example, but not limited to nitric acid and permanganate.

In synthesizing the carbon nano-materials shown in FIG. 10B, $^{13}CO_2$ was exposed to $Li_2^{13}CO_3$, while natural abundance $^{12}CO_2$ was exposed to $Li_2^{12}CO_3$ for the carbon products shown in FIG. 10A. Atmospheric $CO_2$ may be absorbed and then converted into carbon with $Li_2O$ present in carbonate melts, by low energy electrolysis with the potential constrained by the reaction:

$$Li_2O+CO_2 \rightarrow Li_2CO_3+C+O_2 \quad (5)$$

A $^{13}C$ electrolyte (1 m $Li_2O$ in $Li_2^{13}CO_3$) was exposed to regular (natural abundance, 99% $^{12}C$) air containing 0.04% $CO_2$ during the electrolysis. The resulting Raman spectrum 1002 is similar, but slightly up-shifted compared to the curve spectrum 1004 of pure $^{13}C$ carbon nano-materials. The G-band shift is ~4 $cm^{-1}$ towards higher frequency, indicating ~4% $^{12}C$ was present in this sample using equation 3, to provide evidence that ($^{12}C$) $CO_2$ is directly absorbed from the air in the formation of the carbon product. A broadening of the G-band in this sample, which can be seen by the larger full width at half maximum is further evidence of a $^{12}C/^{13}C$ mixture, because in the other, pure $^{12}C$, or pure $^{13}C$, cases the G-band is single peak and the full width at half maximum is the most narrow. This result acts to confirm that the presence of $Li_2O$ in the molten carbonate electrolyte absorbs the greenhouse gas $CO_2$ from air and transforms it by electrolysis into carbon nano-materials.

The Raman G' band of the products is presented in FIG. 10C. The peak frequency of pure $^{13}C$ carbon nano-materials is 2585 $cm^{-1}$. The reported frequencies of the G' band vary in the literature. For example, the G' band of single walled carbon nano-tubes is observed at 2526 $cm^{-1}$, while in this band of single walled carbon nano-tubes, the G' band is at ~2580 $cm^{-1}$; both using 532 nm incident laser. The discrepancy may be due to a variation in morphology (such as zig-zag or arm-chair) and/or the relatively broad character of the peak.

Figure 11A:
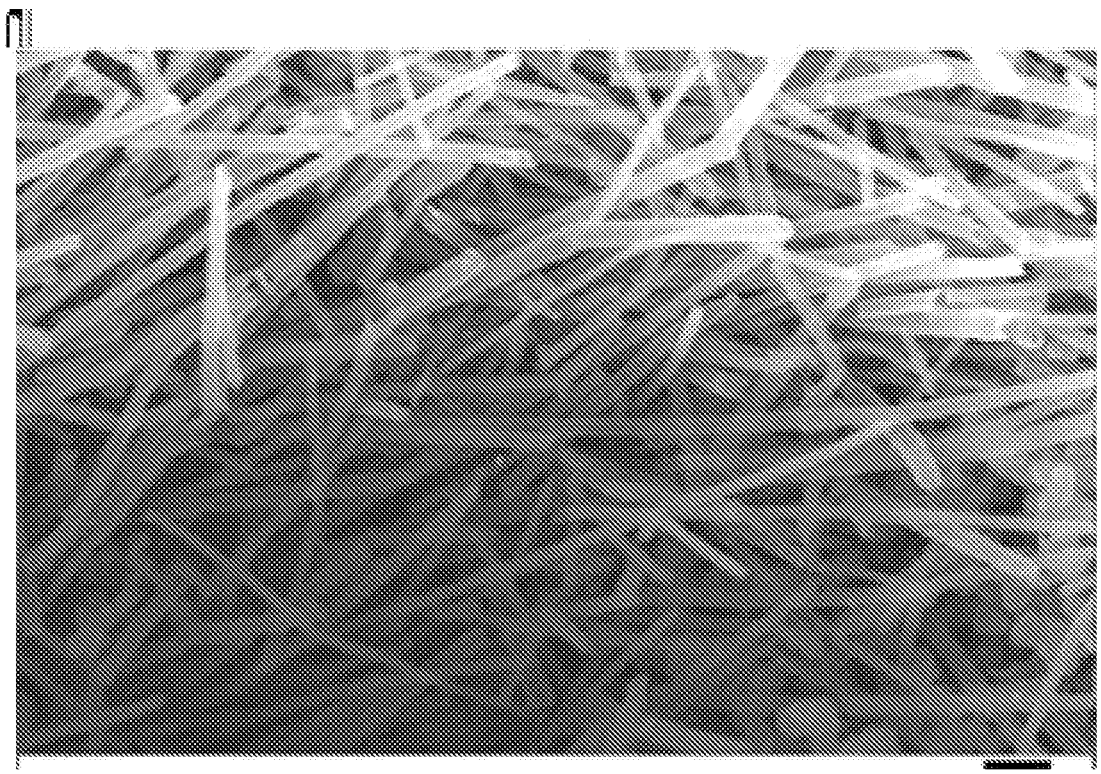
FIGS. 11A-11E are SEM images of carbon nano-tubes produced using carbon without carbon isotopes.
Figure 11B:
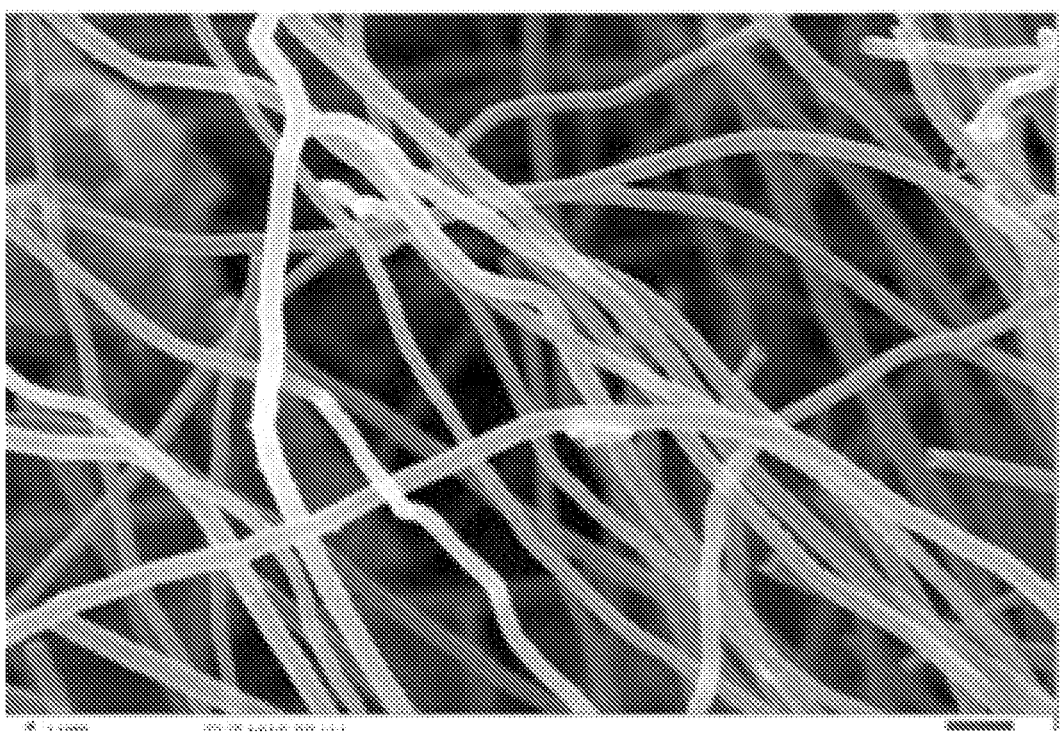
Figure 11C:
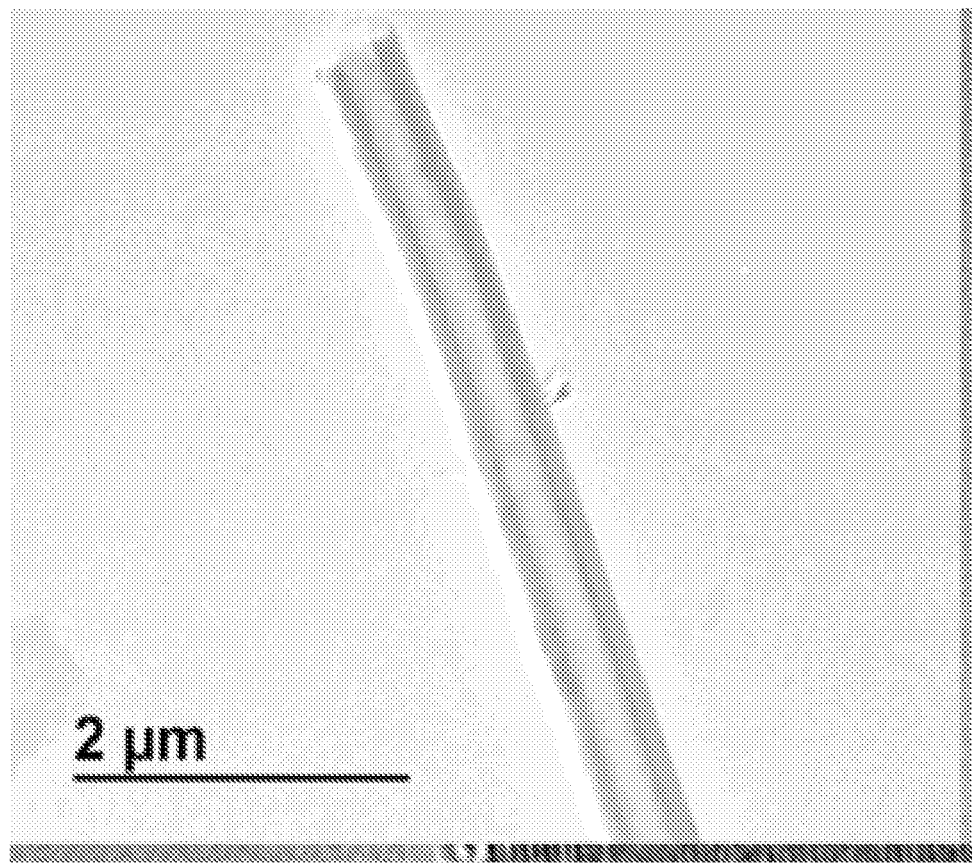
Figure 11D:
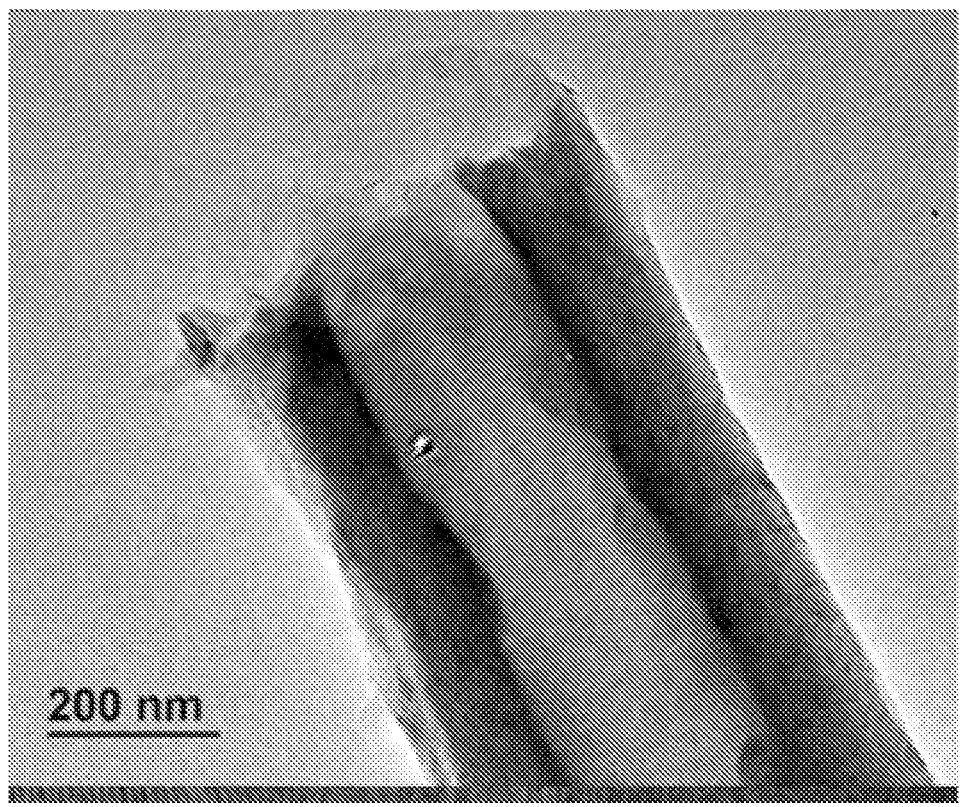
Figure 11E:
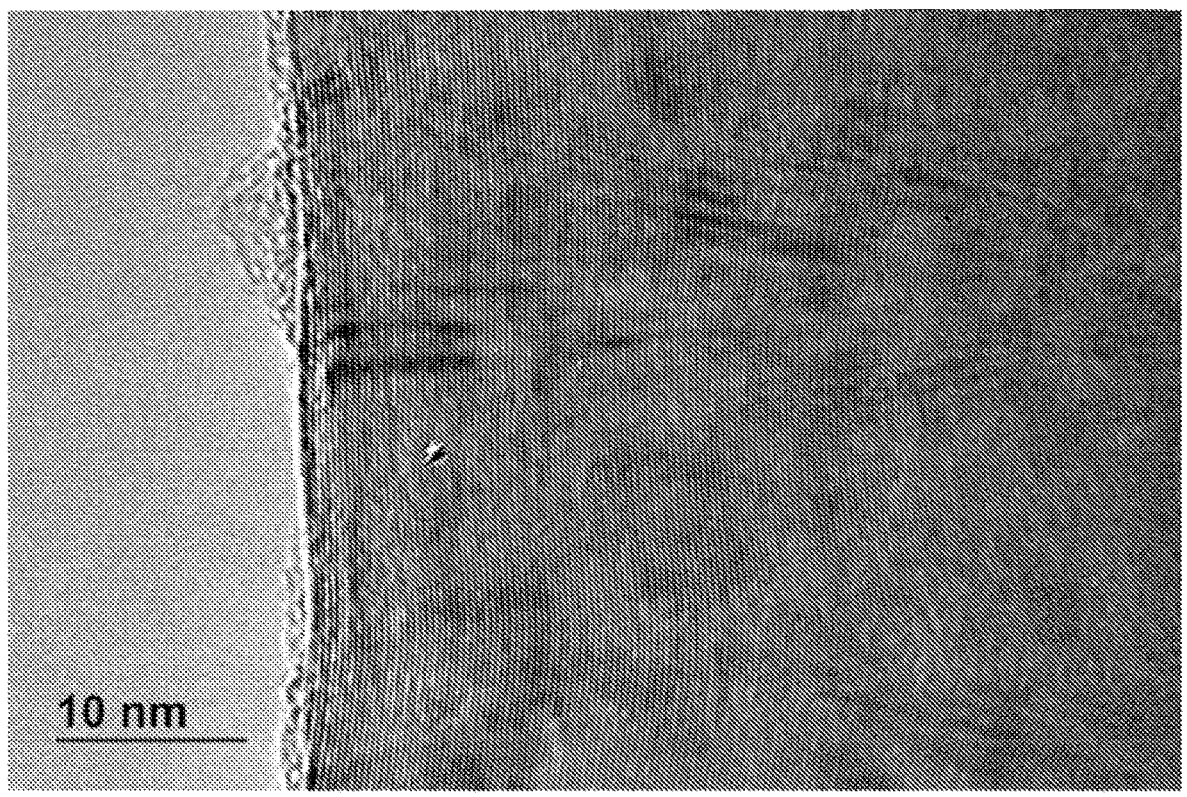

FIGS. 11A-11E are microscopy images showing the nano-morphology when $^{12}C$ is the dominant isotope in the carbon nano-materials. FIGS. 11A-11E show the multi-walled carbon nano-tubes, electrochemically synthesized from natural abundance $CO_2$ in molten, natural abundance $Li_2CO_3$. FIGS. 11A and 11B are different magnification SEM images of the carbon nano-tubes. FIGS. 11C and 11D are different magnification TEM images of the tip of an individual carbon nano-tube. FIG. 11E is a TEM image that shows the multiple layers of the wall of a carbon nano-tube. Typically the multi-walled carbon nano-tubes have wall thickness of ~100-150 nm and inner diameter of ~160-210 nm. The distance between graphene layers from high resolution TEM is 0.342 nm and therefore the wall contains about 300450 layers. The layer spacing is consistent with pure $^{12}C$ graphitic structures. Larger diameter carbon nano-tubes are produced with the same graphene layer spacing when the growth current is pulsed at a low frequency (cycled at 9 minutes on (1 A), 1 minute off (0 A) rather than a galvanostatic DC current of 1 A (through a 10 $cm^2$ galvanized steel cathode).

Figure 12A:
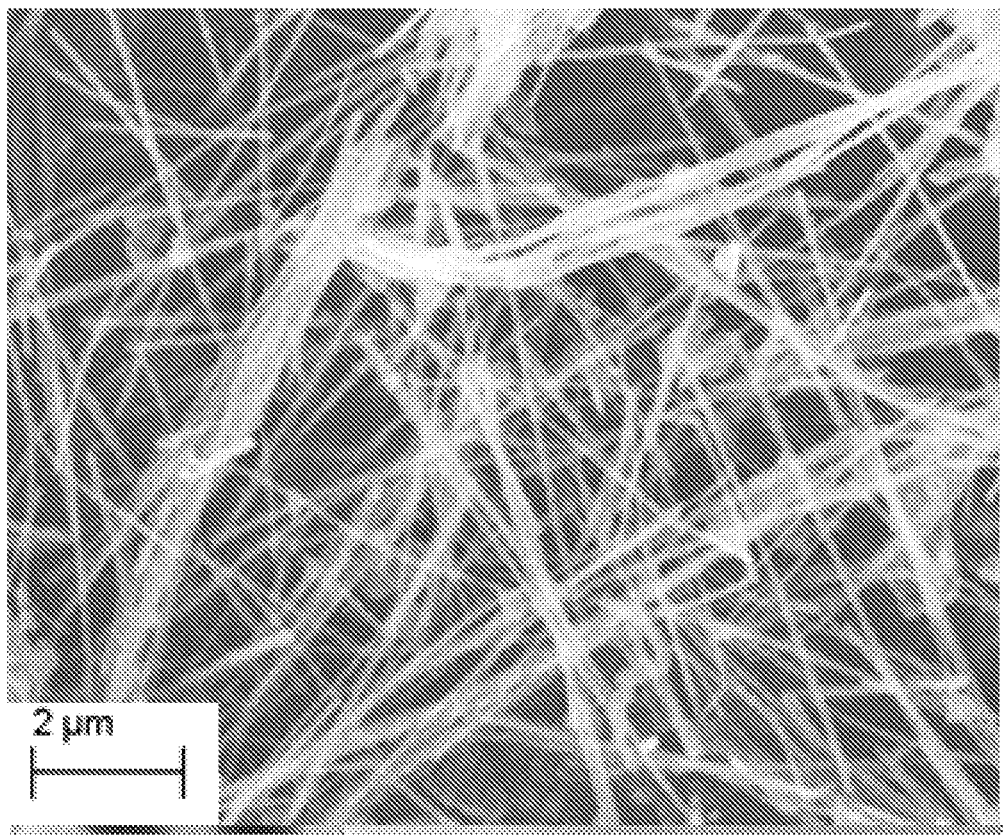
FIGS. 12A-12F are SEM and TEM images of carbon nano-tubes produced using carbon isotopes.
Figure 12B:
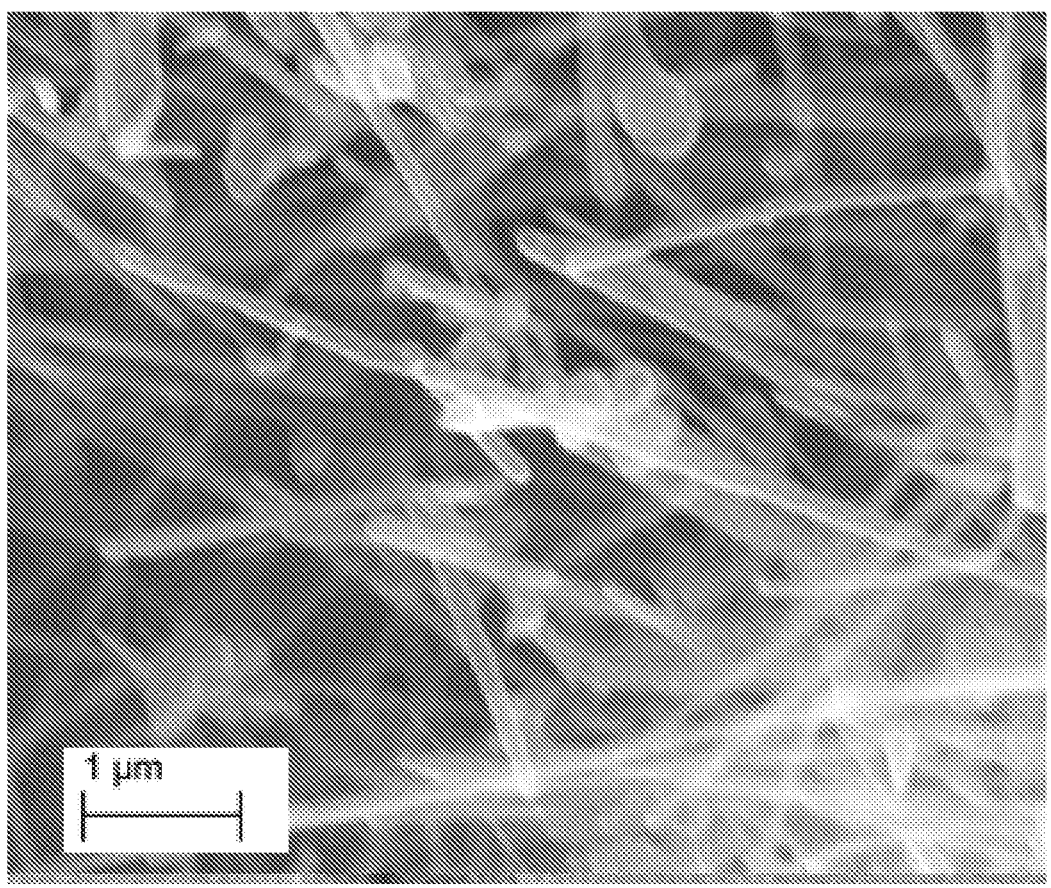
Figure 12C:
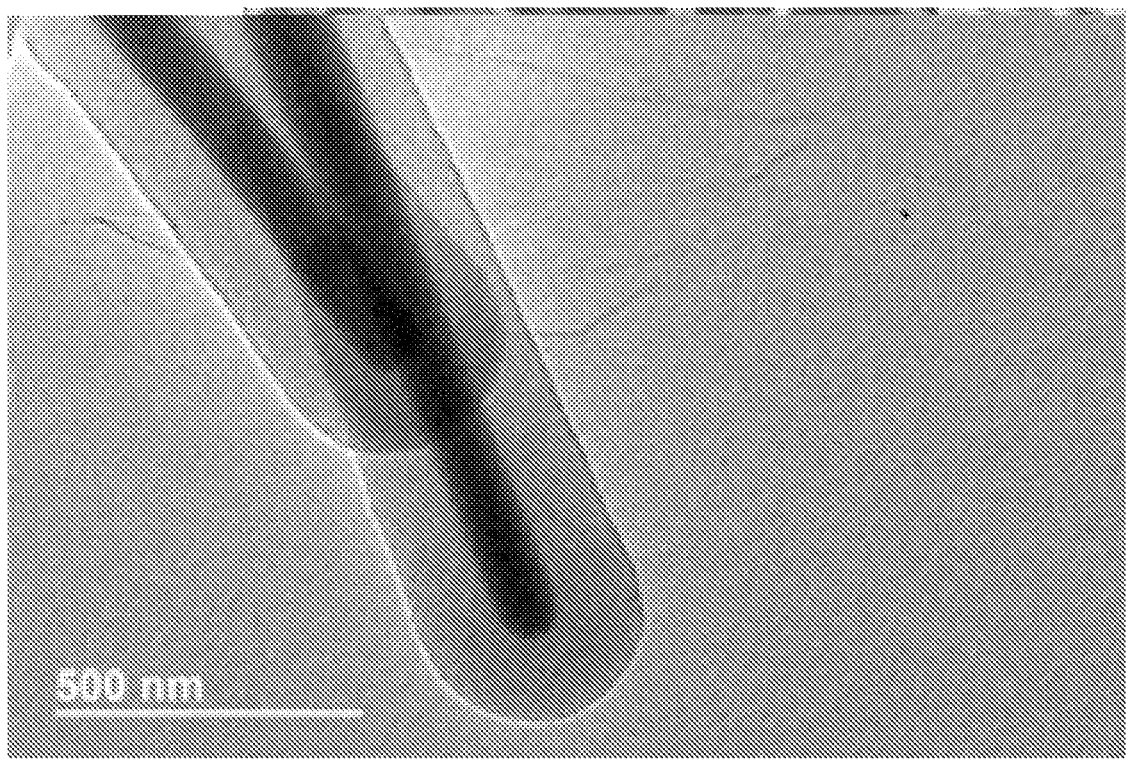
Figure 12D:
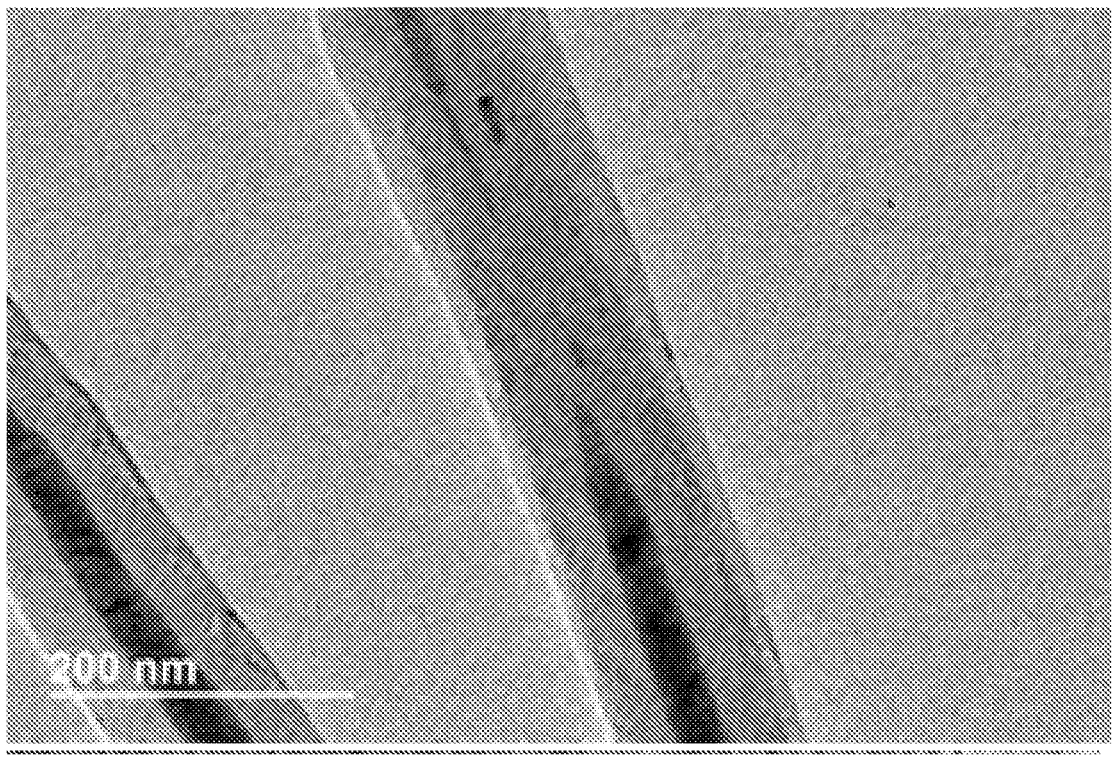
Figure 12E:
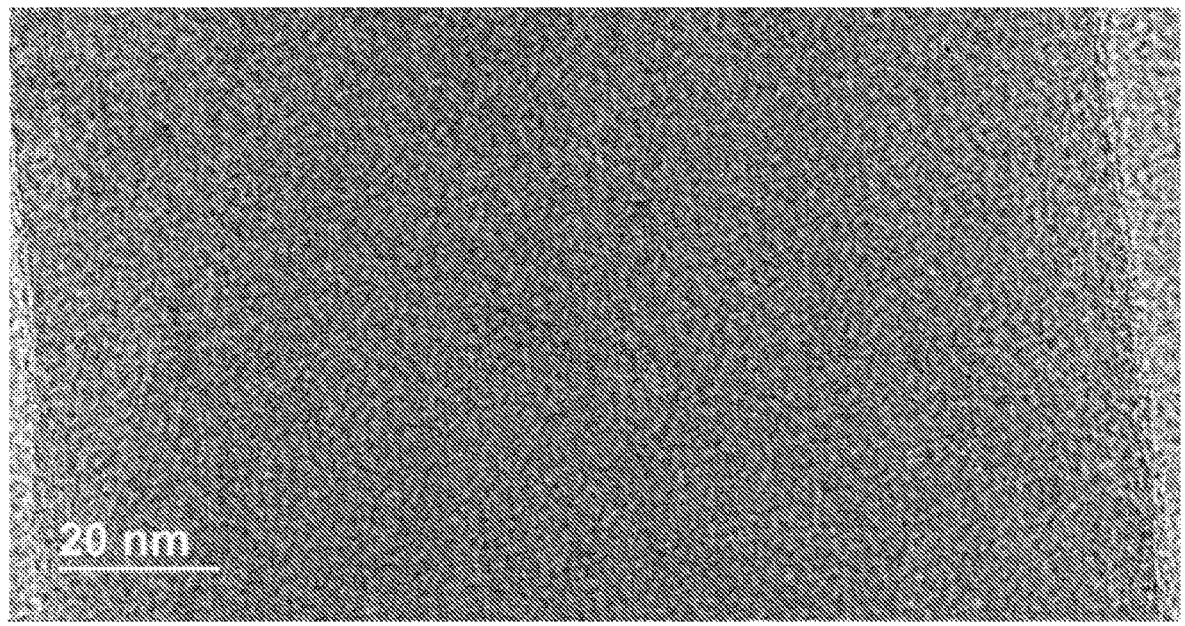
Figure 12F:
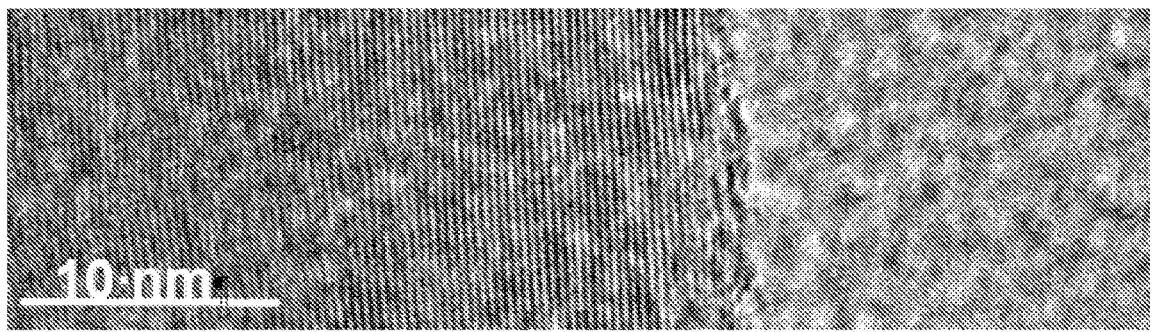

FIGS. 12A-12F are microscopy images showing the nano-morphology when $^{13}C$ is the dominant isotope in the carbon nano-products. FIGS. 12A and 12B are different magnification SEM images of the carbon isotope nano-tubes. FIGS. 12C and 12D are different magnification TEM images of the tips of individual carbon isotope nano-tubes. FIGS. 12E and 12F are different magnification TEM images that show the multiple layers of the walls of isotope carbon nano-tubes. As shown in FIGS. 11A-11E, carbon nano-products formed with the natural isotope $CO_2$ consistently exhibit hollow cores (carbon nano-tubes), whereas as shown in FIGS. 12A-12F, those formed from $^{13}CO_2$ have solid or nearly solid cores (carbon nano-fibers). As observed with the natural abundance electrosynthesized carbon nano-tubes, the addition of $Li_2O$ to the electrolytes yields tangled, rather than straight carbon nano-fibers formed during the $^{13}C$ electrolysis.

As seen in FIGS. 12A-12F, rather than the large core nanotubes produced by electrolysis from natural abundance (99% $^{12}C$) carbonate, the fibers grow with a nearly solid core structure from $^{13}C$ (from $^{13}CO_2$ in $Li_2{}^{13}CO_3$), except where the nickel catalyst remains present, as analyzed by energy dispersive X-ray spectroscopy. The spacing between carbon layers is seen to decrease from 0.342 nm for the natural abundance carbon nanostructures in FIGS. 3, to 0.338 nm as shown in FIGS. 12A-12F, and which is known for inter-graphene spacing in $^{13}C$ nano-structures. The $^{13}C$ products exhibit a carbon nano-fiber morphology with an inner (void) volume that is less than 6% of the total. Specifically, the $^{13}C$ carbon nano-fibers have an outer diameter of ranging from 150 to 350 nm and a wall thickness of 75 to 175 nm. The observed yield of fibers from the $^{13}C$ synthesis is 60-80% during replicate measurements, while from the natural abundance C synthesis, the observed carbon nano-tube yield is typically 80-90%. The slightly lower yield for the $^{13}C$ synthesis may be related to the higher cost of the reactants, which precluded further (than three) replicated measurements or optimizations, and as previously observed for natural carbon abundance electrolyses and the remaining product includes amorphous graphites and graphenes.

The thicker wall and smaller diameter of the $^{13}C$ products compared to the $^{12}C$ carbon nano-tubes may be due to the different diffusion behaviors in $Li_2{}^{13}CO_3$ electrolyte. $CO_2$ is solvated in solution as carbonate, and diffusion of carbonate to the cathode supplies carbon for the nano-tube/nano-fiber growth. The heavier $^{13}CO_3{}^{2-}$ species in the $^{13}C$ electrolyte has a lower mobility with respect to $^{12}CO_3{}^{2-}$ in the natural abundance carbonate electrolyte and this can influence (i) the distribution of the transition metal nucleation sites, (ii) the curvature of the carbon cap growing on the nucleation site, and (iii) the availability of carbon during the growth process. With the $^{13}C$ nanostructures observed by energy dispersive X-ray spectroscopy, nickel both at the exterior and within the interior of the nano-fiber and these inner core nucleation sites may promote additional inner core wall growth.

It is likely that the closer-spaced walls observed in the $^{13}C$ compared to $^{12}C$ synthesized structures are indicative of a more stable structure, which would be consistent with the observed tendency of the $^{13}C$ to form more layers within the carbon nano-tube matrix. Density functional calculations will be of interest to probe the hypothesis that heavier carbon isotopes would be energetically more stable and tend to form more walls to better fill the inner core of the observed multi-walled carbon nano-tubes and will promote a more densely packed multi-walled carbon growth.

The system 100 in FIG. 1 may transform $CO_2$ gas, dissolved in a molten carbonate electrolyte by electrolysis at a nickel anode and at a galvanized steel cathode. At the anode the product is $O_2$ and at the cathode the product is uniform carbon nano-fibers, or carbon nano-tubes, which are carbon nano-fibers with hollow interiors. As explained above with reference to FIG. 7A-7, carbon nano-tubes may be produced by electrolysis at lower current densities of molten carbonate without $Li_2O$ electrolytes.

Due to their superior strength than steel, conductivity, flexibility, and durability carbon nano-fibers and carbon nano-tubes have applications ranging from capacitors, Li-ion batteries, and nano-electronics to the principal component of lightweight, high strength building materials, such as used in replacing steel and concrete in bridge construction, wind turbines, and lighter-weight structural materials for jets, cars, and athletic equipment.

As explained above, the process of subjecting molten carbonate to electrolysis separates oxygen formed at the anode and a carbon product at the cathode. Amorphous carbon may be produced at a steel cathode without the use of a transition metal anode and oxygen 1442 that is directed back to the combustion chamber 1412 as shown in FIG. 3. Use of a zinc coated (galvanized) steel cathode and a non-transition metal anode in electrolysis produces spherical carbon. Use of a zinc coated (galvanized) steel cathode and a non-transition metal anode in electrolysis but with high iron content from iron oxide dissolved in the electrolyte produces amorphous carbon as well as a wide variety of carbon nano-structures on the cathode as shown in FIG. 4.

Zinc metal on the cathode can lower the energy to form carbon and help initiate the carbon nano-tube or carbon nano-fiber formation process. Zinc is thermodynamically unusual compared to nickel, copper, cobalt, or iron, in that the energy required to form zinc metal from zinc oxide is greater than the energy needed to reduce tetravalent carbon (in the form of carbon dioxide dissolved in carbonate) to solid carbon, and hence carbon will be preferentially formed from the oxide compared to zinc from the oxide. However, zinc metal is energetically sufficient to chemically spontaneously react (without the need for an applied potential), to form both solid carbon from carbonate and form nickel (or other carbon nano-material nucleation site metals) from the oxide. As with the reaction of zinc with nickel oxide, the reactions of zinc with cobalt, iron, cobalt, and copper are also exothermic (with respective electrolysis potentials E° (25° C.) of 0.4, 0.6 and 1.0V).

When zinc is absent from the cathode, carbon formation initiates only at much higher (~1V or higher) potentials, leading to larger higher current density formed nucleation sites, which are not conducive to carbon nano-material confined growth and the observed profusion of mixed, amorphous graphite, graphene, and various shaped carbon nanostructures. The presence of the zinc metal acts as a beneficial aid as it is energetically sufficient to activate both (i) the spontaneous formation of solid carbon from carbonate and (ii) the spontaneous formation of metal catalyst nuclei that aid initiation of the controlled structure growth of carbon nano-materials at the nucleation site. Zinc thereby facilitates subsequent high yield carbon nano-material growth from the greenhouse gas $CO_2$ dissolved in molten carbonate. This sets the stage for base structures conducive to the subsequent high growth carbon solvation/diffusion/precipitation application of higher current densities, advantageous (to rate of formation) without hydrogen, laser ablation or plasma assistance.

The design of the cathode and the anode may include a variety of shapes. For example, the anode and cathode may be a coiled wire, a screen, porous material, inner sides of the electrolysis chamber, a conductive plate, or a flat or folded shim.

When a relatively high current density is applied in electrolysis, amorphous carbon and a variety of carbon nano-structures are produced. When an initial low current density and then a high current density is applied in combination with $Li_2O$ in the molten carbonate electrolyte, high yield uniform but twisted carbon nano-fibers are produced at the cathode. When an initial low current density and then a high current density is applied in combination a molten carbonate electrolyte without $Li_2O$, high yield uniform straight carbon nano-fibers or carbon nano-tubes are produced at the cathode.

During $CO_2$ electrolysis for producing carbon nano-materials, the transition metal deposition controls nucleation and morphology the carbon nanostructure. Diffusion controls the formation of either carbon nano-tubes as grown from natural abundance $CO_2$ or carbon nano-fibers from $^{13}C$ isotope morphologies. The electrolytic oxide controls the formation of tangled nano-tubes from a high $Li_2O$ molten carbonate electrolyte or straight nano-tubes when the molten carbonate electrolyte has no added $Li_2O$. The above examples use transition metals such as nickel that are part of the anode that are dissolved from the anode to migrate through the electrolyte onto the cathode The added transition metal nucleating agent is one of the group of nickel, iron, cobalt, copper, titanium, chromium, manganese, zirconium, molybdenum, silver, cadmium, tin, ruthenium, or a mixture therein. However, the transition metals may be introduced as a dissolved transition metal salt to the electrolyte to migrate onto the cathode. Another mechanism is adding the transition metal nucleating agent directly onto the cathode.

Different sources of $CO_2$ may be used for the above described process of production of carbon nano-materials. For example, the $CO_2$ source may be air or pressurized $CO_2$. The $CO_2$ source may be concentrated $CO_2$, such as that found in a smokestack or flue, including chimneys, and industrial stacks such as in the iron and steel, aluminum, cement, ammonia consumer and building material, and transportation industries.

Another source of $CO_2$ may be from hot $CO_2$ generated during fuel combustion in a fossil fuel electric power plant. In such a system, electricity and carbon nano-materials are co-produced without $CO_2$ emission. A portion of the fossil fuel electric power plant outputs power for the electrolysis process. The $O_2$ electrolysis product is injected back into the fossil fuel electrical power plant. This combined carbon nano-product fossil fuel electric power plant improves the fossil fuel combustion efficiency, decreases the $CO_2$ and heat emissions from the power plant, and cogenerates both electricity and carbon nano-materials. Alternatively, a second source of non-$CO_2$ emitting electricity, such as renewable or nuclear powered electricity, may be employed to power the electrolysis, and the $O_2$ electrolysis product may be injected back into the fossil fuel electrical power plant. This combined carbon nano-product fossil fuel/renewable hybrid electric power plant improves the fossil fuel combustion efficiency, decrease the plant $CO^2$ and heat emissions, and cogenerates both electricity and carbon nanotubes and/or carbon nanofibers.

Looking to the future of electricity generation, gas turbine technology stands at the forefront as a result of its high efficiency, fast load-response times, and abundance of fuel (methane). A combined cycle gas turbine power plant utilizes two heat engines to convert heat energy into mechanical energy which is then transformed into electrical energy. The fuel to electrical efficiency varies between 50-60% with newer plants incorporating more efficient technologies. These efficiencies may be further improved with new turbine technologies and higher combustion efficiencies. In a conventional, contemporary combined cycle gas power plant, of this available enthalpy, ~38% and ~21% are converted to electricity respectively by the gas and steam turbines, for a combined enthalpy to electricity efficiency of ~59%; heat is lost in the steam condenser (~30%), stack (~10%), and through radiative losses (~1%). Typical pipeline quality natural gas is ~93% Methane ($CH_4$), ~3% Ethane ($C_2H_6$), 0.7% Propane ($C_3H_8$), 0.4% n-Butane ($C_4H_{10}$), ~1% Carbon dioxide ($CO_2$), and ~1-2% Nitrogen ($N_2$). The natural gas mixture burned at these plants can vary based on the specific source of natural gas used as well as the specific requirements of the power plant.

A high temperature electrolysis cell could be combined with such a system. A combined cycle power plant generates a source of heated $CO_2$ that may be mixed with, bubbled or sparged directly into a molten carbonate electrolyte, rather than emitted into the atmosphere as a greenhouse gas. This $CO_2$ can then be electrolyzed into carbon nano-materials as explained above, while the other flue gas products can be passed through a heat exchanger to create the steam that will be used for the second part of the combined cycle.

Figure 13:
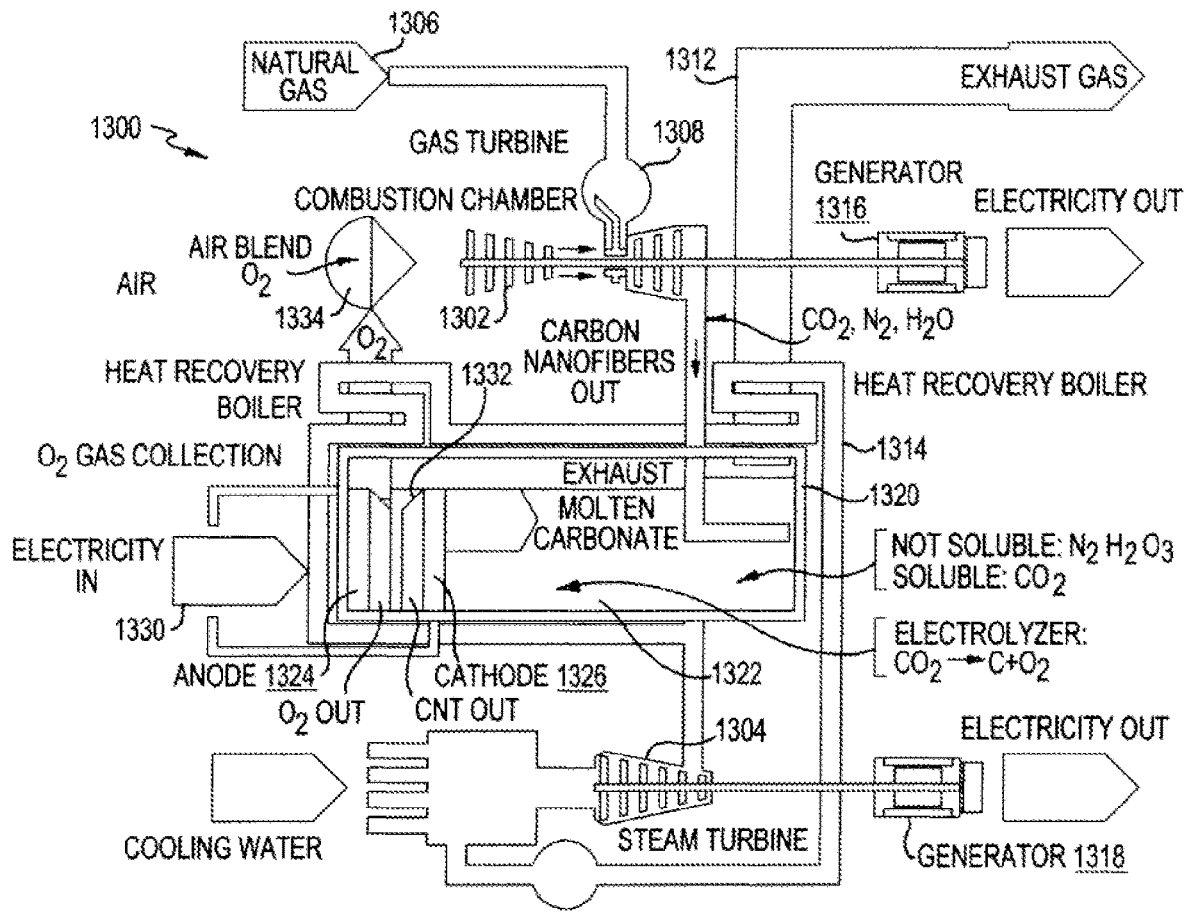
FIG. 13 is an example joint electricity generating and carbon nano-material production plant.

An example carbon nano-product combined cycle power plant system 1300 is shown in FIG. 13. The plant system 1300 includes a gas turbine 1302 and a steam turbine 1304. The gas turbine 1302 is fueled by a natural gas supply 1306 that is combusted in a combustion chamber 1308 to propel the gas turbine 1302. An exhaust 1310 includes byproducts such as hot $CO_2$, $N_2$ and water that are directed toward an electrolysis chamber 1320. The electrolysis chamber 1320 absorbs hot $CO_2$ from the gas turbine exhaust, which is converted to carbon nano-materials and pure $O_2$. The resulting exhaust is piped out via an exhaust conduit 1312. A heat recovery boiler 1314 recovers heat from the exhaust products of the electrolysis chamber 1302. Excess heat extracted from the gas turbine and the electrolysis chamber converts water to pressurized steam in the heat recovery boiler that drives the steam turbine 1304. In this manner, the generators 1316 and 1318 are driven by the respective gas turbine 1302 and steam turbine 1304 to generate electricity.

The electrolysis chamber 1320 includes molten carbonate 1322 that is subjected to electrolysis between an anode 1324 and a cathode 1326. The electrolysis is powered by a power source 1330. Carbon materials 1332 are produced at the cathode while oxygen is produced at the anode and sent to an air blender 1334 that is coupled to the combustion chamber of the gas turbine 1302. Thus, the electrolysis camber 1320 dissolves and removes hot $CO_2$ from the gas combustion and splits the $CO_2$ to a carbon nano-material product and pure oxygen.

The pure oxygen produced through electrolysis is cycled back to the combustion chamber 1308 to improve efficiency, while the recovered heat is passed on to the steam turbine 1304 and the entire process produce valuable carbon nano-materials instead of releasing $CO_2$. A large benefit of this system is the ability for the carbon dioxide to be captured and sequestered at high temperature. Conventional absorption carbon capture and storage technologies require an absorption material that captures the $CO_2$ at a lower temperature and must be heated to release the $CO_2$ and regenerate the material. A molten carbonate electrolyte may utilize metal oxides such as lithium, sodium, potassium, or barium oxide to chemically react with $CO_2$ to form a carbonate. This carbonate is then electrolyzed to produce a net reaction as explained above.

The advantage of using an oxide $CO_2$ absorber is that both the oxide, as well as the $CO_2$ are able to be kept at high temperature, preventing the need for thermal cycling as commonly performed with ionic liquid, amines, and other CCS technologies. Additionally, the applied electrolysis energy is not just the energy costs for $CO_2$ capture as the process has the additional benefit of producing valuable carbon nano-materials. During electrolysis, the carbonate is split to form carbon nano-products, oxide and oxygen, and the oxide reacts with incoming $CO_2$ to form a carbonate, regenerating the electrolyte for the process. The carbon nano-products are easily recovered and are more valuable than carbon dioxide.

The power plant system 1300 in FIG. 13 utilizes the high temperature pure oxygen produced by the electrolysis process to improve the efficiency of the natural gas fuel 1302 combustion process driving turbine 1302. This improvement may happen for a variety of reasons, ranging from a reduction of CO production as more oxidant is present, the reduction of $NO_x$ present as less nitrogen is available, lower heat losses from the smaller volume of exhaust gas due to less air and lower nitrogen entering the plant, and the higher temperatures reached that allow for improved thermodynamic efficiency. This transition to an oxy-fuel combustion process reduces the impurities in the exhaust gas that will prevent side reaction from occurring in the electrolysis chamber. An enhanced temperature will allow for a reduction in the electrolysis potential for the electrosynthesis of carbon nano-products allowing for additional temperature benefits.

The vast majority of coal power plants combust pulverized coal to produce high temperature, pressurized steam that drives turbines to generate electricity. The exhaust of the combustion is generally cleansed of the majority of sulfur, heavy metal, and particulates and the remaining flue gas exhaust, which contains a high carbon dioxide content (along with nitrogen and water vapor) is emitted directly to the atmosphere. Conventional coal electric power stations emit massive amounts of carbon dioxide to the atmosphere, substantial fraction of total greenhouse gases. Exhaust flue gas volume composition varies with plant construction. The flue gas volume is ~323 $m^3$/GJ from coal power plants. The flue gas contains a majority of nitrogen, water vapor, and ~14% $CO_2$. Additional infrastructure is included to scrub the flue gases of sulfur, nitrous oxides, and heavy metals. Coal is principally carbon and moisture. More specifically for the coals lignite contains 24-35% carbon and up to 66% moisture, bituminous coal contains 60-80% carbon, while anthracite is 92 to 98% carbon. The three respectively have heat contents of ~15, 24 to 35, and 36 kJ/g.

There are a few integrated (coal) gasification combined cycle (IGCC) power plants, which burn the coal with purified oxygen, rather than air, and can gasify the coal to hydrogen or syngas. These IGCC plants have higher energy conversion efficiency (~50% compared to ~35%) for traditional, and have the potential to reach substantially higher efficiency when the energy penalty to form the required pure oxygen is circumvented, such as via the in-situ electrolysis of $CO_2$ studied herein). Oxy-fuel, rather than air, coal plants have several advantages and energy efficiency is higher due to the higher temperatures achieved with a higher $O_2$ combustion and because heat stack losses are less, as the emitted gas volume is significantly smaller with less $N_2$ from air. Oxy-fuel coal plants generate a more concentrated carbon dioxide emission than simple coal combustion for heat, which have been explored as potential carbon sequestration opportunities for coal plants.

Integrating a conventional coal plant with a system to produce carbon nano-materials as described above in FIG. 1 improves coal combustion efficiency without the need for the cryogenic production of pure oxygen, there is no carbon dioxide emission, heat is retained in the combustion chamber, as there is little excess stack as to exhaust, and useful, stable carbon nano-materials are produced.

Figure 14A:
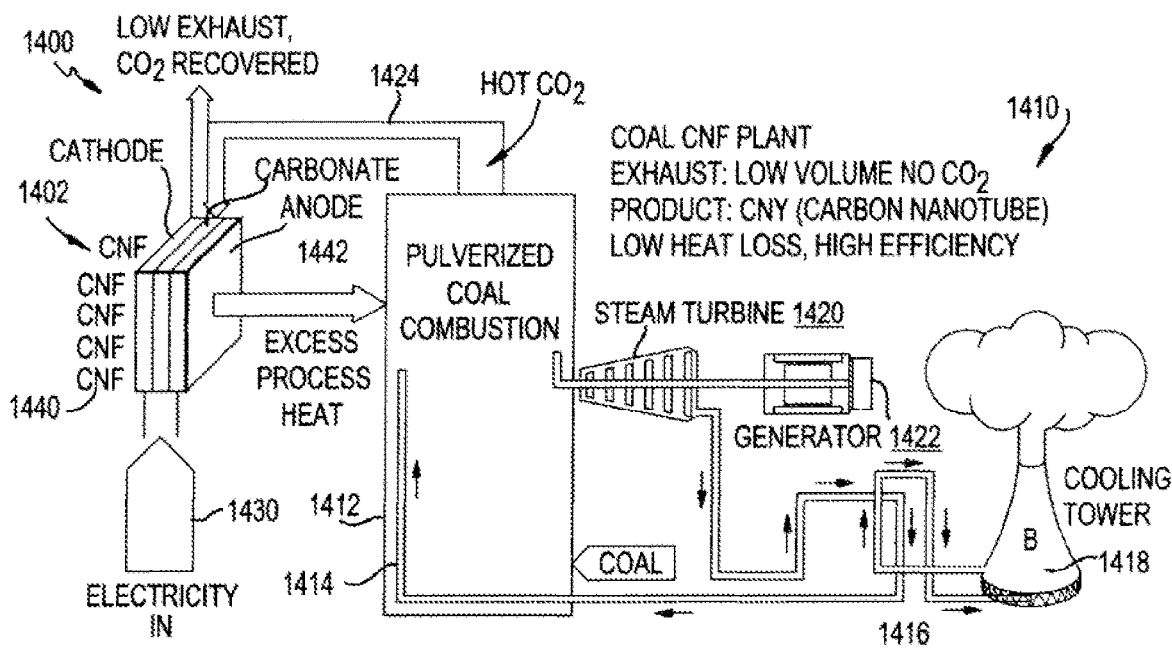
FIG. 14A is an example coal powered joint coal powered electrical generation and carbon nano-material production plant.

FIG. 14A shows a first example of a non-$CO_2$ emitting coal combustion plant system 1400. The system 1400 includes an electrolysis chamber 1402 and a conventional coal power generation plant 1410. The coal generation plant 1410 includes a combustion chamber 1412 that combusts coal from a coal source 1414. Water is circulated to the combustion chamber 1412 via a pipe system 1416. The water is cooled in a cooling tower 1418 before being recirculated. The resulting steam from the water flowing through the combustion chamber 1412 powers a steam turbine 1420 that is coupled to a generator 1422 to generate electricity. The exhaust from the combustion chamber 1412 includes hot $CO_2$ that is directed by an exhaust conduit 1424 and this hot exhaust gas is used to heat the electrolysis chamber 1402. In this example, the electrolysis chamber 1402 is powered by a power source 1430. The electrolysis chamber 1402 produces carbon nano-materials 1440 and oxygen 1442 that is directed back to the combustion chamber 1412 such as via a conduit or the like. As explained above, the electrolysis chamber 1402 splits hot $CO_2$ from the coal combustion into a carbon nano-material product and pure oxygen. The pure oxygen may be used to improve the coal combustion, and the remaining gas has had the $CO_2$ by removed by the electrolysis.

The thermodynamic enthalpy available per $CO_2$ emitted from carbon combustion (−394 kJ/mole) is less than that from methane (−890 kJ/mole) combustion. Coal combustion will generate less excess heat per transformable $CO_2$ to drive carbon nano-material production compared to natural gas. Coal is retained within the system at the electrolysis chamber temperature of 750° C., and hence under normal circumstances while a plant may co-produce electricity and carbon nano-materials, the coal carbon nano-material plant 1400 will produce only value-added carbon nano-materials, and not surplus electricity. Indeed, all of the electricity generated by generator 1422 is used to drive the electrolysis chamber 1402. However, the coal carbon nano-material plant 1400 is energetically efficient, due to the low electrolysis voltage and high coulombic efficiency observed for the $CO_2$ to carbon nano-material transformation, and is further enhanced given the opportunities of the $CO_2$ electrolysis chamber to retain heat within the plant 1400, to use the electrolysis generated pure oxygen to increase the coal combustion efficiency, and to use the steam condenser heat loss to improve the product extraction and heat balance of the electrolysis chamber.

Figure 14B:
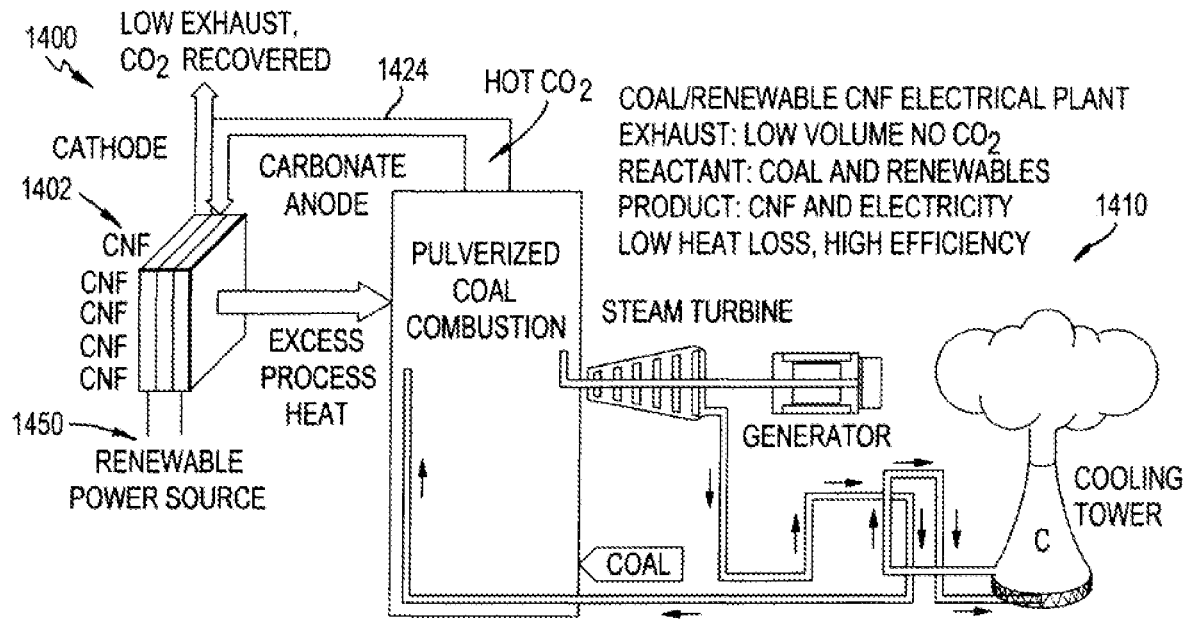
FIG. 14B is an example renewable powered joint coal powered electrical generation and carbon nano-material production plant.

FIG. 14B is an example of a coal carbon nano-material and electricity plant system 1440. The plant system 1440 produces both electricity via the coal plant 1410 and carbon nano-materials via the electrolysis chamber 1402. The system 1400 uses a renewable (or nuclear) power source 1450, rather than electricity from the coal plant, to drive the electrolysis chamber 1402 and hot gas exiting the flue to heat the electrolysis. In this embodiment, unlike in FIG. 14A, plant system 1440 uses renewable energy 1450 to drive the electrolysis chamber, leaving the electricity generated from generator 1422 to be used for other purposes.

STEP Coal/CNF Power Plant

Figure 14C:
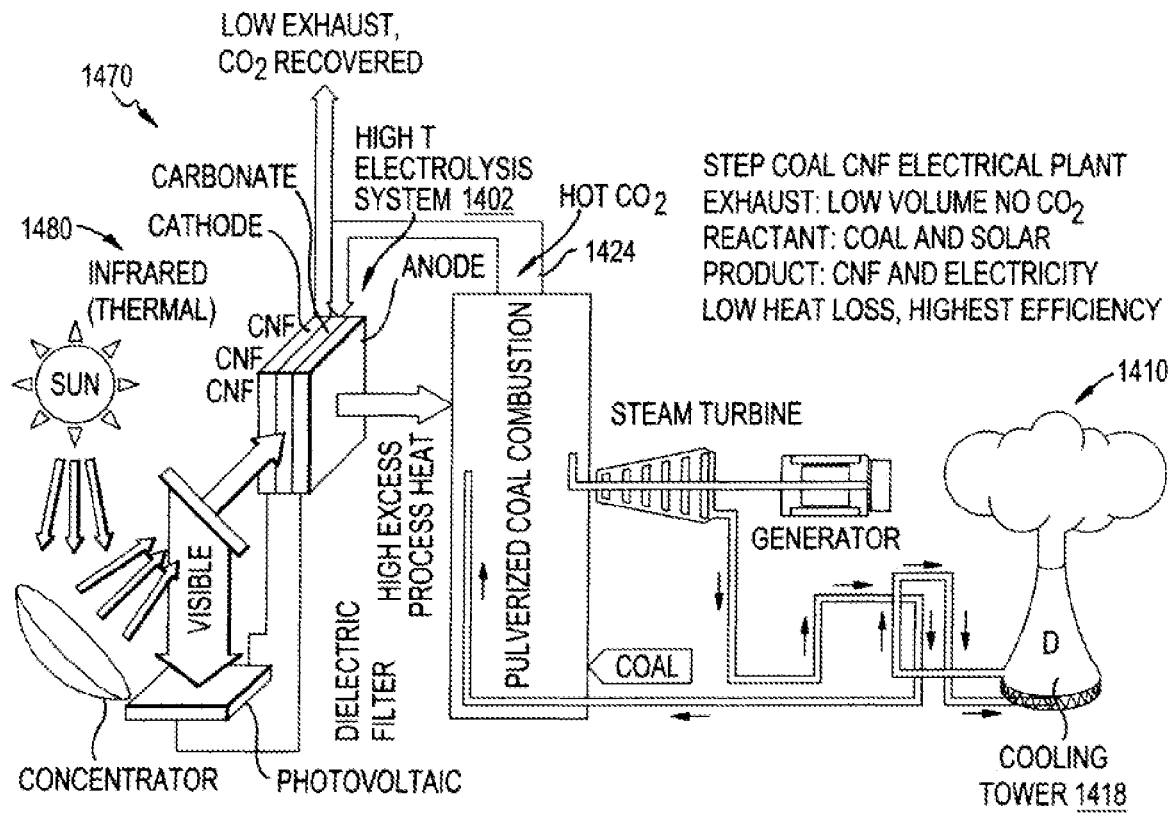
FIG. 14C is an example solar powered joint coal powered electrical generation and carbon nano-material production plant.
Figure 14D:
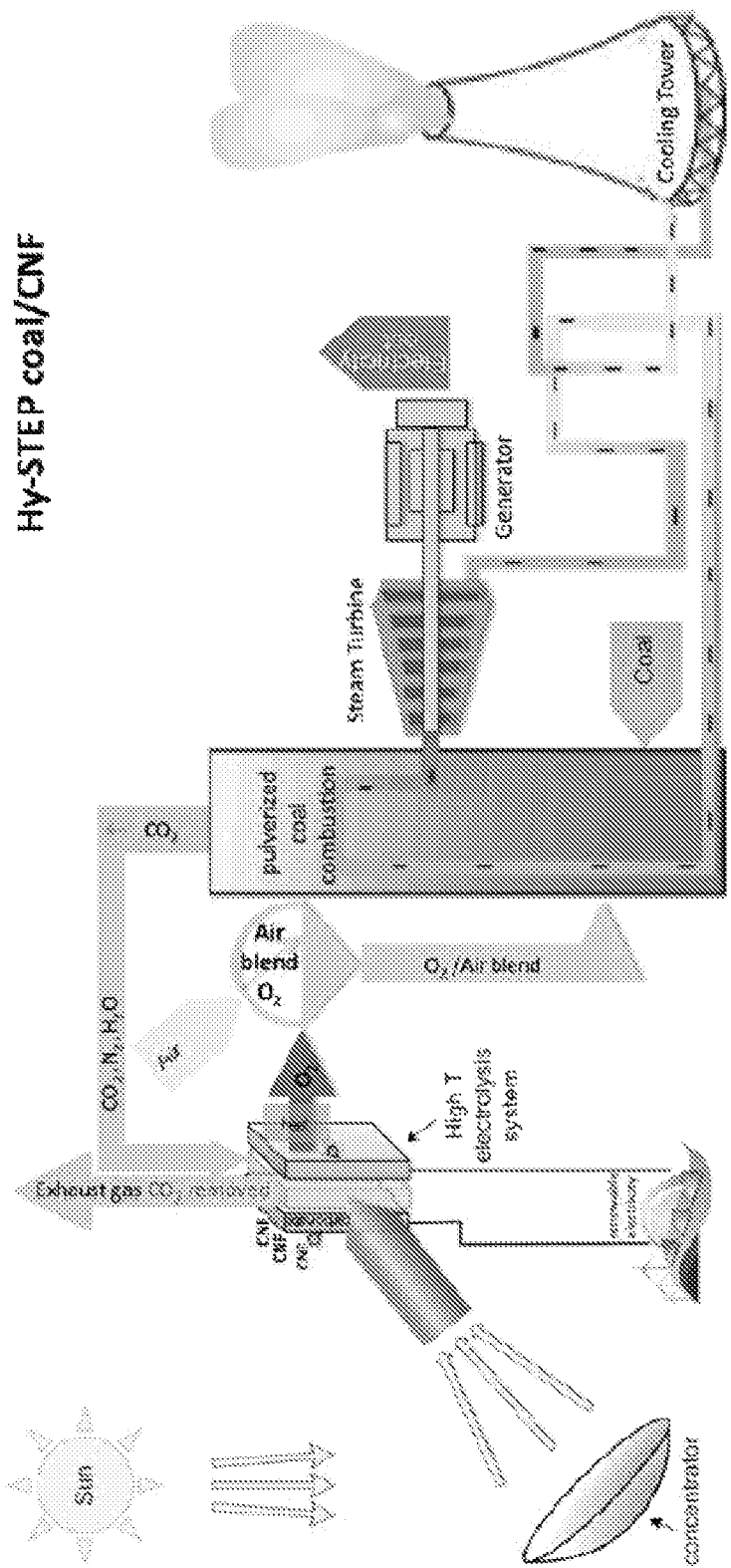
FIG. 14D is an diagram of an alternative embodiment of the solar powdered joint coal powered electrical generation and carbon nano-material production plant illustrated in FIG. 14C.

With respect to FIGS. 14C-D, a system and method of removing carbon dioxide from the exhaust of a coal power plant and transforming it into carbon nano-materials utilizing solar energy is shown.

As discussed above, during coal combustion, coal is combusted at the combustion chamber 1412 to produce steam, which drives the turbines 1420 to generate electricity. The exhaust from the combustion is generally cleansed of sulfur, nitrogen, heavy metals and particulates, and the remaining flue gas exhaust, which contains a high carbon dioxide content, is emitted directly into the atmosphere. Utilizing the STEP apparatus of FIGS. 14A-D, carbon nano-materials may be formed using this flue gas as the source of carbon dioxide, as opposed to taking the carbon dioxide from the atmosphere. This achieves the same desired effect of removing $CO_2$ from the atmosphere, since the $CO_2$ that is produced as a byproduct of coal combustion is completely utilized, instead of being released as pollution. While the system below is discussed with respect to a coal combustion plant, it may also be implemented with any fossil fuel power plant that emits $CO_2$ as a byproduct of combustion.

Coal is principally formed of carbon and moisture; for example, lignite coal contains 24-35% carbon and up to 66% moisture. On the other hand, bituminous coal contains 60-80% carbon, and anthracite coal contains 92 to 98% carbon. As such, coal is a very rich source of carbon.

FIG. 14C illustrates a standard STEP apparatus for a solar based carbon nano-material and coal plant system 1470. The plant 1470 includes a solar heated and solar electrically powered electrolysis chamber system 1480 similar to that described in FIG. 2A. The plant 1470 provides the highest efficiency utilizing the full spectrum of sunlight to energize the electrical and carbon nano-material production. The plant 1470 produces both electricity and carbon nano-materials. Concentrated sunlight is split into the infrared band that heats the electrolysis chamber 1402 and directs excess heat into the coal combustion chamber 1412 of the coal plant 1410, and the visible band that drives photovoltaic power of the electrolysis chamber 1402. Higher efficiency is achieved by using the full spectrum of sunlight. As previously explained, visible sunlight provides efficient electrical power and the thermal sunlight provides supplemental heating of solar thermal electrochemical electrolyses. For example, conventional photovoltaics super-bandgap (visible) radiation cannot use sub-band (thermal energy) as it is not sufficient to drive electron/hole separation. For example a conventional efficient (40% solar to electrical) concentrator photovoltaic, can achieve over 50% solar energy efficiencies when the excess thermal energy is directed to heat the chemical and electrical reactions here.

The plants 1440 and 1470 in FIGS. 14B and 14C include coal power plants 1410 that simultaneously produce electricity and carbon nano-materials without $CO_2$ emission, by supplementing the coal generated electricity with a non-$CO_2$ electrical source.

These systems may also use injected $CO_2$ from hot $CO_2$ generated during fuel combustion in a fossil fuel electric generator. Hot $CO_2$ may also be taken from that generated during biofuel or fossil fuel combustion in an oven. A source of non-$CO_2$ emitting electricity, such as renewable or nuclear powered electricity powers the electrolysis, and the $O_2$ electrolysis product 1442 that is injected back into the combustion chamber 1412 such as via a conduit, air blender, or the like via inlet 1482, to provide an oxygen enriched combustion of the fuel and so that the combustion chamber is in fluid or flow communication with the heating and electrolysis chamber. This combined carbon nano-material oven improves the fuel combustion efficiency, decreases the oven $CO_2$ and heat emissions, and generates oven heat as well as carbon nano-materials.

As further shown in FIG. 14C, the solar heated and solar electrically powered electrolysis chamber system 1402, similar to that of the solar powered system 200 of FIG. 2A, is in fluid or flow communication with an already-existing coal electric power plant 1410 via exhaust conduit 1424. The fluid connections are made without having to substantially change the existing coal plant infrastructure. While FIG. 14C is illustrated in connection with the solar powered system 200 of FIG. 2A (labeled 1402), any suitable system can be utilized such as the photovoltaic based solar electrically and thermally powered electrolysis system 240 of FIG. 2B or the tower-based heating and electrolysis system 270 of FIG. 2C.

FIG. 14D illustrates an alternative embodiment of a solar based carbon nano-material and coal plant system, which is referred to as a Hy-STEP system (hybrid STEP). Here, a Hy-STEP solar based system 1490 utilizes all sunlight (visible light and infrared light) to heat the electrolysis chamber 1402. Because the visible light is not utilized to generate electricity, the Hy-STEP solar based system 1490 does not include a photovoltaic cell 212, as illustrated in the embodiment of FIG. 14C. To power the electrolysis reaction, any form of renewable or nuclear generated electricity 1450, as is shown in FIG. 14B, may be used. The HY-Step system is advantageous over the STEP system of FIG. 14C in that it does not require any equipment to separate the infrared bands from the visible bands of the sunlight, which reduces costs and potential optical losses. Additionally, in scenarios where sources of energy other than solar energy are desired (i.e., in areas where there is little available sunlight), the Hy-Step system 1490 allows alternative renewable electricity to be used to drive the electrolysis chamber 1402.

Figure 15:
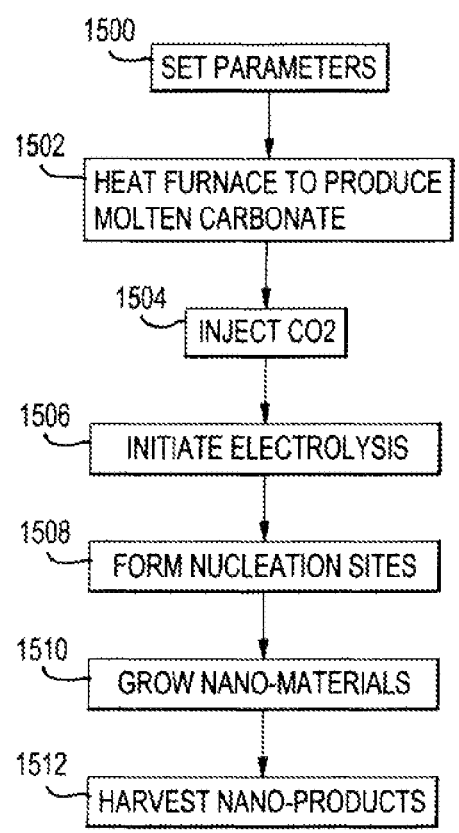
FIG. 15 is a flow diagram of the process to produce carbon nano-materials via the thermal/electrolysis system.

FIG. 15 shows a flow diagram of the production of carbon nano-materials from a production system such as that shown in FIG. 1. Production parameters such as the type of carbonate, the electrolysis temperatures, the current densities and times, the transition metal content and the electrolyte composition are established for the desired type of carbon nano-material (1500). The carbonate material is then heated to produce molten carbonate (1502). $CO_2$ is then injected into the molten carbonate (1504). An electrolysis process is initiated between a transition metal anode and a galvanized steel cathode (1506).

The electrolysis is controlled in relation to current density and causes deterioration of the transition metal causing nucleation sites to form on the cathode (1508). The nucleation sites grow carbon nano-materials at the cathode (1510). The carbon nano-materials are then harvested from the cathode (1512).

Figure 16:
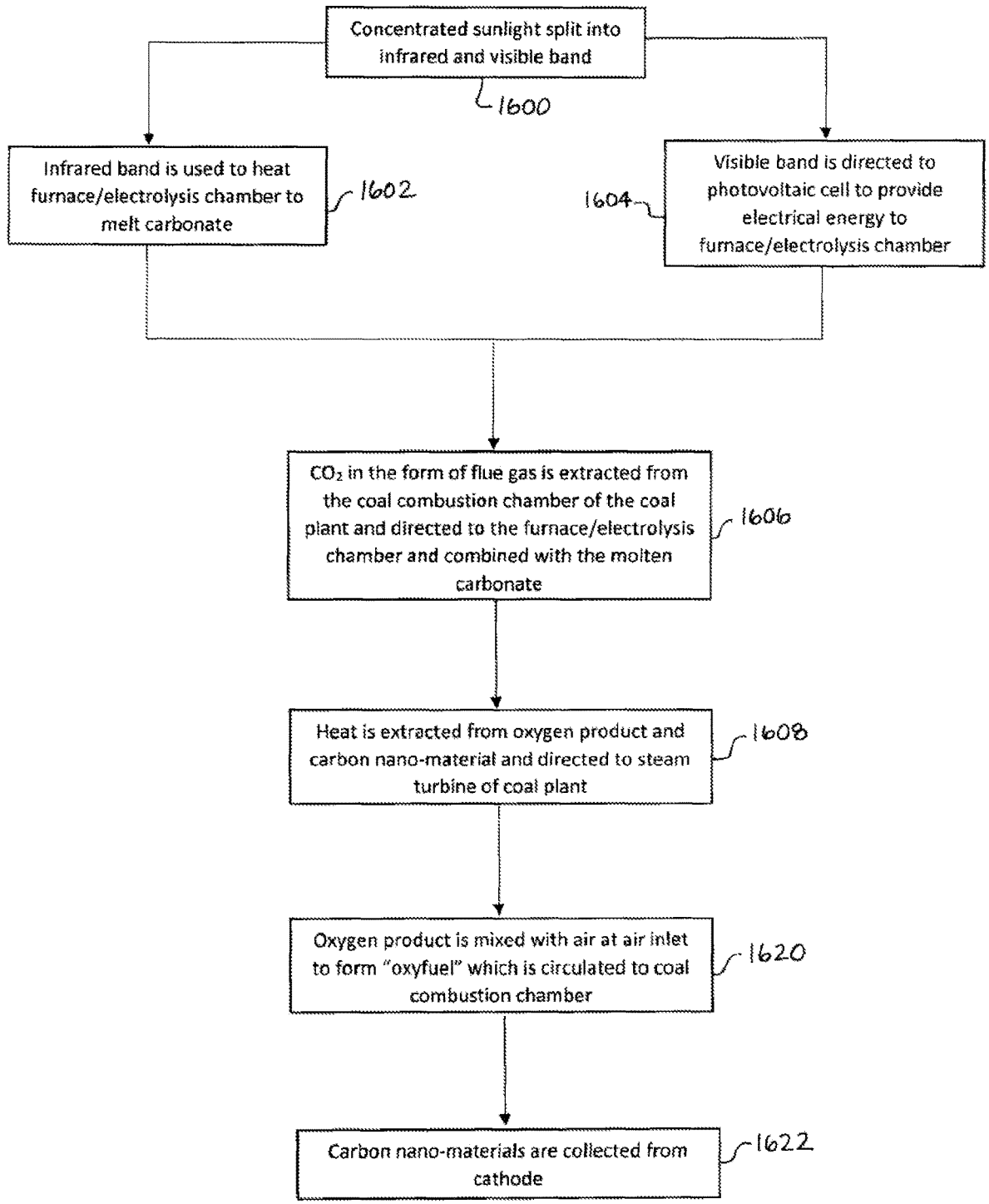
FIG. 16 is a flow diagram of the process of producing carbon nano-materials via the plant of FIG. 14C.

The STEP process for use with a fossil fuel power plant is illustrated in the flow chart of FIG. 16. First, at step 1600, concentrated sunlight is split into its infrared band 206 and its visible band 208 as discussed above with respect to FIG. 2A. The infrared band 206 is then used to heat an electrolysis chamber 210 which houses the carbonate material 214, at step 1602. The heat from the infrared band 206 melts the carbonate 214 to form a molten carbonate. At the same time, the visible band 208 of the sunlight is directed to a photovoltaic cell 212 to provide electrical energy to effect electrolysis in the electrolysis chamber 210, at step 1604.

Next, hot $CO_2$ provided in the form of flue gas is extracted from the coal (i.e., fossil fuel) combustion chamber 1412 of the coal plant 1410 and is directed to the electrolysis chamber 1402 to be bubbled through the molten carbonate, at step 1606. This flue gas contains as much as 15% $CO_2$ (significantly more than atmospheric gases). While not shown, additional systems may be included to scrub the flue gases of sulfur, nitrous oxides, and heavy metals.

The electrolysis chamber 1402 includes an anode 216 and a cathode 218 (as illustrated in FIG. 2A), between which a current passes. The current is powered by the photovoltaic cell 212. As electrolysis occurs, carbon nano-materials are produced on the cathode 218, while oxygen is produced at the anode 216. To increase the efficiency of the entire system, at step 1608, heat is extracted from the oxygen product produced at the anode 216 and the carbon nano-material produced at the cathode 218 by conventional heat exchange methods so that it may be directed to the coal combustion chamber 1412 to increase the efficiency of the combustion reaction and also allow the oxygen and carbon nano-material products to cool. The oxygen product ($O_2$) is then mixed with air at the air inlet 1482 to form "oxyfuel," which is circulated to the coal combustion chamber 1412 to increase efficiency of the coal combustion and electric power generation processes, at step 1620. Lastly, the carbon nano-materials are collected from the cathode 218, at step 1622.

For the Hy-STEP process, as set forth in FIG. 14D, the process is different in that step 1600 is excluded. Instead of splitting concentrated sunlight into its infrared and visible bands, all of the bands are directed to the electrolysis chamber to melt the carbonate, as in step 1602. Additionally, in place of step 1604, any form of renewable or nuclear generated electricity is supplied to the electrolysis chamber 1402 to drive the electrolysis reaction.

The demonstrated carbon dioxide to carbon nano-material process can consist of solar driven and solar thermal assisted $CO_2$ electrolysis as described above. Large scale-up of this process could initiate with smokestack emissions providing a $CO_2$ reactant, which is both hot and concentrated to ameliorate climate change. An even greater amelioration of climate change will occur with the direct removal of atmospheric $CO_2$. Extrapolating the present scale of the solar driven carbon nano-material synthesis determines that 700 $km^2$ of concentrated photovoltaics (CPV) in an area of less than 10% of that of the Sahara Desert will decrease atmospheric $CO_2$ to pre-industrial concentrations in ten years. Industrial environments provide opportunities to further enhance the $CO_2$ extraction rate, for example fossil-fueled burner exhaust provides a source of relatively concentrated, hot $CO_2$ requiring less energy than the room temperature diluted $CO_2$ in the atmosphere. The product, carbon nano-material, may be stored as a stable, dense resource for future generations or stored in widespread use as a flexible, conductive, high strength material in carbon composites for infrastructure, transportation and consumer devices.

It is of interest whether material resources are sufficient to expand the process to substantially impact (decrease) atmospheric levels of carbon dioxide. The build-up of atmospheric $CO_2$ levels from a 280 to ~400 ppm occurring over the industrial revolution comprises an increase of $2 \times 10^{16}$ mole ($8.2 \times 10^{11}$ metric tons) of $CO_2$, and will take a comparable effort to remove. It would be preferable if this effort results in useable, rather than sequestered, resources. As explained below, a scaled up capture process can remove all excess atmospheric $CO_2$ converting it to useful carbon nano-fibers.

Via the Faraday equivalence approaching 100% coulombic efficiency, 0.3 A $cm^{-2}$ will remove 10 tons of carbon dioxide per $m^2$ cathode per year, calculated as: $3 \times 10^3$ A $m^{-2} \times 3.156 \times 10^7$ s $year^{-1} \times (1\ mol\ e^-/96485\ As) \times (CO_2/4\ e^-)) \times (4.40098 \times 10^{-6}\ ton/mol) = 10$ tons $CO_2$. At full absorption and conversion of $CO_2$, this would require air with 0.04% $CO_2$ striking the cell with a wind speed of 1 mph per as: 1609 m air per h×1 $m^2$×8,766 hour per year)×(0.0004 $m^3$ $CO_2/m^3$ air) ×1 ton per 556 $m^3$ $CO_2$=10 tons $CO_2$.

In the solar thermal electrochemical process resulting in carbon nano-material production, 6 kWh $m^{-2}$ of sunlight per day, at 500 suns on 1 $m^2$ of 39% efficient concentrated photo-voltaic as shown in FIG. 9A-9G, will generate 430 kAh at 2.7 V to drive two series connected series connected molten carbonate electrolysis cells to form carbon nano-fibers. This will capture $8.1 \times 10^3$ moles of $CO_2$ $day^{-1}$ to form solid carbon (based on 430 kAh·2 series cells/4 Faraday $mol^{-1}$ $CO_2$). The material resources to decrease atmospheric carbon dioxide concentrations with this process appear to be reasonable. From the daily conversion rate of $8.1 \times 10^3$ moles of $CO_2$ per square meter of CPV, the capture process, scaled to 700 $km^2$ of CPV operating for 10 years can remove and convert all the increase of $2 \times 10^{16}$ mole of atmospheric $CO_2$ to solid carbon. A larger current density at the electrolysis electrodes will increase the required voltage and would increase the required area of CPVs. A variety of concentrated solar power installations, which include molten salt heat storage, are being commercialized, to permit 24/7, rather than daylight only, operation, and costs are decreasing. The solar thermal electrolysis process provides higher solar energy conversion efficiencies than concentrated solar power installations, by producing a chemical product rather than electricity, and secondary losses can be lower (for example, there are no grid-related transmission losses). Contemporary concentrators, such as a concentrator based on plastic Fresnel, rather than power towers such as that shown in FIG. 2C have shorter focal length to avoid environmental thermal damage. Heat exchange losses are to be expected between hot, $CO_2$-cleansed air and ambient input air. A greater degree of solar concentration, for example 2000 suns, rather than 500 suns, will proportionally decrease the quantity of required concentrator photo-voltaics to 175 $km^2$, while the concentrator land area will be several thousand fold higher than the concentrator photo-voltaic area, equivalent to <10% of the area of the Sahara Desert (which averages ~6 kWh $m^{-2}$ of daily sunlight over its $10^7$ $km^2$ surface), to remove anthropogenic carbon dioxide in ten years.

A related resource question is whether there is sufficient lithium carbonate, as an electrolyte of choice to decrease atmospheric levels of carbon dioxide for the carbon capture. 700 $km^2$ of a concentrator photo-voltaic powered plant will require several million tons of lithium carbonate electrolyte depending on the electrolysis cell thickness current density and cell thickness. Thicker or lower current density cells will require proportionally more electrolyte. Fifty, rather than ten, years to return the atmosphere to pre-industrial carbon dioxide levels will require proportionally less electrolyte. These values are viable within the current production of lithium carbonate. Lithium carbonate availability as a global resource has been under scrutiny to meet the growing lithium battery market. It has been estimated that the annual production will increase to 0.24 million tons by 2015. Sodium and potassium carbonate are substantially more available.

Each of these embodiments and obvious variations thereof is contemplated as falling within the spirit and scope of the claimed invention, which is set forth in the following claims.

What is claimed is:

1. A method of producing carbon nano-materials, the method comprising:
    (a) utilizing sunlight to heat a combined heating and electrolysis chamber containing an electrolyte consisting essentially of a carbonate material;
    (b) inserting an anode and a cathode into the electrolyte once melted;
    (c) providing a transition metal nucleating agent in the molten electrolyte by (i) dissolution of the transition metal nucleating agent from the anode or (ii) addition of the transition metal nucleating agent as a transition metal salt to the molten electrolyte, wherein the transition metal nucleating agent is selected from nickel, iron, cobalt, copper, titanium, chromium, manganese, zirconium, molybdenum, silver, cadmium, vanadium, tin, ruthenium, and any combination thereof;
    (d) injecting carbon dioxide into the electrolyte, wherein the carbon dioxide is supplied from a fossil fuel combustion chamber; and
    (e) generating an electrolysis reaction between the anode and the cathode to (i) form deposits of the transition metal nucleating agent on the cathode which act as nucleating sites and (ii) subsequently produce oxygen and carbon products which are predominantly grown at the nucleation sites as carbon nano-materials,
wherein (i) the carbon nano-material is a carbon nano-fiber, a carbon nano-tube, or both, and (ii) at least 80% of the carbon produced is carbon nanomaterials.

2. A method of producing carbon nano-materials, the method comprising:
    (a) utilizing sunlight to heat a combined heating and electrolysis chamber containing an electrolyte consisting essentially of a carbonate material;
    (b) inserting an anode and a cathode into the electrolyte once melted;
    (c) providing a transition metal nucleating agent in the molten electrolyte, wherein the transition metal nucleating agent is selected from nickel, iron, cobalt, copper, titanium, chromium, manganese, zirconium, molybdenum, silver, cadmium, tin, ruthenium, and any combination thereof;
    (d) injecting carbon dioxide into the electrolyte, wherein the carbon dioxide is supplied from a fossil fuel combustion chamber; and
    (e) generating an electrolysis reaction between the anode and the cathode to (i) form deposits of the transition metal nucleating agent on the cathode which act as nucleating sites and (ii) subsequently produce oxygen and carbon products which are predominantly grown at the nucleation sites as carbon nano-materials,
wherein the transition metal nucleating agent is nickel and the electrolysis reaction is performed at an initial current density of about 5 $mA/cm^2$, the current density is then increased from about 5 $mA/cm^2$ to about 100 $mA/cm^2$, then maintained at a current density of between about 20 and about 1000 $mA/cm^2$.

3. The method of claim 1 or 2, further comprising the step of combusting a fossil fuel in the fossil fuel combustion chamber, such that carbon dioxide is generated and supplied to the combined heating and electrolysis chamber.

4. The method of claim 3, wherein the carbon dioxide is supplied to the combined heating and electrolysis chamber by being circulated through an exhaust conduit.

5. The method of claim 1 or 2, further comprising at least partially heating the solar powered heating and electrolysis chamber by a flue exhaust gas entering the combined heating and electrolysis chamber via an exhaust conduit.

6. The method of claim 1 or 2, wherein the fossil fuel combustion chamber is a coal combustion chamber.

7. The method of claim 1 or 2, further comprising the step of mixing the oxygen with atmospheric air after step (e).

8. The method of claim 1 or 2, wherein the cathode comprises steel, iron, nickel, carbon, cobalt, copper, manganese, iridium, a metal, an alloy of the foregoing, or any combination of the foregoing.

9. The method of claim 1 or 2, wherein the anode comprises nickel, cobalt, copper, manganese, carbon, iridium, a metal, carbon, or an alloy resistant to oxidation and sustaining oxygen generation at low overvoltage.

10. The method of claim 1 or 2, wherein the carbonate is selected from the group consisting of alkali metal carbonates, alkali earth metal carbonates, and any combination thereof.

11. The method of claim 1 or 2, further comprising supplying the carbon dioxide to the combined heating and electrolysis chamber via an exhaust conduit, such that when a current is applied between the anode and the cathode, the carbonate material is electrolyzed into oxygen and carbon nano-materials.

12. The method of claim 11, wherein the oxygen is produced at the anode and the carbon nano-materials are produced at the cathode.

13. The method of claim 1 or 2, further comprising providing the carbon dioxide in the form of a flue gas that has as much as 15% by volume carbon dioxide.

14. The method of claim 1 or 2, further comprising the step of circulating the oxygen to the fossil fuel combustion chamber after step (e).

15. The method of claim 14, wherein the oxygen is mixed with atmospheric air before being circulated to the fossil fuel combustion chamber.

16. The method of claim 1 or 2, further comprising the step of collecting the carbon nano-materials from the combined heating and electrolysis chamber after step (e).

17. The method of claim 1 or 2, wherein the electrolysis reaction is powered by a source of renewable, low $CO_2$ emission fossil fuel, solar, coal, natural gas, wind, hydrothermal or nuclear energy.

18. The method of claim 1 or 2, wherein the transition metal nucleating agent is selected from the group consisting of nickel, iron, cobalt, copper, titanium, chromium, manganese, zirconium, molybdenum, silver, cadmium, tin, ruthenium, and any combination thereof.

19. The method of claim 1 or 2, wherein the transition metal nucleating agent is added as a dissolved transition metal salt to the molten electrolyte to migrate onto the cathode.

20. The method of claim 1 or 2, wherein the transition metal nucleating agent is added by dissolution of a transition metal from the anode to migrate through the molten electrolyte onto the cathode.

21. The method of claim 1 or 2, wherein carbon dioxide chemically reacts with an oxide to form carbonate, followed by electrochemical reduction of the carbonate to oxide at the cathode.

22. The method of claim 1 or 2, wherein the transition metal nucleating agent is nickel and the electrolysis reaction is performed at a current density of between about 5 and about 1000 $mA/cm^2$.

23. The method of claim 1, wherein the transition metal nucleating agent is nickel and the electrolysis reaction is performed at a current density of between about 5 and about 100 $mA/cm^2$.

24. The method of claim 1, wherein the electrolysis reaction is conducted at a temperature between about 600° C. and about 950° C.

25. A method of producing carbon nano-materials, the method comprising:
heating a combined heating and electrolysis chamber containing an anode, a cathode and an electrolyte consisting essentially of a carbonate material in order to melt the carbonate material;
injecting carbon dioxide into the electrolyte, wherein the carbon dioxide is supplied from a fossil fuel combustion chamber; and
generating an electrolysis reaction of the carbonate material between the anode and the cathode with a transition metal nucleating agent present in the electrolysis chamber, to (i) form deposits of the transition metal nucleating agent on the cathode which act as nucleation sites and (ii) subsequently produce oxygen and carbon products which are predominantly grown at the nucleation sites as carbon nano-materials, wherein (a) the transition metal nucleating agent is selected from nickel, iron, cobalt, copper, titanium, chromium, manganese, zirconium, molybdenum, silver, cadmium, vanadium, tin, ruthenium, and any combination thereof, and (b) the transition metal nucleating agent is provided in the molten electrolyte by (i) dissolution of the transition metal nucleating agent from the anode or (ii) addition of the transition metal nucleating agent as a transition metal salt to the molten electrolyte,
wherein the carbon nano-material is a carbon nano-fiber, a carbon nano-tube, or both.

26. The method of claim 25, wherein the electrolysis chamber comprises a heat source to melt the electrolyte.

27. The method of claim 25, wherein sunlight is utilized as a heat source to melt the electrolyte.

28. A method of producing carbon nano-materials, the method comprising:
heating a combined heating and electrolysis chamber containing an anode, a cathode and an electrolyte consisting essentially of a carbonate material in order to melt the carbonate material;
injecting carbon dioxide into the electrolyte, wherein the carbon dioxide is supplied from a fossil fuel combustion chamber; and
generating an electrolysis reaction of the carbonate material between the anode and the cathode with a transition metal nucleating agent present in the electrolysis chamber, to (i) form deposits of the transition metal nucleating agent on the cathode which act as nucleation sites and (ii) subsequently produce oxygen and carbon products which are predominantly grown at the nucleation sites as carbon nano-materials, wherein the transition metal nucleating agent is selected from nickel, iron, cobalt, copper, titanium, chromium, manganese, zirconium, molybdenum, silver, cadmium, tin, ruthenium, and any combination thereof,
wherein the transition metal nucleating agent is nickel and the electrolysis reaction is performed at an initial current density of about 5 $mA/cm^2$, the current density is then increased from about 5 $mA/cm^2$ to about 100 $mA/cm^2$, then maintained at a current density of between about 20 and about 1000 $mA/cm^2$.

29. The method of claim 25 or 28, wherein the electrolysis reaction is conducted at a temperature between about 600° C. and about 950° C.

* * * * *